US010796568B2

(12) United States Patent
Siminoff

(10) Patent No.: US 10,796,568 B2
(45) Date of Patent: Oct. 6, 2020

(54) ILLUMINATED SIGNAL DEVICE FOR AUDIO/VIDEO RECORDING AND COMMUNICATION DEVICES

(71) Applicant: Amazon Technologies, Inc., Seattle, WA (US)

(72) Inventor: James Siminoff, Santa Monica, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/693,284

(22) Filed: Nov. 23, 2019

(65) Prior Publication Data

US 2020/0090507 A1 Mar. 19, 2020

Related U.S. Application Data

(63) Continuation of application No. 15/679,138, filed on Aug. 16, 2017, now Pat. No. 10,490,069.
(Continued)

(51) Int. Cl.
*G08G 1/01* (2006.01)
*G08G 1/054* (2006.01)
(Continued)

(52) U.S. Cl.
CPC ............ *G08G 1/054* (2013.01); *G06T 7/0002* (2013.01); *G06T 7/20* (2013.01); *G08B 5/223* (2013.01);
(Continued)

(58) Field of Classification Search
CPC ........ G08G 1/054; G08B 5/36; G06T 7/0002; G06T 2207/30196; H04L 51/32
(Continued)

(56) References Cited

U.S. PATENT DOCUMENTS 4,764,953 A 8/1988 Chern et al.
5,428,388 A 6/1995 von Bauer et al.
(Continued)

FOREIGN PATENT DOCUMENTS

CN 2585521 Y 11/2003
CN 2792061 Y 6/2006
(Continued)

OTHER PUBLICATIONS

International Search Report and Written Opinion of the International Searching Authority for PCT/US/2017/047236, dated Feb. 12, 2018, International Application Division, Korean Intellectual Property Office, Republic of Korea.

*Primary Examiner* — Tanmay K Shah
(74) *Attorney, Agent, or Firm* — Lathrop GPM LLP

(57) ABSTRACT

Illuminated signal devices and speed detectors for audio/video (A/V) recording and communication devices in accordance with various embodiments of the present disclosure are provided. In one embodiment, an illuminated signal device configured for capturing image data is provided, the device comprising a camera having a field of view, a communication module, and a processing module operatively connected to the camera and the communication module, the processing module comprising a processor, and a signal device application, wherein the signal device application configures the processor to detect motion within the field of view of the camera, capture image data in response to the detected motion using the camera, and transmit the image data to a backend server using the communication module.

18 Claims, 37 Drawing Sheets

Related U.S. Application Data

(60) Provisional application No. 62/376,826, filed on Aug. 18, 2016.

(51) Int. Cl.
| | |
|---|---|
| *H04L 12/18* | (2006.01) |
| *G08B 13/196* | (2006.01) |
| *G06T 7/20* | (2017.01) |
| *G08B 15/00* | (2006.01) |
| *G08B 5/22* | (2006.01) |
| *G08B 5/36* | (2006.01) |
| *G08G 1/017* | (2006.01) |
| *H04L 12/58* | (2006.01) |
| *G06T 7/00* | (2017.01) |

(52) U.S. Cl.
CPC ......... *G08B 5/36* (2013.01); *G08B 13/19606* (2013.01); *G08B 13/19619* (2013.01); *G08B 15/00* (2013.01); *G08G 1/0175* (2013.01); *H04L 12/1895* (2013.01); *H04L 51/32* (2013.01); *G06T 2207/30196* (2013.01)

(58) Field of Classification Search
USPC ......................................................... 340/936
See application file for complete search history.

(56) References Cited

U.S. PATENT DOCUMENTS

| | | |
|---|---|---|
| 5,760,848 A | 6/1998 | Cho |
| 6,072,402 A | 6/2000 | Kniffin et al. |
| 6,192,257 B1 | 2/2001 | Ray |
| 6,271,752 B1 | 8/2001 | Vaios |
| 6,429,893 B1 | 8/2002 | Xin |
| 6,456,322 B1 | 9/2002 | Marinacci |
| 6,476,858 B1 | 11/2002 | Ramirez Diaz et al. |
| 6,633,231 B1 | 10/2003 | Okamoto et al. |
| 6,658,091 B1 | 12/2003 | Naidoo et al. |
| 6,753,774 B2 | 6/2004 | Pan et al. |
| 6,970,183 B1 | 11/2005 | Monroe |
| 7,062,291 B2 | 6/2006 | Ryley et al. |
| 7,065,196 B2 | 6/2006 | Lee |
| 7,085,361 B2 | 8/2006 | Thomas |
| 7,109,860 B2 | 9/2006 | Wang |
| 7,193,644 B2 | 3/2007 | Carter |
| 7,304,572 B2 | 12/2007 | Sheynman et al. |
| 7,382,249 B2 | 6/2008 | Fancella |
| 7,450,638 B2 | 11/2008 | Iwamura |
| 7,643,056 B2 | 1/2010 | Silsby |
| 7,683,924 B2 | 3/2010 | Oh et al. |
| 7,683,929 B2 | 3/2010 | Elazar et al. |
| 7,738,917 B2 | 6/2010 | Ryley et al. |
| 8,139,098 B2 | 3/2012 | Carter |
| 8,144,183 B2 | 3/2012 | Carter |
| 8,154,581 B2 | 4/2012 | Carter |
| 8,619,136 B2 | 12/2013 | Howarter et al. |
| 8,872,915 B1 | 5/2014 | Scalisi et al. |
| 8,780,201 B1 | 7/2014 | Scalisi et al. |
| 8,823,795 B1 | 9/2014 | Scalisi et al. |
| 8,842,180 B1 | 9/2014 | Scalisi et al. |
| 8,937,659 B1 | 1/2015 | Scalisi et al. |
| 8,941,736 B1 | 1/2015 | Scalisi |
| 8,947,530 B1 | 2/2015 | Scalisi |
| 8,953,040 B1 | 2/2015 | Scalisi et al. |
| 9,013,575 B2 | 4/2015 | Scalisi |
| 9,049,352 B2 | 6/2015 | Scalisi et al. |
| 9,053,622 B2 | 6/2015 | Scalisi |
| 9,058,738 B1 | 6/2015 | Scalisi |
| 9,060,103 B2 | 6/2015 | Scalisi |
| 9,060,104 B2 | 6/2015 | Scalisi |
| 9,065,987 B2 | 6/2015 | Scalisi |
| 9,094,584 B2 | 7/2015 | Scalisi et al. |
| 9,113,051 B1 | 8/2015 | Scalisi |
| 9,113,052 B1 | 8/2015 | Scalisi et al. |
| 9,118,819 B1 | 8/2015 | Scalisi et al. |
| 9,142,214 B2 | 9/2015 | Scalisi |
| 9,160,987 B1 | 10/2015 | Scalisi et al. |
| 9,165,444 B2 | 10/2015 | Scalisi |
| 9,172,920 B1 | 10/2015 | Scalisi et al. |
| 9,172,921 B1 | 10/2015 | Scalisi et al. |
| 9,172,922 B1 | 10/2015 | Kasmir et al. |
| 9,179,107 B1 | 11/2015 | Scalisi |
| 9,179,108 B1 | 11/2015 | Scalisi |
| 9,179,109 B1 | 11/2015 | Kasmir et al. |
| 9,196,133 B2 | 11/2015 | Scalisi et al. |
| 9,197,867 B1 | 11/2015 | Scalisi et al. |
| 9,230,424 B1 | 1/2016 | Scalisi et al. |
| 9,237,318 B2 | 1/2016 | Kasmir et al. |
| 9,247,219 B2 | 1/2016 | Kasmir et al. |
| 9,253,455 B1 | 2/2016 | Harrison et al. |
| 9,342,936 B2 | 5/2016 | Scalisi |
| 9,508,239 B1 * | 11/2016 | Harrison ............ G08B 13/2462 |
| 9,736,284 B2 | 8/2017 | Scalisi et al. |
| 9,743,049 B2 | 8/2017 | Scalisi et al. |
| 9,769,435 B2 | 9/2017 | Scalisi et al. |
| 9,786,133 B2 | 10/2017 | Harrison et al. |
| 9,799,183 B2 | 10/2017 | Harrison et al. |
| 2002/0094111 A1 | 7/2002 | Puchek et al. |
| 2002/0147982 A1 | 10/2002 | Naidoo et al. |
| 2003/0043047 A1 | 3/2003 | Braun |
| 2004/0085205 A1 | 5/2004 | Yeh |
| 2004/0085450 A1 | 5/2004 | Stuart |
| 2004/0086093 A1 | 5/2004 | Schranz |
| 2004/0095254 A1 | 5/2004 | Maruszczak |
| 2004/0135686 A1 | 7/2004 | Parker |
| 2005/0111660 A1 | 5/2005 | Hosoda |
| 2006/0010199 A1 | 1/2006 | Brailean et al. |
| 2006/0022816 A1 | 2/2006 | Yukawa |
| 2006/0139449 A1 | 6/2006 | Cheng et al. |
| 2006/0156361 A1 | 7/2006 | Wang et al. |
| 2006/0214783 A1 | 9/2006 | Ratnakar |
| 2007/0008081 A1 | 1/2007 | Tylicki et al. |
| 2010/0225455 A1 | 9/2010 | Claiborne et al. |
| 2011/0267460 A1 | 11/2011 | Wang et al. |
| 2012/0274447 A1 | 11/2012 | Hess et al. |
| 2012/0320150 A1 * | 12/2012 | Montgomery ....... H04N 5/2251 |
| | | 348/36 |
| 2013/0057695 A1 | 3/2013 | Huisking |
| 2014/0267716 A1 | 9/2014 | Child et al. |
| 2015/0117714 A1 | 4/2015 | Okuda |
| 2015/0163463 A1 | 6/2015 | Hwang et al. |
| 2015/0332563 A1 | 11/2015 | Davis |
| 2015/0356871 A1 | 12/2015 | Kugel et al. |
| 2016/0050315 A1 | 2/2016 | Malhotra et al. |
| 2016/0171808 A1 | 6/2016 | Caterino et al. |
| 2016/0345406 A1 * | 11/2016 | Donhowe ............ H05B 47/175 |
| 2017/0263107 A1 | 9/2017 | Doyle et al. |
| 2017/0329449 A1 | 11/2017 | Silverstein et al. |

FOREIGN PATENT DOCUMENTS

| | | |
|---|---|---|
| EP | 0944883 A1 | 6/1998 |
| EP | 1480462 A1 | 11/2004 |
| GB | 2286283 A | 8/1995 |
| GB | 2354394 A | 3/2001 |
| GB | 2357387 A | 6/2001 |
| GB | 2400958 A | 10/2004 |
| JP | 2001-103463 A | 4/2001 |
| JP | 2002-033839 A | 1/2002 |
| JP | 2002-125059 A | 4/2002 |
| JP | 2002-342863 A | 11/2002 |
| JP | 2002-344640 A | 11/2002 |
| JP | 2002-354137 A | 12/2002 |
| JP | 2002-368890 A | 12/2002 |
| JP | 2003-283696 A | 10/2003 |
| JP | 2004-128835 A | 4/2004 |
| JP | 2005-341040 A | 12/2005 |
| JP | 2006-147650 A | 6/2006 |
| JP | 2006-262342 A | 9/2006 |
| JP | 2009-008925 A | 1/2009 |
| KR | 10-2010-0041542 A | 4/2010 |
| WO | 1998/39894 A1 | 9/1998 |
| WO | 2001/13638 A1 | 2/2001 |

(56) References Cited

FOREIGN PATENT DOCUMENTS

| | | |
|---|---|---|
| WO | 2001/93220 A1 | 12/2001 |
| WO | 2002/085019 A1 | 10/2002 |
| WO | 2003/028375 A1 | 4/2003 |
| WO | 2003/096696 A1 | 11/2003 |
| WO | 2006/038760 A1 | 4/2006 |
| WO | 2006/067782 A1 | 6/2006 |
| WO | 2007/125143 A1 | 8/2007 |

* cited by examiner

ILLUMINATED SIGNAL DEVICE FOR AUDIO/VIDEO RECORDING AND COMMUNICATION DEVICES

CROSS-REFERENCE TO RELATED APPLICATIONS

This application is a continuation of U.S. application Ser. No. 15/679,138, filed on Aug. 16, 2017, which claims priority to U.S. Application Ser. No. 62/376,826, filed on Aug. 18, 2016. The entire contents of the aforementioned applications are hereby incorporated by reference as if fully set forth.

TECHNICAL FIELD

The present embodiments relate to audio/video (A/V) recording and communication devices, including A/V recording and communication doorbell systems. In particular, the present embodiments provide a speed detector, which may be a standalone device or a component of an illuminated signal device in an A/V recording and communication system.

BACKGROUND

Home safety is a concern for many homeowners and renters. Those seeking to protect or monitor their homes often wish to have video and audio communications with visitors, for example, those visiting an external door or entryway. Audio/Video (A/V) recording and communication devices, such as doorbells, provide this functionality, and can also aid in crime detection and prevention. For example, audio and/or video captured by an A/V recording and communication device can be uploaded to the cloud and recorded on a remote server. Subsequent review of the A/V footage can aid law enforcement in capturing perpetrators of home burglaries and other crimes. Further, the presence of one or more A/V recording and communication devices on the exterior of a home, such as a doorbell unit at the entrance to the home, acts as a powerful deterrent against would-be burglars.

SUMMARY

The various embodiments of the present illuminated signal device and speed detector for audio/video (A/V) recording and communication devices have several features, no single one of which is solely responsible for their desirable attributes. Without limiting the scope of the present embodiments as expressed by the claims that follow, their more prominent features now will be discussed briefly. After considering this discussion, and particularly after reading the section entitled "Detailed Description," one will understand how the features of the present embodiments provide the advantages described herein.

One aspect of the present embodiments includes the realization that the crime deterrent effect created by A/V recording and communication devices may correlate with the visibility of such devices. For example, a would-be perpetrator is more likely to be deterred from committing a crime by a security camera if he or she is aware of the security camera. Therefore, the crime deterrent value of A/V recording and communication devices may be enhanced by increasing their visibility. One way to increase the visibility of an A/V recording and communication device is with a sign that informs those who view it that the area around the sign is within the field of view of one or more A/V recording and communication devices. In one non-limiting example, the present illuminated sign can be placed anywhere outside a home or business, or any other premises protected by one or more A/V recording and communication devices, such as in a front yard or a back yard.

Another aspect of the present embodiments includes the realization that A/V recording and communication devices may be less visible at night, when ambient light is typically lower or absent entirely. Therefore, a source of illumination would likely enhance the crime deterrent value of a sign that informs those who view it that the area around the sign is within the field of view of one or more A/V recording and communication devices. Further, if the illuminated sign were motion activated, such that the sign lit up only when motion was detected, the sudden illumination of the sign would provide an additional deterrent effect by surprising would-be perpetrators and likely scaring them off. Further, if the illuminated sign played audio when motion was detected, or in response to user intervention, or in response to signals received from a home alarm/security system, the audio would provide an additional deterrent effect by surprising would-be perpetrators and likely scaring them off.

Another aspect of the present embodiments includes the realization that cars speeding through a neighborhood present a danger to every person in that neighborhood. Therefore, one way to make neighborhoods safer is by reducing speeding. The present embodiments empower neighborhood residents to apply social pressure to problem speeders, thereby encouraging those speeders to alter their speeding behavior. For example, some of the present embodiments include a speed detector. The speed detector may be a standalone device, or may be integrated into another device, such as an illuminated signal device in an A/V recording and communication system. Speed data from the speed detector, along with image data (e.g., a photograph and/or a video) of the speeding car, may be posted to a social network. The social network post may be seen by others who live in the neighborhood where the photograph and/or video of the speeding car was taken. Those persons may then apply pressure to the speeder, encouraging him or her not to speed through the neighborhood anymore. Further, the social network post may provide a warning to others who live in the neighborhood where the photograph and/or video of the speeding car was taken, encouraging those people who see the social network post to be watchful for the speeding car so that they are not endangered by the speeder in the future.

In a first aspect, an illuminated signal device for providing a warning message of a passing vehicle is provided, the device comprising a speed detecting module, a communication module, and a processing module operatively connected to the speed detecting module and the communication module, the processing module comprising a processor, and a speed detecting application, wherein the speed detecting application configures the processor to detect motion of the passing vehicle using the speed detecting module, obtain speed data of the passing vehicle using the speed detecting module, and transmit the obtained speed data to a backend server, using the communication module, for providing the warning message of the passing vehicle to at least one social network.

An embodiment of the first aspect further comprises a camera, wherein the processing module is operatively connected to the camera.

In another embodiment of the first aspect, the speed detecting application further configures the processor to obtain image data of the passing vehicle using the camera.

In another embodiment of the first aspect, the speed detecting application further configures the processor to transmit the obtained image data to the backend server using the communication module.

In another embodiment of the first aspect, the illuminated signal device is in network communication with at least one other device having a camera.

In another embodiment of the first aspect, the speed detecting application further configures the processor to transmit a first command signal to the at least one other device to obtain image data of the passing vehicle.

In another embodiment of the first aspect, the speed detecting application further configures the processor to receive the obtained image data from the at least one other device and transmit the obtained image data to the backend server using the communication module.

In another embodiment of the first aspect, the at least one other device is configured to transmit the obtained image data to the backend server upon obtaining the image data.

In another embodiment of the first aspect, the speed detecting application further configures the processor to transmit a second command signal to the at least one other device to transmit the obtained image data to the backend server.

In another embodiment of the first aspect, the speed detecting module comprises at least one passive infrared (PIR) sensor.

In another embodiment of the first aspect, the speed detecting module comprises a radar device.

In another embodiment of the first aspect, the speed detecting module comprises a lidar device.

Another embodiment of the first aspect further comprises a power source, wherein the power source provides power to the illuminated signal device.

In another embodiment of the first aspect, the power source comprises at least one rechargeable battery.

Another embodiment of the first aspect further comprises at least one solar panel, wherein the at least one solar panel is configured to charge the rechargeable battery.

Another embodiment of the first aspect further comprises a front panel and an illumination source, wherein the illumination source is configured to illuminate the front panel to provide a warning that the area adjacent the illuminated signal device is within a field of view of an audio/video (A/V) recording and communication device.

In another embodiment of the first aspect, the illumination source comprises a plurality of light-emitting diodes (LEDs) distributed evenly about an interior perimeter of the illuminated signal device.

Another embodiment of the first aspect further comprises a frame, wherein the frame is configured to receive at least one outer edge of the front panel.

Another embodiment of the first aspect further comprises a stake configured to be driven into the ground and configured to provide support to the frame.

In another embodiment of the first aspect, the front panel and the frame comprise an interior space that contains and protects components of the illuminated signal device.

In another embodiment of the first aspect, the speed detecting application further configures the processor to compare the obtained speed data to a threshold speed, and to transmit the obtained speed data to the backend server only when the obtained speed data indicates a speed greater than the threshold speed.

In another embodiment of the first aspect, the threshold speed is set using a speed limit input from a user.

In another embodiment of the first aspect, the threshold speed is set using a geographic location of the illuminated signal device.

In a second aspect, a method for providing a warning message of a passing vehicle using an illuminated signal device is provided, the method comprising detecting motion of the passing vehicle using a speed detecting module, obtaining speed data of the passing vehicle using the speed detecting module, and transmitting the obtained speed data to a backend server, using a communication module, for providing the warning message of the passing vehicle to at least one social network.

In an embodiment of the second aspect, the illuminated signal device is operatively connected to the camera.

Another embodiment of the second aspect further comprises obtaining image data of the passing vehicle using the camera.

Another embodiment of the second aspect further comprises transmitting the obtained image data to the backend server using the communication module.

In another embodiment of the second aspect, the illuminated signal device is in network communication with at least one other device.

Another embodiment of the second aspect further comprises transmitting a first command signal to the at least one other device to obtain image data of the passing vehicle.

Another embodiment of the second aspect further comprises receiving the obtained image data from the at least one other device and transmitting the obtained image data to the backend server using the communication module.

In another embodiment of the second aspect, the at least one other device is configured to transmit the obtained image data to the backend server upon obtaining the image data.

Another embodiment of the second aspect further comprises transmitting a second command signal to the at least one other device to transmit the obtained image data to the backend server.

In another embodiment of the second aspect, the speed detecting module comprises at least one passive infrared (PIR) sensor.

In another embodiment of the second aspect, the speed detecting module comprises a radar device.

In another embodiment of the second aspect, the speed detecting module comprises a lidar device.

In another embodiment of the second aspect, the illuminated signal device further comprises a power source to provide power to the illuminated signal device.

In another embodiment of the second aspect, the power source comprises at least one rechargeable battery.

In another embodiment of the second aspect, the illuminated signal device further comprises at least one solar panel configured to charge the rechargeable battery.

In another embodiment of the second aspect, the illuminate signal device further comprises a front panel and an illumination source, wherein the illumination source is configured to illuminate the front panel to provide a warning that the area adjacent the illuminated signal device is within a field of view of an audio/video (A/V) recording and communication device.

In another embodiment of the second aspect, the illumination source comprises a plurality of light-emitting diodes (LEDs) distributed evenly about an interior perimeter of the illuminated signal device.

In another embodiment of the second aspect, the illuminated signal device further comprises a frame configured to receive at least one outer edge of the front panel.

In another embodiment of the second aspect, the illuminated signal device further comprises a stake configured to be driven into the ground and provide support to the frame.

In another embodiment of the second aspect, the front panel and the frame comprise an interior space that contains and protects components of the illuminated signal device.

Another embodiment of the second aspect further comprises comparing the obtained speed data to a threshold speed, and transmitting the obtained speed data to the backend server only when the obtained speed data indicates a speed greater than a threshold speed.

In another embodiment of the second aspect, the threshold speed is set using a speed limit input from a user.

In another embodiment of the second aspect, the threshold speed is set using a geographic location of the illuminated signal device.

In a third aspect, a speed detector for providing a warning message of a passing vehicle is provided, the speed detector comprising a speed detecting module, a communication module, and a processing module operatively connected to the speed detecting module and the communication module, the processing module comprising a processor, and a speed detecting application, wherein the speed detecting application configures the processor to detect motion of the passing vehicle using the speed detecting module, obtain speed data of the passing vehicle using the speed detecting module, and transmit the obtained speed data to a backend server, using the communication module, for providing the warning message of the passing vehicle to at least one social network.

Another embodiment of the third aspect further comprises a camera, wherein the processing module is operatively connected to the camera.

In another embodiment of the third aspect, the speed detecting application further configures the processor to obtain image data of the passing vehicle using the camera.

In another embodiment of the third aspect, the speed detecting application further configures the processor to transmit the obtained image data to the backend server using the communication module.

In another embodiment of the third aspect, the speed detector is in network communication with at least one other device.

In another embodiment of the third aspect, the speed detecting application further configures the processor to transmit a first command signal to the at least one other device to obtain image data of the passing vehicle.

In another embodiment of the third aspect, the speed detecting application further configures the processor to receive the obtained image data from the at least one other device and transmit the obtained image data to the backend server using the communication module.

In another embodiment of the third aspect, the at least one other device is configured to transmit the obtained image data to the backend server upon obtaining the image data.

In another embodiment of the third aspect, the speed detecting application further configures the processor to transmit a second command signal to the at least one other device to transmit the obtained image data to the backend server.

In another embodiment of the third aspect, the speed detecting module comprises at least one passive infrared (PIR) sensor.

In another embodiment of the third aspect, the speed detecting module comprises a radar device.

In another embodiment of the third aspect, the speed detecting module comprises a lidar device.

Another embodiment of the third aspect further comprises a power source, wherein the power source provides power to the speed detector.

In another embodiment of the third aspect, the power source comprises at least one rechargeable battery.

Another embodiment of the third aspect further comprises at least one solar panel, wherein the at least one solar panel is configured to charge the rechargeable battery.

Another embodiment of the third aspect further comprises a front panel and an illumination source, wherein the illumination source is configured to illuminate the front panel to provide a warning that the area adjacent the speed detector is within a field of view of an audio/video (A/V) recording and communication device.

In another embodiment of the third aspect, the illumination source comprises a plurality of light-emitting diodes (LEDs) distributed evenly about an interior perimeter of the speed detector.

Another embodiment of the third aspect further comprises a frame, wherein the frame is configured to receive at least one outer edge of the front panel.

Another embodiment of the third aspect further comprises a stake configured to be driven into the ground and configured to provide support to the frame.

In another embodiment of the third aspect, the front panel and the frame comprise an interior space that contains and protects components of the speed detector.

In another embodiment of the third aspect, the speed detecting application further configures the processor to compare the obtained speed data to a threshold speed, and transmit the obtained speed data to the backend server only when the obtained speed data indicates a speed greater than a threshold speed.

In another embodiment of the third aspect, the threshold speed is set using a speed limit input from a user.

In another embodiment of the third aspect, the threshold speed is set using a geographic location of the illuminated signal device.

In a fourth aspect, a method for providing a warning message of a passing vehicle from an illuminated signal device is provided, the method comprising receiving speed data of the passing vehicle from the illuminated signal device, receiving source identifying data of the received speed data from the illuminated signal device, determining at least one social network to transmit the warning message based upon the received source identifying data, generating the warning message using the received speed data, and transmitting the generated warning message to the at least one social network.

Another embodiment of the fourth aspect further comprises receiving image data from the illuminated signal device.

In another embodiment of the fourth aspect, the generating the warning message further uses the received image data.

Another embodiment of the fourth aspect further comprises receiving image data from at least one other device in network communication with the illuminated signal device.

In another embodiment of the fourth aspect, the generating the warning message further uses the received image data.

Another embodiment of the fourth aspect further comprises receiving source identifying data of the received image data from the at least one other device.

In another embodiment of the fourth aspect, the determining the at least one social network to transmit the warning message is further based upon the received source identifying data of the received image data from the at least one other device.

In a fifth aspect, an illuminated signal device for capturing image data of a passing vehicle is provided, the device comprising: a camera; a communication module; and a processing module operatively connected to the camera and the communication module, the processing module comprising: a processor; and an application, wherein the application configures the processor to: detect motion of the passing vehicle using the camera; obtain image data of the passing vehicle using the camera; and transmit the obtained image data to a backend server using the communication module.

In an embodiment of the fifth aspect, the illuminated signal device further comprises a power source, wherein the power source provides power to the illuminated signal device.

In another embodiment of the fifth aspect, the power source comprises at least one rechargeable battery.

In another embodiment of the fifth aspect, the illuminated signal device further comprises at least one solar panel, wherein the at least one solar panel is configured to charge the rechargeable battery.

In another embodiment of the fifth aspect, the illuminated signal device further comprises a front panel and an illumination source, wherein the illumination source is configured to illuminate the front panel to provide a warning that the area adjacent the illuminated signal device is within a field of view of an audio/video (A/V) recording and communication device.

In another embodiment of the fifth aspect, the illumination source comprises a plurality of light-emitting diodes (LEDs) distributed evenly about an interior perimeter of the illuminated signal device.

In another embodiment of the fifth aspect, the illuminated signal device further comprises a frame, wherein the frame is configured to receive at least one outer edge of the front panel.

In another embodiment of the fifth aspect, the illuminated signal device further comprises a stake configured to be driven into the ground and configured to provide support to the frame.

In another embodiment of the fifth aspect, the front panel and the frame comprise an interior space that contains and protects components of the illuminated signal device.

In a sixth aspect, an illuminated signal device for capturing image data is provided, the device comprising: a camera having a field of view; a communication module; and a processing module operatively connected to the camera and the communication module, the processing module comprising: a processor; and a signal device application, wherein the signal device application configures the processor to: detect motion within the field of view of the camera; capture image data in response to the detected motion; and transmit the image data to a backend server using the communication module.

In an embodiment of the sixth aspect, the signal device application further configures the processor to detect the motion using the camera.

In another embodiment of the sixth aspect, the illuminated signal device further comprises at least one passive infrared (PIR) motion sensor, wherein the at least one motion sensor is operatively connected to the processing module.

In another embodiment of the sixth aspect, the signal device application further configures the processor to detect the motion using the at least one motion sensor.

In another embodiment of the sixth aspect, the at least one motion sensor comprises at least one passive infrared (PIR) sensor.

In another embodiment of the sixth aspect, the illuminated signal device further comprises a radar device, wherein the radar device is operatively connected to the processing module.

In another embodiment of the sixth aspect, the detected motion comprises a passing vehicle, and wherein the signal device application further configures the processor to obtain speed data of the passing vehicle using the radar device.

In another embodiment of the sixth aspect, the signal device application further configures the processor to transmit the obtained speed data to the backend server, using the communication module.

In another embodiment of the sixth aspect, the signal device application further configures the processor to compare the obtained speed data to a threshold speed, and to transmit the obtained speed data to the backend server only when the obtained speed data indicates a speed greater than the threshold speed.

In another embodiment of the sixth aspect, the threshold speed is set using a speed limit input from a user.

In another embodiment of the sixth aspect, the threshold speed is set using a geographic location of the illuminated signal device.

In a seventh aspect, an illuminated signal device for streaming image data to a client device associated with an audio/video (A/V) recording and communication device is provided, the illuminated signal device comprising: a power source configured to provide power to the illuminated signal device; a front panel and an illumination source, wherein the illumination source is configured to illuminate the front panel to provide a warning that the area adjacent the illuminated signal device is within a field of view of the A/V recording and communication device; and a frame at least partially surrounding a perimeter of the front panel; wherein the front panel and the frame comprise an interior space that houses: a camera having a field of view; a communication module; and a processing module operatively connected to the camera and the communication module, the processing module comprising: a processor; and a signal device application, wherein the signal device application configures the processor to: detect a person to be within the field of view of the camera; capture image data of the person using the camera; and transmit the image data to a backend server using the communication module.

In an embodiment of the seventh aspect, the signal device application further configures the processor to detect the person to be within the field of view of the camera using the camera.

In another embodiment of the seventh aspect, the illuminated signal device further comprises at least one motion sensor, wherein the at least one motion sensor is operatively connected to the processing module.

In another embodiment of the seventh aspect, the signal device application further configures the processor to detect the person to be within the field of view of the camera using the at least one motion sensor.

In another embodiment of the seventh aspect, the at least one motion sensor comprises at least one passive infrared (PIR) sensor.

In another embodiment of the seventh aspect, the signal device application further configures the processor to transmit a request from the illuminated signal device to the backend server using the A/V recording and communication device, and to connect the illuminated signal device to the client device associated with the A/V recording and communication device.

In another embodiment of the seventh aspect, the signal device application further configures the processor to receive, from the backend server, a confirmation that a user has accepted the request to connect the illuminated signal device to the client device associated with the A/V recording and communication device.

In another embodiment of the seventh aspect, the signal device application further configures the processor to transmit, from the illuminated signal device to the client device, the image data upon receiving the confirmation that the user has accepted the request to connect the illuminated signal device to the client device.

In another embodiment of the seventh aspect, the signal device application further configures the processor to receive, from the backend server, a confirmation that the user has denied the request to connect the illuminated signal device to the client device.

In another embodiment of the seventh aspect, the signal device application further configures the processor to terminate attempts to connect the illuminated signal device to the client device.

In another embodiment of the seventh aspect, the signal device application further configures the processor to terminate attempts to connect the illuminated signal device to the client device after a predetermined time interval.

In another embodiment of the seventh aspect, the power source comprises at least one rechargeable battery.

In another embodiment of the seventh aspect, the illuminated signal device further comprises at least one solar panel, wherein the at least one solar panel is configured to charge the at least one rechargeable battery.

In another embodiment of the seventh aspect, the illumination source comprises a plurality of light-emitting diodes (LEDs) distributed evenly about an interior perimeter of the illuminated signal device.

BRIEF DESCRIPTION OF THE DRAWINGS

The various embodiments of the present illuminated signal device and speed detector for audio/video (A/V) recording and communication devices now will be discussed in detail with an emphasis on highlighting the advantageous features. These embodiments depict the novel and non-obvious illuminated signal device and speed detector for audio/video (A/V) recording and communication devices shown in the accompanying drawings, which are for illustrative purposes only. These drawings include the following figures, in which like numerals indicate like parts.

DETAILED DESCRIPTION

Figure 1:
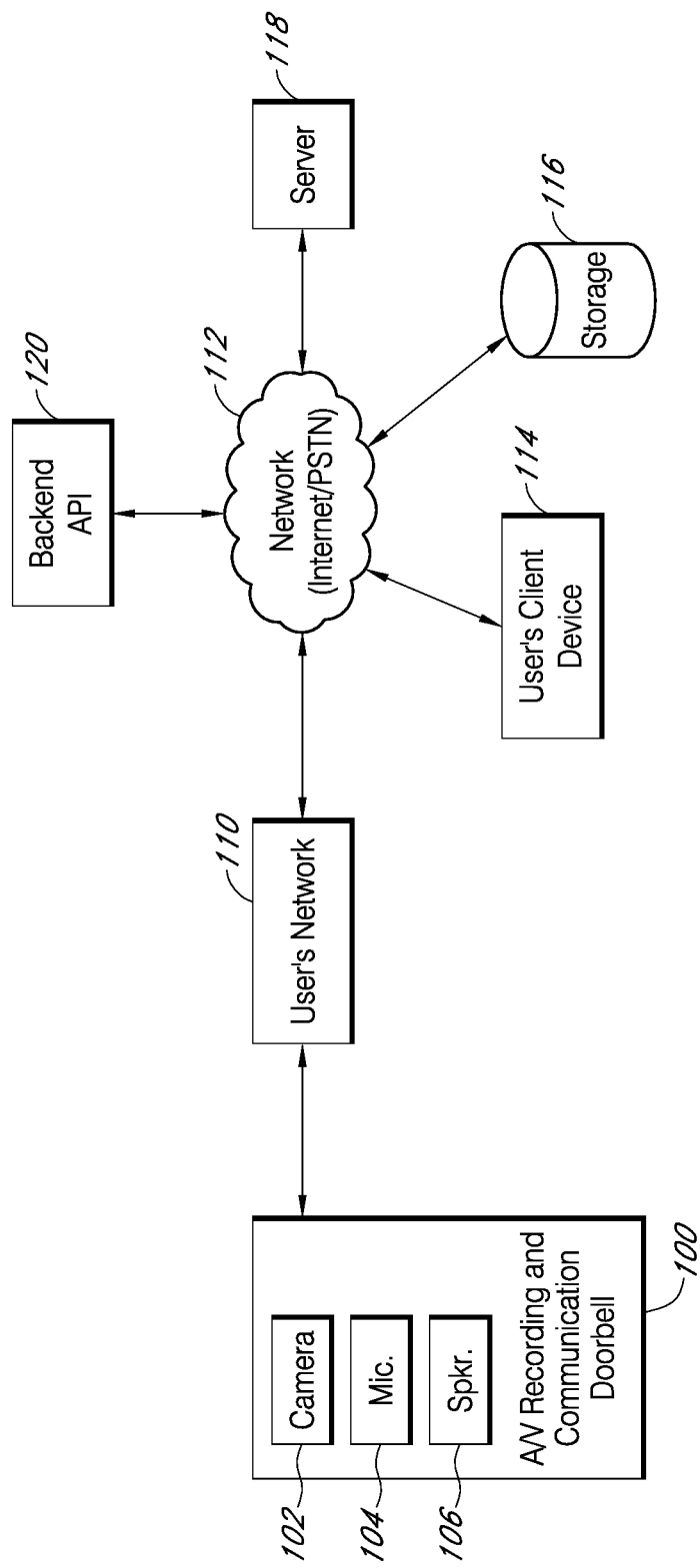
FIG. 1 is a functional block diagram illustrating a system for streaming and storing A/V content captured by an audio/video (A/V) recording and communication device according the present embodiments.

The following detailed description describes the present embodiments with reference to the drawings. In the drawings, reference numbers label elements of the present embodiments. These reference numbers are reproduced below in connection with the discussion of the corresponding drawing features.

The embodiments of the present illuminated sign for audio/video (A/V) recording and communication devices are described below with reference to the figures. These figures, and their written descriptions, indicate that certain components of the apparatus are formed integrally, and certain other components are formed as separate pieces. Those of ordinary skill in the art will appreciate that components shown and described herein as being formed integrally may in alternative embodiments be formed as separate pieces. Those of ordinary skill in the art will further appreciate that components shown and described herein as being formed as separate pieces may in alternative embodiments be formed integrally. Further, as used herein the term integral describes a single unitary piece.

With reference to FIG. 1, the present embodiments include an audio/video (A/V) recording and communication device, such as a doorbell 100. While the present disclosure provides numerous examples of methods and systems including A/V recording and communication doorbells, the present embodiments are equally applicable for A/V recording and communication devices other than doorbells. For example, the present embodiments may include one or more A/V recording and communication security cameras instead of, or in addition to, one or more A/V recording and communication doorbells. An example A/V recording and communication security camera may include substantially all of the structure and functionality of the doorbells described herein, but without the front button and related components.

The A/V recording and communication doorbell 100 may be located near the entrance to a structure (not shown), such as a dwelling, a business, a storage facility, etc. The A/V recording and communication doorbell 100 includes a camera 102, a microphone 104, and a speaker 106. The camera 102 may comprise, for example, a high definition (HD) video camera, such as one capable of capturing video images at an image display resolution of 720p or better. While not shown, the A/V recording and communication doorbell 100 may also include other hardware and/or components, such as a housing, one or more motion sensors (and/or other types of sensors), a button, etc. The A/V recording and communication doorbell 100 may further include similar componentry and/or functionality as the wireless communication doorbells described in US Patent Application Publication Nos. 2015/0022620 (application Ser. No. 14/499,828) and 2015/0022618 (application Ser. No. 14/334,922), both of which are incorporated herein by reference in their entireties as if fully set forth.

With further reference to FIG. 1, the A/V recording and communication doorbell 100 communicates with a user's network 110, which may be for example a wired and/or wireless network. If the user's network 110 is wireless, or includes a wireless component, the network 110 may be a Wi-Fi network compatible with the IEEE 802.11 standard and/or other wireless communication standard(s). The user's network 110 is connected to another network 112, which may comprise, for example, the Internet and/or a public switched telephone network (PSTN). As described below, the A/V recording and communication doorbell 100 may communicate with the user's client device 114 via the user's network 110 and the network 112 (Internet/PSTN). The user's client device 114 may comprise, for example, a mobile telephone (may also be referred to as a cellular telephone), such as a smartphone, a personal digital assistant (PDA), or another communication and/or computing device. The user's client device 114 comprises a display (not shown) and related components capable of displaying streaming and/or recorded video images. The user's client device 114 may also comprise a speaker and related components capable of broadcasting streaming and/or recorded audio, and may also comprise a microphone. The A/V recording and communication doorbell 100 may also communicate with one or more remote storage device(s) 116 (may be referred to interchangeably as "cloud storage device(s)"), one or more servers 118, and/or a backend API (application programming interface) 120 via the user's network 110 and the network 112 (Internet/PSTN). While FIG. 1 illustrates the storage device 116, the server 118, and the backend API 120 as components separate from the network 112, it is to be understood that the storage device 116, the server 118, and/or the backend API 120 may be considered to be components of the network 112.

The network 112 may be any wireless network or any wired network, or a combination thereof, configured to operatively couple the above-mentioned modules, devices, and systems as shown in FIG. 1. For example, the network 112 may include one or more of the following: a PSTN (public switched telephone network), the Internet, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital $T_1$, $T_3$, E1 or E3 line, a Digital Data Service (DDS) connection, a DSL (Digital Subscriber Line) connection, an Ethernet connection, an ISDN (Integrated Services Digital Network) line, a dial-up port such as a V.90, V.34, or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), LTE, VoLTE, LoRaWAN, LPWAN, RPMA, LTE, Cat-"X" (e.g. LTE Cat 1, LTE Cat 0, LTE CatM1, LTE Cat NB1), CDMA (Code Division Multiple Access), TDMA (Time Division Multiple Access), FDMA (Frequency Division Multiple Access), and/or OFDMA (Orthogonal Frequency Division Multiple Access) cellular phone networks, GPS, CDPD (cellular digital packet data), RIM (Research in Motion, Limited) duplex paging network, Bluetooth radio, or an IEEE 802.11-based radio frequency network. The network can further include or interface with any one or more of the following: RS-232 serial connection, IEEE-1394 (Firewire) connection, Fibre Channel connection, IrDA (infrared) port, SCSI (Small Computer Systems Interface) connection, USB (Universal Serial Bus) connection, or other wired or wireless, digital or analog, interface or connection, mesh or Digi® networking.

According to one or more aspects of the present embodiments, when a person (may be referred to interchangeably as "visitor") arrives at the A/V recording and communication doorbell 100, the A/V recording and communication doorbell 100 detects the visitor's presence and begins capturing video images within a field of view of the camera 102. The A/V recording and communication doorbell 100 may also capture audio through the microphone 104. The A/V recording and communication doorbell 100 may detect the visitor's presence using a motion sensor, and/or by detecting that the visitor has depressed the button on the A/V recording and communication doorbell 100.

In response to the detection of the visitor, the A/V recording and communication doorbell 100 sends an alert to the user's client device 114 (FIG. 1) via the user's network 110 and the network 112. The A/V recording and communication doorbell 100 also sends streaming video, and may also send streaming audio, to the user's client device 114. If the user answers the alert, two-way audio communication may then occur between the visitor and the user through the A/V recording and communication doorbell 100 and the user's client device 114. The user may view the visitor throughout the duration of the call, but the visitor cannot see the user (unless the A/V recording and communication doorbell 100 includes a display, which it may in some embodiments).

The video images captured by the camera 102 of the A/V recording and communication doorbell 100 (and the audio captured by the microphone 104) may be uploaded to the cloud and recorded on the remote storage device 116 (FIG. 1). In some embodiments, the video and/or audio may be recorded on the remote storage device 116 even if the user chooses to ignore the alert sent to his or her client device 114.

With further reference to FIG. 1, the system may further comprise a backend API 120 including one or more components. A backend API (application programming interface) may comprise, for example, a server (e.g. a real server, or a virtual machine, or a machine running in a cloud infrastructure as a service), or multiple servers networked together, exposing at least one API to client(s) accessing it. These servers may include components such as application servers (e.g. software servers), depending upon what other components are included, such as a caching layer, or database layers, or other components. A backend API may, for example, comprise many such applications, each of which communicate with one another using their public APIs. In some embodiments, the API backend may hold the bulk of the user data and offer the user management capabilities, leaving the clients to have very limited state.

The backend API 120 illustrated FIG. 1 may include one or more APIs. An API is a set of routines, protocols, and tools for building software and applications. An API expresses a software component in terms of its operations, inputs, outputs, and underlying types, defining functionalities that are independent of their respective implementations, which allows definitions and implementations to vary without compromising the interface. Advantageously, an API may provide a programmer with access to an application's functionality without the programmer needing to modify the application itself, or even understand how the application works. An API may be for a web-based system, an operating system, or a database system, and it provides facilities to develop applications for that system using a given programming language. In addition to accessing databases or computer hardware like hard disk drives or video cards, an API can ease the work of programming GUI components. For example, an API can facilitate integration of new features into existing applications (a so-called "plug-in API"). An API can also assist otherwise distinct applications with sharing data, which can help to integrate and enhance the functionalities of the applications.

The backend API 120 illustrated in FIG. 1 may further include one or more services (also referred to as network services). A network service is an application that provides data storage, manipulation, presentation, communication, and/or other capability. Network services are often implemented using a client-server architecture based on application-layer network protocols. Each service may be provided by a server component running on one or more computers (such as a dedicated server computer offering multiple services) and accessed via a network by client components running on other devices. However, the client and server components can both be run on the same machine. Clients and servers may have a user interface, and sometimes other hardware associated with them.

Figure 2:
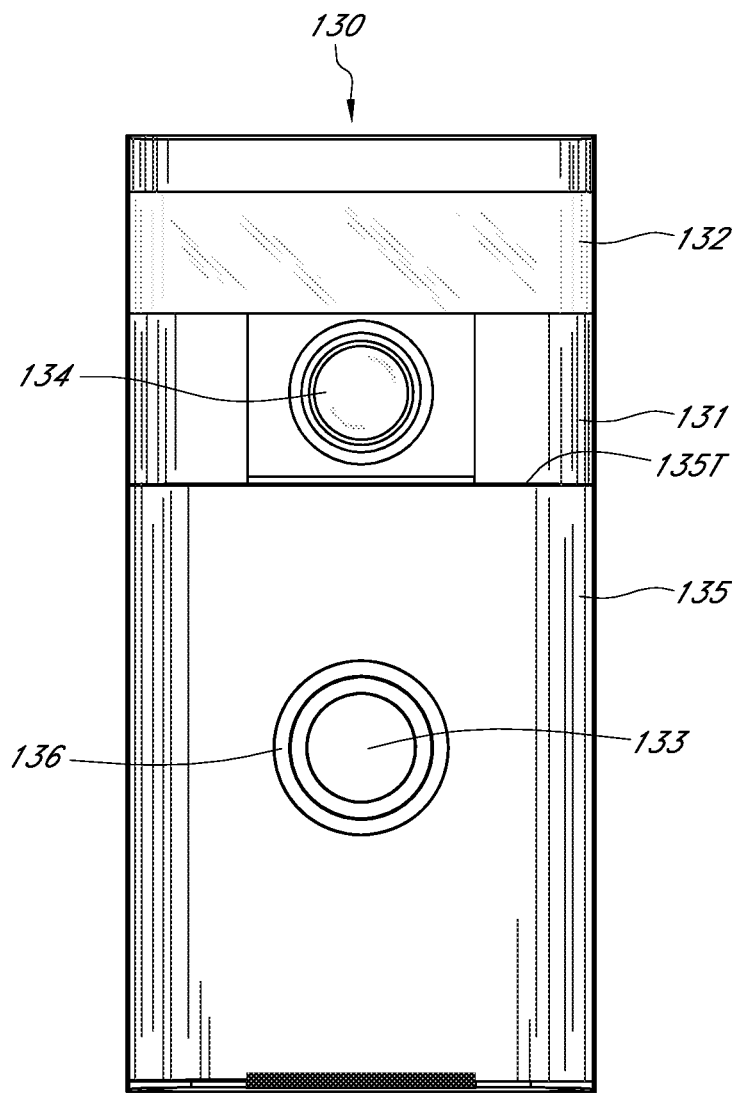
FIG. 2 is a front view of an A/V recording and communication doorbell according to an aspect of the present disclosure.
Figure 3:
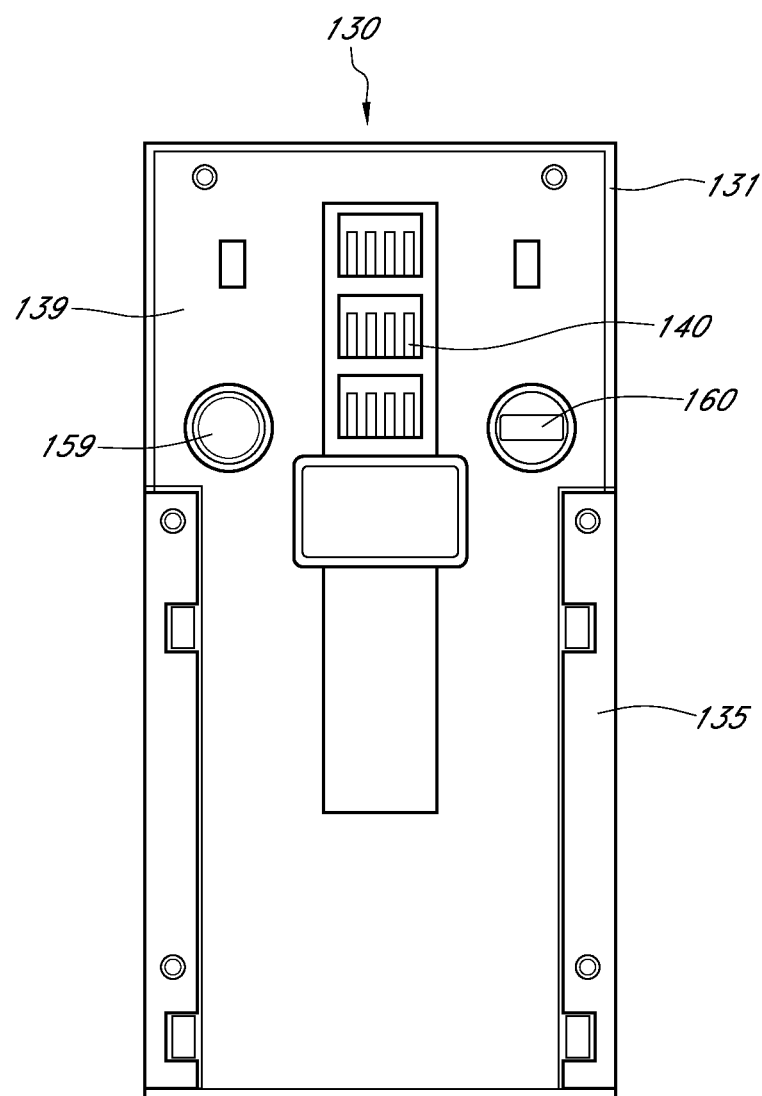
FIG. 3 is a rear view of the A/V recording and communication doorbell of FIG. 2.
Figure 4:
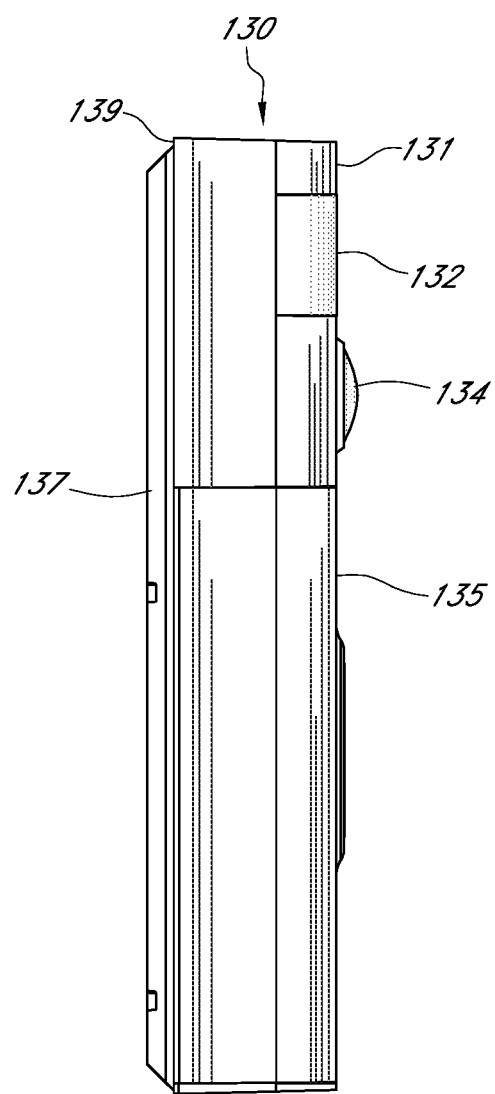
FIG. 4 is a left side view of the A/V recording and communication doorbell of FIG. 2 attached to a mounting bracket according to an aspect of the present disclosure.

FIGS. 2-4 illustrate an audio/video (A/V) communication doorbell 130 according to an aspect of present embodiments. FIG. 2 is a front view, FIG. 3 is a rear view, and FIG. 4 is a left side view of the doorbell 130 coupled with a mounting bracket 137. The doorbell 130 includes a faceplate 135 mounted to a back plate 139 (FIG. 3). With reference to FIG. 4, the faceplate 135 has a substantially flat profile. The faceplate 135 may comprise any suitable material, including, without limitation, metals, such as brushed aluminum or stainless steel, metal alloys, or plastics. The faceplate 135 protects the internal contents of the doorbell 130 and serves as an exterior front surface of the doorbell 130.

With reference to FIG. 2, the faceplate 135 includes a button 133 and a light pipe 136. The button 133 and the light pipe 136 may have various profiles that may or may not match the profile of the faceplate 135. The light pipe 136 may comprise any suitable material, including, without limitation, transparent plastic, that is capable of allowing light produced within the doorbell 130 to pass through. The light may be produced by one or more light-emitting components, such as light-emitting diodes (LED's), contained within the doorbell 130, as further described below. The button 133 may make contact with a button actuator (not shown) located within the doorbell 130 when the button 133 is pressed by a visitor. When pressed, the button 133 may trigger one or more functions of the doorbell 130, as further described below.

With reference to FIGS. 2 and 4, the doorbell 130 further includes an enclosure 131 that engages the faceplate 135. In the illustrated embodiment, the enclosure 131 abuts an upper edge 135T (FIG. 2) of the faceplate 135, but in alternative embodiments one or more gaps between the enclosure 131 and the faceplate 135 may facilitate the passage of sound and/or light through the doorbell 130. The enclosure 131 may comprise any suitable material, but in some embodiments the material of the enclosure 131 preferably permits infrared light to pass through from inside the doorbell 130 to the environment and vice versa. The doorbell 130 further includes a lens 132. In some embodiments, the lens may comprise a Fresnel lens, which may be patterned to deflect incoming light into one or more infrared sensors located within the doorbell 130. The doorbell 130 further includes a camera 134, which captures video data when activated, as described below.

FIG. 3 is a rear view of the doorbell 130, according to an aspect of the present embodiments. As illustrated, the enclosure 131 may extend from the front of the doorbell 130 around to the back thereof and may fit snugly around a lip of the back plate 139. The back plate 139 may comprise any suitable material, including, without limitation, metals, such as brushed aluminum or stainless steel, metal alloys, or plastics. The back plate 139 protects the internal contents of the doorbell 130 and serves as an exterior rear surface of the doorbell 130. The faceplate 135 may extend from the front of the doorbell 130 and at least partially wrap around the back plate 139, thereby allowing a coupled connection between the faceplate 135 and the back plate 139. The back plate 139 may have indentations in its structure to facilitate the coupling.

With further reference to FIG. 3, spring contacts 140 may provide power to the doorbell 130 when mated with other conductive contacts connected to a power source. The spring contacts 140 may comprise any suitable conductive material, including, without limitation, copper, and may be capable of deflecting when contacted by an inward force, for example the insertion of a mating element. The doorbell 130 further comprises a connector 160, such as a micro-USB or other connector, whereby power and/or data may be supplied to and from the components within the doorbell 130. A reset button 159 may be located on the back plate 139, and may make contact with a button actuator (not shown) located within the doorbell 130 when the reset button 159 is pressed. When the reset button 159 is pressed, it may trigger one or more functions, as described below.

FIG. 4 is a left side profile view of the doorbell 130 coupled to the mounting bracket 137, according to an aspect of the present embodiments. The mounting bracket 137 facilitates mounting the doorbell 130 to a surface, such as the exterior of a building, such as a home or office. As illustrated in FIG. 4, the faceplate 135 may extend from the bottom of the doorbell 130 up to just below the camera 134, and connect to the back plate 139 as described above. The lens 132 may extend and curl partially around the side of the doorbell 130. The enclosure 131 may extend and curl around the side and top of the doorbell 130, and may be coupled to the back plate 139 as described above. The camera 134 may protrude slightly through the enclosure 131, thereby giving it a wider field of view. The mounting bracket 137 may couple with the back plate 139 such that they contact each other at various points in a common plane of contact, thereby creating an assembly including the doorbell 130 and the mounting bracket 137. The couplings described in this paragraph, and elsewhere, may be secured by, for example and without limitation, screws, interference fittings, adhesives, or other fasteners. Interference fittings may refer to a type of connection where a material relies on pressure and/or gravity coupled with the material's physical strength to support a connection to a different element.

Figure 5:
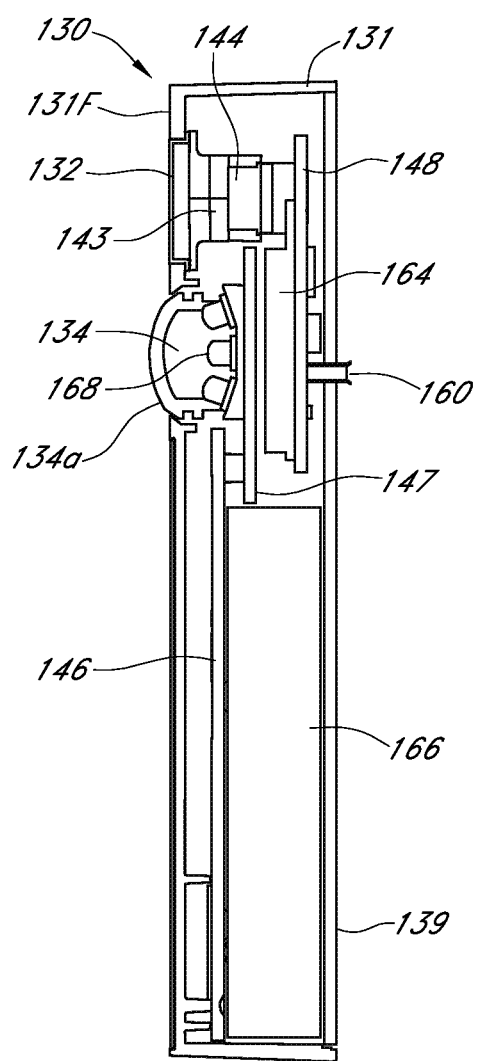
FIG. 5 is cross-sectional right side view of the A/V recording and communication doorbell of FIG. 2.

FIG. 5 is a right side cross-sectional view of the doorbell 130 without the mounting bracket 137. In the illustrated embodiment, the lens 132 is substantially coplanar with the front surface 131F of the enclosure 131. In alternative embodiments, the lens 132 may be recessed within the enclosure 131 or may protrude outward from the enclosure 131. The camera 134 is coupled to a camera printed circuit board (PCB) 147, and a lens 134a of the camera 134 protrudes through an opening in the enclosure 131. The camera lens 134a may be a lens capable of focusing light into the camera 134 so that clear images may be taken.

The camera PCB 147 may be secured within the doorbell with any suitable fasteners, such as screws, or interference connections, adhesives, etc. The camera PCB 147 comprises various components that enable the functionality of the camera 134 of the doorbell 130, as described below. Infrared light-emitting components, such as infrared LED's 168, are coupled to the camera PCB 147 and may be triggered to activate when a light sensor detects a low level of ambient light. When activated, the infrared LED's 168 may emit infrared light through the enclosure 131 and/or the camera 134 out into the ambient environment. The camera 134, which may be configured to detect infrared light, may then capture the light emitted by the infrared LED's 168 as it reflects off objects within the camera's 134 field of view, so that the doorbell 130 can clearly capture images at night (may be referred to as "night vision").

With continued reference to FIG. 5, the doorbell 130 further comprises a front PCB 146, which in the illustrated embodiment resides in a lower portion of the doorbell 130 adjacent a battery 166. The front PCB 146 may be secured within the doorbell 130 with any suitable fasteners, such as screws, or interference connections, adhesives, etc. The front PCB 146 comprises various components that enable the functionality of the audio and light components, as further described below. The battery 166 may provide power to the doorbell 130 components while receiving power from the spring contacts 140, thereby engaging in a trickle-charge method of power consumption and supply. Alternatively, the doorbell 130 may draw power directly from the spring contacts 140 while relying on the battery 166 only when the spring contacts 140 are not providing the power necessary for all functions.

With continued reference to FIG. 5, the doorbell 130 further comprises a power PCB 148, which in the illustrated embodiment resides behind the camera PCB 147. The power PCB 148 may be secured within the doorbell 130 with any suitable fasteners, such as screws, or interference connections, adhesives, etc. The power PCB 148 comprises various components that enable the functionality of the power and device-control components, as further described below.

With continued reference to FIG. 5, the doorbell 130 further comprises a communication module 164 coupled to the power PCB 148. The communication module 164 facilitates communication with client devices in one or more remote locations, as further described below. The connector 160 may protrude outward from the power PCB 148 and extend through a hole in the back plate 139. The doorbell 130 further comprises passive infrared (PIR) sensors 144, which are secured on or within a PIR sensor holder 143, and the assembly resides behind the lens 132. The PIR sensor holder 143 may be secured to the doorbell 130 with any suitable fasteners, such as screws, or interference connections, adhesives, etc. The PIR sensors 144 may be any type of sensor capable of detecting and communicating the presence of a heat source within their field of view. Further, alternative embodiments may comprise one or more motion sensors either in place of or in addition to the PIR sensors 144. The motion sensors may be configured to detect motion using any methodology, such as a methodology that does not rely on detecting the presence of a heat source within a field of view.

Figure 6:
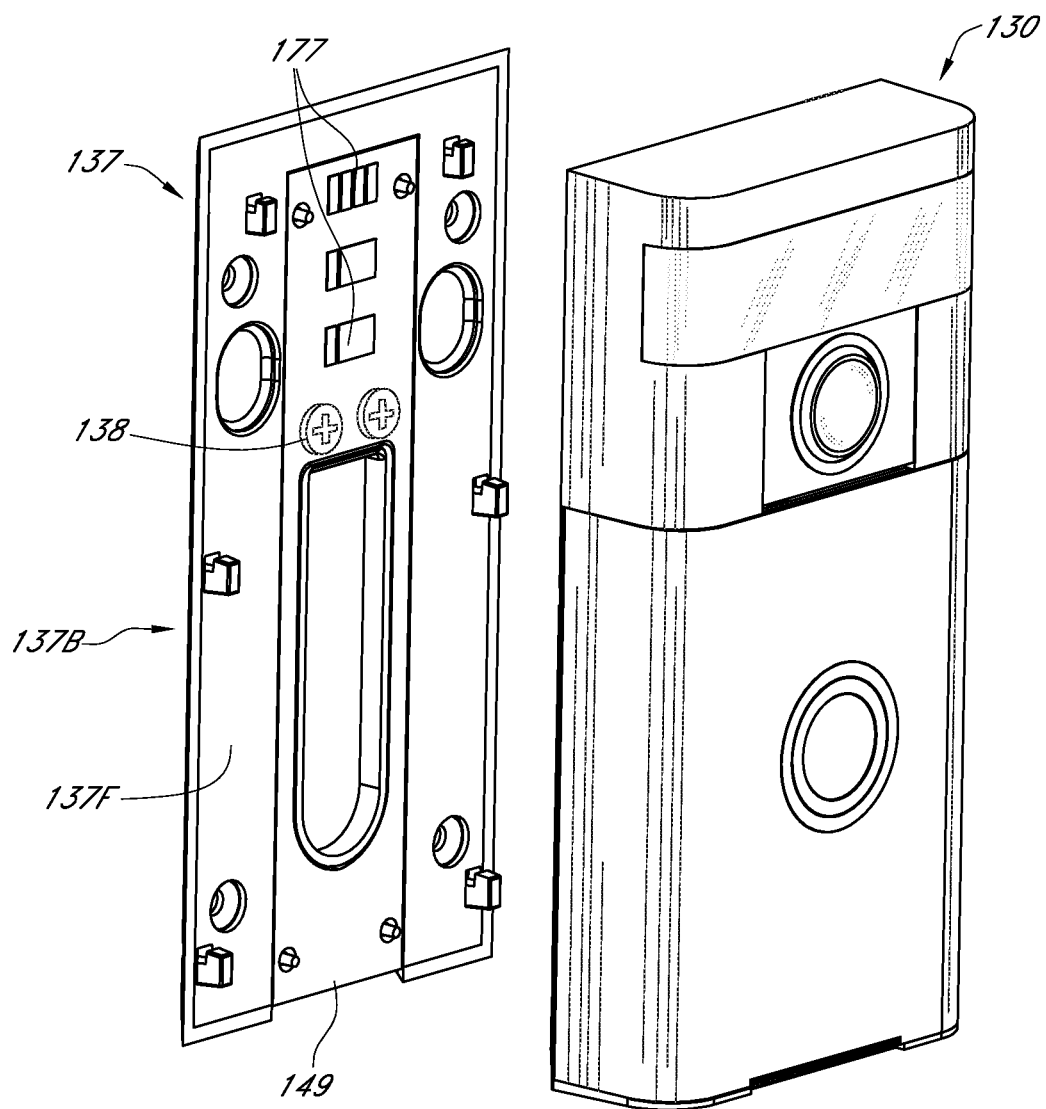
FIG. 6 is an exploded view of the A/V recording and communication doorbell and the mounting bracket of FIG. 4.

FIG. 6 is an exploded view of the doorbell 130 and the mounting bracket 137 according to an aspect of the present embodiments. The mounting bracket 137 is configured to be mounted to a mounting surface (not shown) of a structure, such as a home or an office. FIG. 6 shows the front side 137F of the mounting bracket 137. The mounting bracket 137 is configured to be mounted to the mounting surface such that the back side 137B thereof faces the mounting surface. In certain embodiments, the mounting bracket 137 may be mounted to surfaces of various composition, including, without limitation, wood, concrete, stucco, brick, vinyl siding, aluminum siding, etc., with any suitable fasteners, such as screws, or interference connections, adhesives, etc. The doorbell 130 may be coupled to the mounting bracket 137 with any suitable fasteners, such as screws, or interference connections, adhesives, etc.

With continued reference to FIG. 6, the illustrated embodiment of the mounting bracket 137 includes the terminal screws 138. The terminal screws 138 are configured to receive electrical wires adjacent the mounting surface of the structure upon which the mounting bracket 137 is mounted, so that the doorbell 130 may receive electrical power from the structure's electrical system. The terminal screws 138 are electrically connected to electrical contacts 177 of the mounting bracket. If power is supplied to the terminal screws 138, then the electrical contacts 177 also receive power through the terminal screws 138. The electrical contacts 177 may comprise any suitable conductive material, including, without limitation, copper, and may protrude slightly from the face of the mounting bracket 137 so that they may mate with the spring contacts 140 located on the back plate 139.

Figure 7:
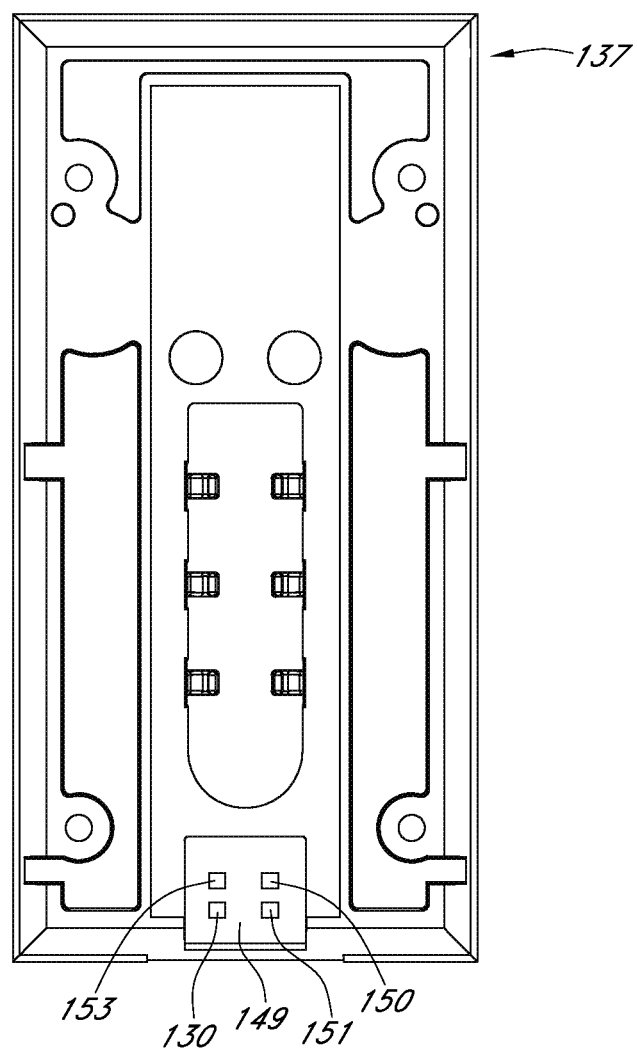
FIG. 7 is a rear view of the mounting bracket of FIG. 4.

With reference to FIGS. 6 and 7 (which is a rear view of the mounting bracket 137), the mounting bracket 137 further comprises a bracket PCB 149. With reference to FIG. 7, the bracket PCB 149 is situated outside the doorbell 130, and is therefore configured for various sensors that measure ambient conditions, such as an accelerometer 150, a barometer 151, a humidity sensor 152, and a temperature sensor 153. The functions of these components are discussed in more detail below. The bracket PCB 149 may be secured to the mounting bracket 137 with any suitable fasteners, such as screws, or interference connections, adhesives, etc.

Figure 8A:
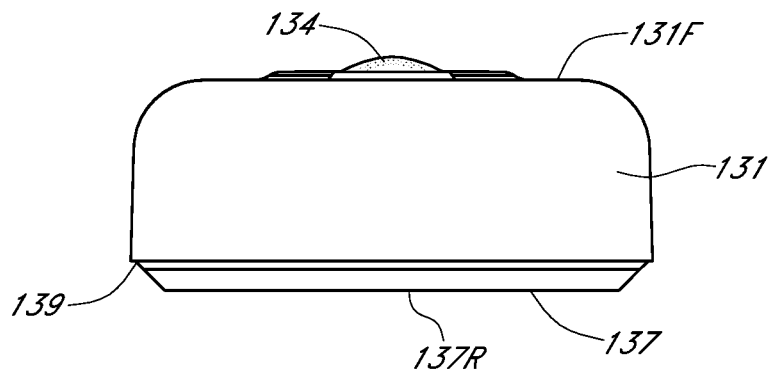
FIGS. 8A and 8B are top and bottom views, respectively, of the A/V recording and communication doorbell and the mounting bracket of FIG. 4.
Figure 8B:
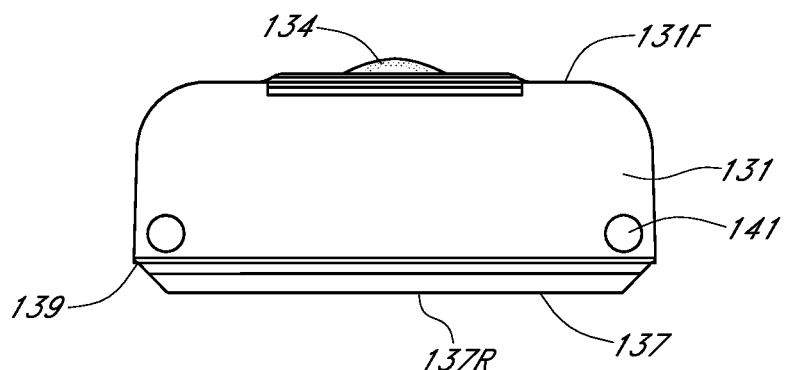

FIGS. 8A and 8B are top and bottom views, respectively, of the doorbell 130. As described above, the enclosure 131 may extend from the front face 131F of the doorbell 130 to the back, where it contacts and snugly surrounds the back plate 139. The camera 134 may protrude slightly beyond the front face 131F of the enclosure 131, thereby giving the camera 134 a wider field of view. The mounting bracket 137 may include a substantially flat rear surface 137R, such that the doorbell 130 and the mounting bracket 137 assembly may sit flush against the surface to which they are mounted. With reference to FIG. 8B, the lower end of the enclosure 131 may include security screw apertures 141 configured to receive screws or other fasteners.

Figure 9A:
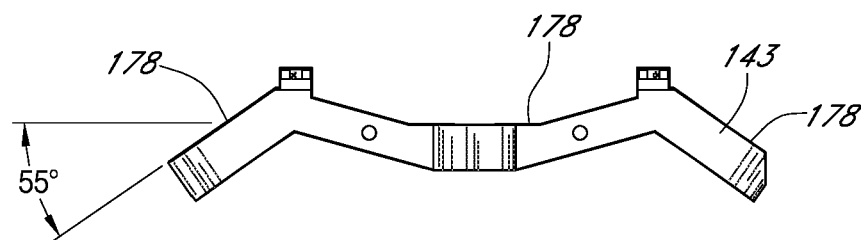
FIGS. 9A and 9B are top and front views, respectively, of a passive infrared sensor holder of the A/V recording and communication doorbell of FIG. 2.

FIG. 9A is a top view of the PIR sensor holder 143. The PIR sensor holder 143 may comprise any suitable material, including, without limitation, metals, metal alloys, or plastics. The PIR sensor holder 143 is configured to mount the PIR sensors 144 behind the lens 132 such that the PIR sensors 144 face out through the lens 132 at varying angles, thereby creating a wide field of view for the PIR sensors 144, and dividing the field of view into zones, as further described below. With further reference to FIG. 9A, the PIR sensor holder 143 includes one or more faces 178 within or on which the PIR sensors 144 may be mounted. In the illustrated embodiment, the PIR sensor holder 143 includes three faces 178, with each of two outer faces 178 angled at 55° with respect to a center one of the faces 178. In alternative embodiments, the angle formed by adjacent ones of the faces 178 may be increased or decreased as desired to alter the field of view of the PIR sensors 144.

Figure 9B:
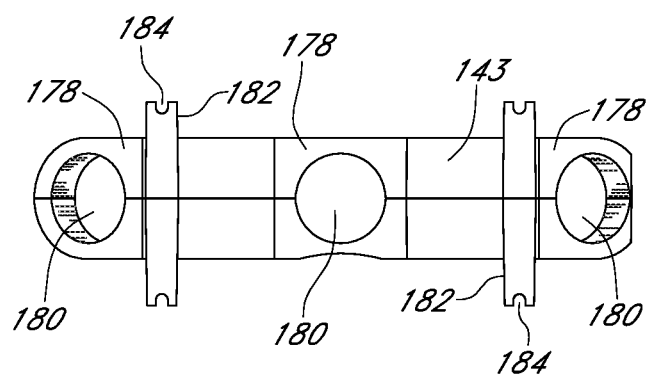

FIG. 9B is a front view of the PIR sensor holder 143. In the illustrated embodiment, each of the faces 178 includes a through hole 180 in which the PIR sensors 144 may be mounted. First and second brackets 182, spaced from one another, extend transversely across the PIR sensor holder 143. Each of the brackets 182 includes notches 184 at either end. The brackets 182 may be used to secure the PIR sensor holder 143 within the doorbell 130. In alternative embodiments, the through holes 180 in the faces 178 may be omitted. For example, the PIR sensors 144 may be mounted directly to the faces 178 without the through holes 180. Generally, the faces 178 may comprise any structure configured to locate and secure the PIR sensors 144 in place.

Figure 10A:
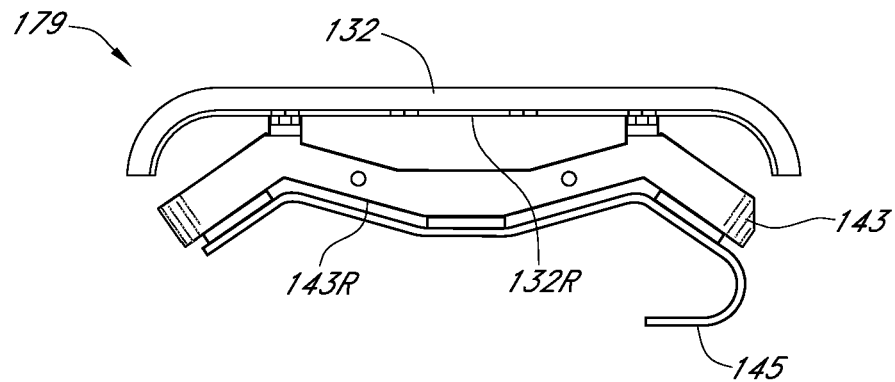
FIGS. 10A and 10B are top and front views, respectively, of a passive infrared sensor holder assembly of the A/V recording and communication doorbell of FIG. 2.
Figure 10B:
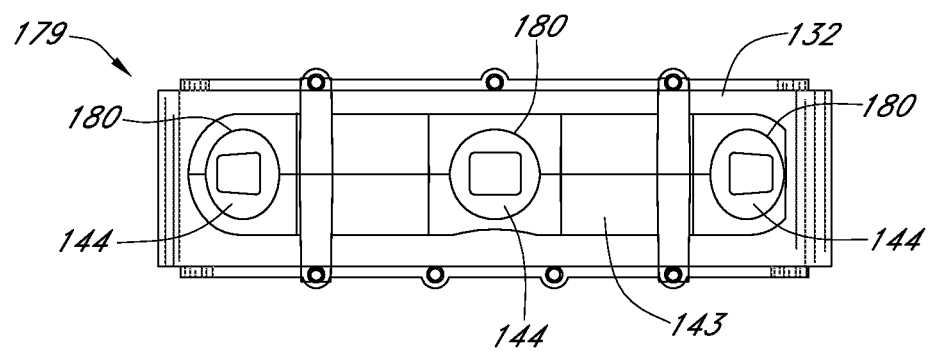

FIGS. 10A and 10B are top and front views, respectively, of a PIR sensor assembly 179, including the PIR sensor holder 143, the lens 132, and a flexible power circuit 145. The PIR sensor holder 143 may be secured to a rear face 132R of the lens 132, as shown, with the brackets 182 abutting the rear face 132R of the lens 132. The flexible power circuit 145, which may be any material or component capable of delivering power and/or data to and from the PIR sensors 144, is secured to a rear face 143R of the PIR sensor holder 143, and may be contoured to match the angular shape of the PIR sensor holder 143. The flexible power circuit 145 may connect to, draw power from, and/or transmit data to and/or from, the power PCB 148 (FIG. 5).

Figure 11:
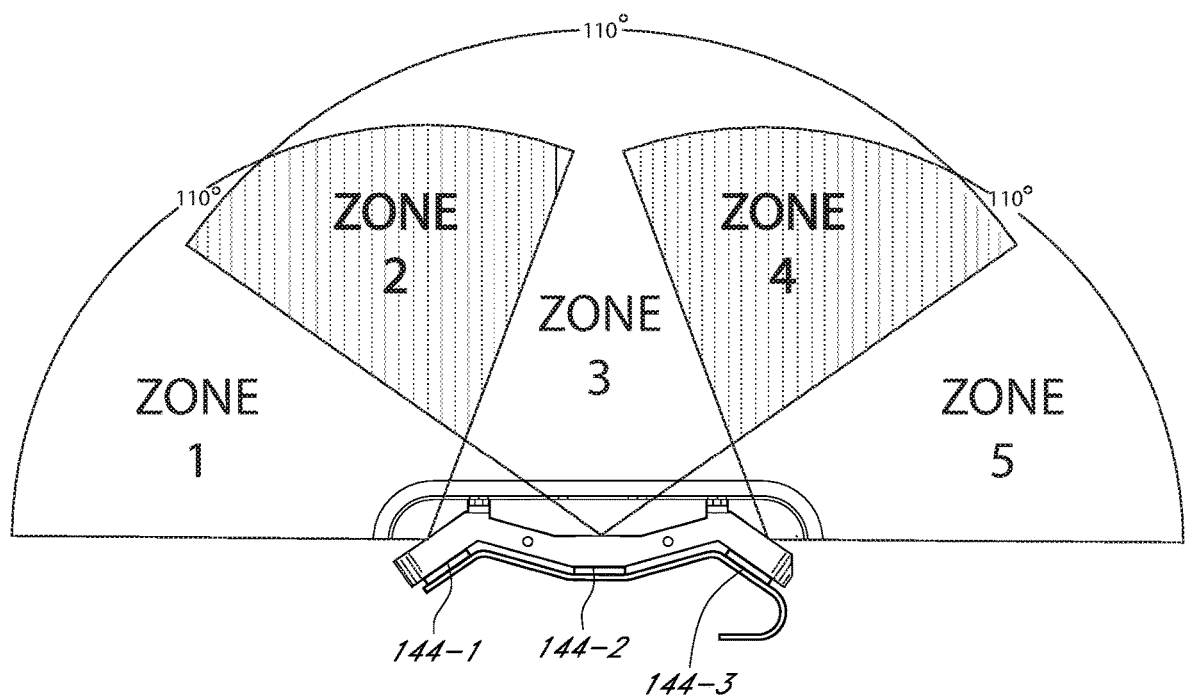
FIG. 11 is a top view of the passive infrared sensor assembly of FIG. 10A and a field of view thereof according to an aspect of the present disclosure.

FIG. 11 is a top view of the PIR sensor assembly 179 illustrating the fields of view of the PIR sensors 144. Each PIR sensor 144 includes a field of view, referred to as a "zone," that traces an angle extending outward from the respective PIR sensor 144. Zone 1 is the area that is visible only to Passive Infrared Sensor 144-1. Zone 2 is the area that is visible only to the PIR sensors 144-1 and 144-2. Zone 3 is the area that is visible only to Passive Infrared Sensor 144-2. Zone 4 is the area that is visible only to the PIR sensors 144-2 and 144-3. Zone 5 is the area that is visible only to Passive Infrared Sensor 144-3. The doorbell 130 may be capable of determining the direction that an object is moving based upon which zones are triggered in a time sequence. In the illustrated embodiment, each zone extends across an angle of 110°. In alternative embodiments, each zone may extend across a different angle, such as one greater than or less than 110°.

Figure 12:
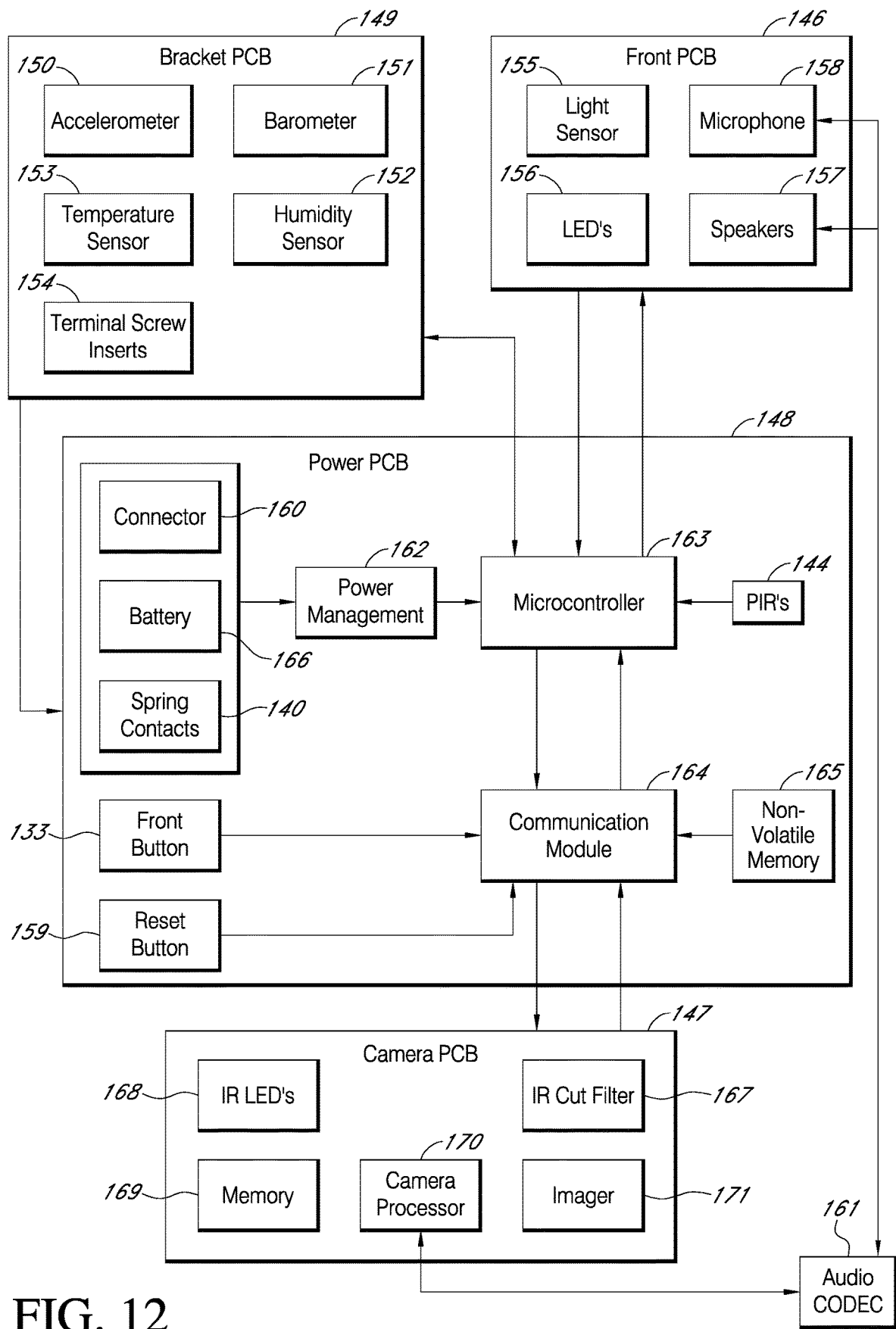
FIG. 12 is a functional block diagram of the components of the A/V recording and communication doorbell of FIG. 2.

FIG. 12 is a functional block diagram of the components within or in communication with the doorbell 130, according to an aspect of the present embodiments. As described above, the bracket PCB 149 may comprise an accelerometer 150, a barometer 151, a humidity sensor 152, and a temperature sensor 153. The accelerometer 150 may be one or more sensors capable of sensing motion and/or acceleration. The barometer 151 may be one or more sensors capable of determining the atmospheric pressure of the surrounding environment in which the bracket PCB 149 may be located. The humidity sensor 152 may be one or more sensors capable of determining the amount of moisture present in the atmospheric environment in which the bracket PCB 149 may be located. The temperature sensor 153 may be one or more sensors capable of determining the temperature of the ambient environment in which the bracket PCB 149 may be located. As described above, the bracket PCB 149 may be located outside the housing of the doorbell 130 so as to reduce interference from heat, pressure, moisture, and/or other stimuli generated by the internal components of the doorbell 130.

With further reference to FIG. 12, the bracket PCB 149 may further comprise terminal screw inserts 154, which may be configured to receive the terminal screws 138 and transmit power to the electrical contacts 177 on the mounting bracket 137 (FIG. 6). The bracket PCB 149 may be electrically and/or mechanically coupled to the power PCB 148 through the terminal screws 138, the terminal screw inserts 154, the spring contacts 140, and the electrical contacts 177. The terminal screws 138 may receive electrical wires located at the surface to which the doorbell 130 is mounted, such as the wall of a building, so that the doorbell can receive electrical power from the building's electrical system. Upon the terminal screws 138 being secured within the terminal screw inserts 154, power may be transferred to the bracket PCB 149, and to all of the components associated therewith, including the electrical contacts 177. The electrical contacts 177 may transfer electrical power to the power PCB 148 by mating with the spring contacts 140.

With further reference to FIG. 12, the front PCB 146 may comprise a light sensor 155, one or more light-emitting components, such as LED's 156, one or more speakers 157, and a microphone 158. The light sensor 155 may be one or more sensors capable of detecting the level of ambient light of the surrounding environment in which the doorbell 130 may be located. LED's 156 may be one or more light-emitting diodes capable of producing visible light when supplied with power. The speakers 157 may be any electro-mechanical device capable of producing sound in response to an electrical signal input. The microphone 158 may be an acoustic-to-electric transducer or sensor capable of converting sound waves into an electrical signal. When activated, the LED's 156 may illuminate the light pipe 136 (FIG. 2). The front PCB 146 and all components thereof may be electrically coupled to the power PCB 148, thereby allowing data and/or power to be transferred to and from the power PCB 148 and the front PCB 146.

The speakers 157 and the microphone 158 may be coupled to the camera processor 170 through an audio CODEC 161. For example, the transfer of digital audio from the user's client device 114 and the speakers 157 and the microphone 158 may be compressed and decompressed using the audio CODEC 161, coupled to the camera processor 170. Once compressed by audio CODEC 161, digital audio data may be sent through the communication module 164 to the network 112, routed by one or more servers 118, and delivered to the user's client device 114. When the user speaks, after being transferred through the network 112, digital audio data is decompressed by audio CODEC 161 and emitted to the visitor via the speakers 157.

With further reference to FIG. 12, the power PCB 148 may comprise a power management module 162, a microcontroller 163, the communication module 164, and power PCB non-volatile memory 165. In certain embodiments, the power management module 162 may comprise an integrated circuit capable of arbitrating between multiple voltage rails, thereby selecting the source of power for the doorbell 130. The battery 166, the spring contacts 140, and/or the connector 160 may each provide power to the power management module 162. The power management module 162 may have separate power rails dedicated to the battery 166, the spring contacts 140, and the connector 160. In one aspect of the present disclosure, the power management module 162 may continuously draw power from the battery 166 to power the doorbell 130, while at the same time routing power from the spring contacts 140 and/or the connector 160 to the battery 166, thereby allowing the battery 166 to maintain a substantially constant level of charge. Alternatively, the power management module 162 may continuously draw power from the spring contacts 140 and/or the connector 160 to power the doorbell 130, while only drawing from the battery 166 when the power from the spring contacts 140 and/or the connector 160 is low or insufficient. The power management module 162 may also serve as a conduit for data between the connector 160 and the microcontroller 163.

With further reference to FIG. 12, in certain embodiments the microcontroller 163 may comprise an integrated circuit including a processor core, memory, and programmable input/output peripherals. The microcontroller 163 may receive input signals, such as data and/or power, from the PIR sensors 144, the bracket PCB 149, the power management module 162, the light sensor 155, the microphone 158, and/or the communication module 164, and may perform various functions as further described below. When the microcontroller 163 is triggered by the PIR sensors 144, the microcontroller 163 may be triggered to perform one or more functions, such as those described below with reference to FIG. 14. When the light sensor 155 detects a low level of ambient light, the light sensor 155 may trigger the microcontroller 163 to enable "night vision," as further described below. The microcontroller 163 may also act as a conduit for data communicated between various components and the communication module 164.

With further reference to FIG. 12, the communication module 164 may comprise an integrated circuit including a processor core, memory, and programmable input/output peripherals. The communication module 164 may also be configured to transmit data wirelessly to a remote network device, and may include one or more transceivers (not shown). The wireless communication may comprise one or more wireless networks, such as, without limitation, Wi-Fi, cellular, Bluetooth, and/or satellite networks. The communication module 164 may receive inputs, such as power and/or data, from the camera PCB 147, the microcontroller 163, the button 133, the reset button 159, and/or the power PCB non-volatile memory 165. When the button 133 is pressed, the communication module 164 may be triggered to perform one or more functions, such as those described below with reference to FIG. 13. When the reset button 159 is pressed, the communication module 164 may be triggered to erase any data stored at the power PCB non-volatile memory 165 and/or at the camera PCB memory 169. The communication module 164 may also act as a conduit for data communicated between various components and the microcontroller 163. The power PCB non-volatile memory 165 may comprise flash memory configured to store and/or transmit data. For example, in certain embodiments the power PCB non-volatile memory 165 may comprise serial peripheral interface (SPI) flash memory.

With further reference to FIG. 12, the camera PCB 147 may comprise components that facilitate the operation of the camera 134. For example, an imager 171 may comprise a video recording sensor and/or a camera chip. In one aspect of the present disclosure, the imager 171 may comprise a complementary metal-oxide semiconductor (CMOS) array, and may be capable of recording high definition (e.g., 720p or better) video files. A camera processor 170 may comprise an encoding and compression chip. In some embodiments, the camera processor 170 may comprise a bridge processor. The camera processor 170 may process video recorded by the imager 171 and audio recorded by the microphone 158, and may transform this data into a form suitable for wireless transfer by the communication module 164 to a network. The camera PCB memory 169 may comprise volatile memory that may be used when data is being buffered or encoded by the camera processor 170. For example, in certain embodiments the camera PCB memory 169 may comprise synchronous dynamic random access memory (SD RAM). IR LED's 168 may comprise light-emitting diodes capable of radiating infrared light. IR cut filter 167 may comprise a system that, when triggered, configures the imager 171 to see primarily infrared light as opposed to visible light. When the light sensor 155 detects a low level of ambient light (which may comprise a level that impedes the performance of the imager 171 in the visible spectrum), the IR LED's 168 may shine infrared light through the doorbell 130 enclosure out to the environment, and the IR cut filter 167 may enable the imager 171 to see this infrared light as it is reflected or refracted off of objects within the field of view of the doorbell. This process may provide the doorbell 130 with the "night vision" function mentioned above.

Figure 13:
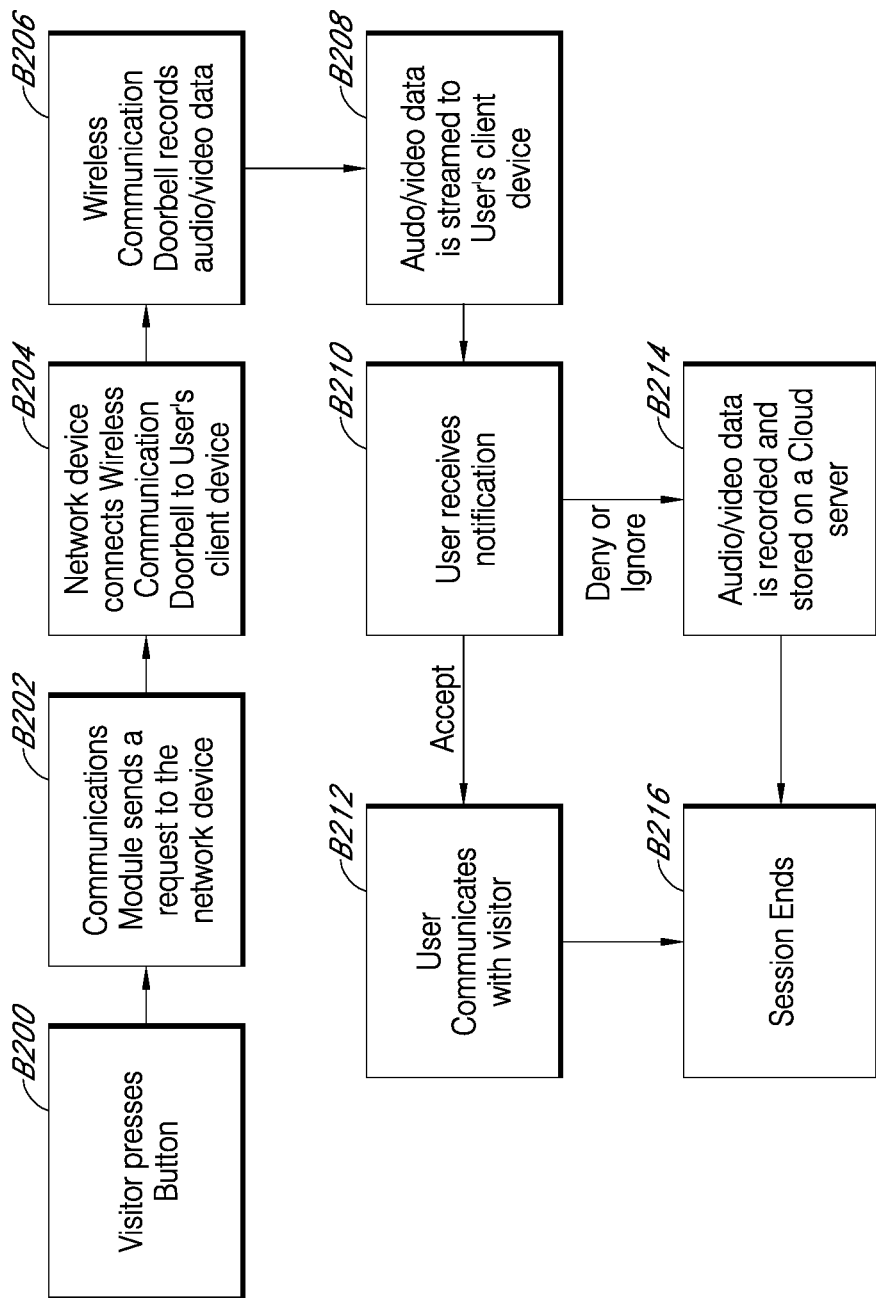
FIG. 13 is a flowchart illustrating a process for an A/V recording and communication doorbell according to an aspect of the present disclosure.

FIG. 13 is a flowchart illustrating one embodiment of a process according to an aspect of the present disclosure. At block B200, a visitor presses the button 133 on the doorbell 130. At block B202, the communication module 164 sends a request to a network device. Once the network device receives the request, at block B204 the network device may connect the doorbell 130 to the user's client device 114 through the user's network 110 and the network 112. In block B206, the doorbell 130 may record available audio and/or video data using the camera 134, the microphone 158, and/or any other sensor available. At block B208, the audio and/or video data is transmitted to the user's client device 114. At block B210, the user may receive a notification on his or her client device 114 prompting him or her to either accept or deny. If the user denies the notification, then the process advances to block B214, where the audio and/or video data is recorded and stored at a cloud server. The session then ends at block B216 and the connection between the doorbell 130 and the user's client device 114 is terminated. If, however, the user elects to accept the notification, then at block B212 the user communicates with the visitor through the user's client device 114 while being provided audio and/or video data captured by the camera 134, the microphone 158, and/or other sensors. At the end of the call, the user may terminate the connection between the user's client device 114 and the doorbell 130 and the session ends at block B216. In some embodiments, the audio and/or video data may be recorded and stored at a cloud server (block B214) even if the user accepts the notification and communicates with the visitor through the user's client device 114.

Figure 14:
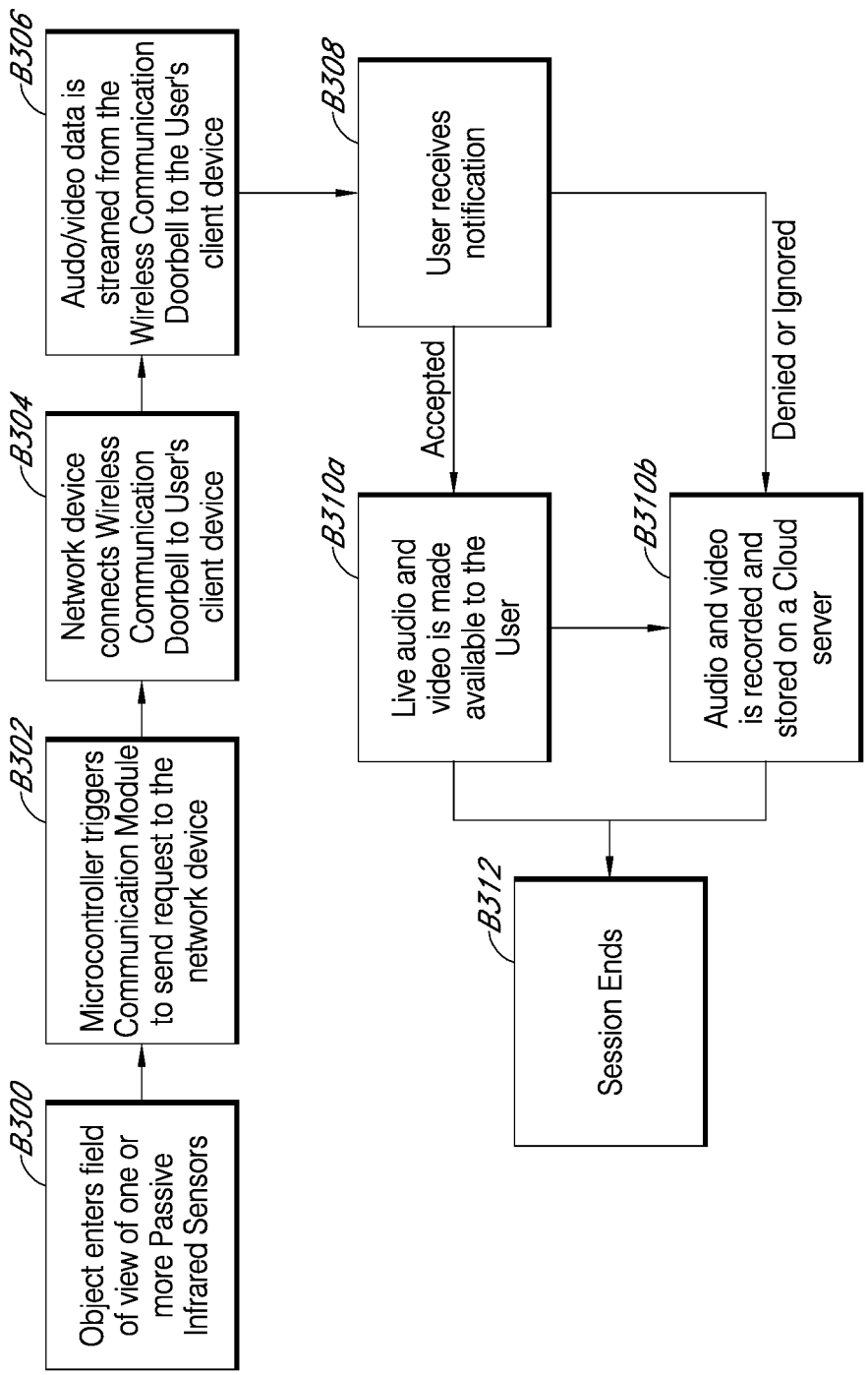
FIG. 14 is a flowchart illustrating another process for an A/V recording and communication doorbell according to an aspect of the present disclosure.

FIG. 14 is a flowchart illustrating another embodiment of a process according to an aspect of the present disclosure. At block B300, an object may move into the field of view of one or more of the PIR sensors 144. At block B302, the PIR sensors 144 may trigger the microcontroller 163, which may then trigger the communication module 164 to send a request to a network device. At block B304, the network device may connect the doorbell 130 to the user's client device 114 through the user's network 110 and the network 112. At block B306, the doorbell 130 may record available audio and/or video data using the camera 134, the microphone 158, and/or any other available sensor, and stream the data to the user's client device 114. At block B308, the user may receive a notification prompting the user to either accept or deny the notification. If the notification is accepted, then at block B310a the live audio/video data may be displayed on the user's client device 114, thereby allowing the user surveillance from the perspective of the doorbell 130. When the user is satisfied with this function, the user may sever the connection at block B312, whereby the session ends. If, however, at block B308 the user denies the notification, or ignores the notification and a specified time interval elapses, then the connection between the doorbell 130 and the user's client device 114 is terminated and the audio/video data is recorded and stored at a cloud server at block B310b, such that the user may view the audio/video data later at their convenience. The doorbell 130 may be configured to record for a specified period of time in the event the notification in block B308 is denied or ignored. If such a time period is set, the doorbell 130 may record data for that period of time before ceasing operation at block B312 thereby ending the session. In some embodiments, the audio and/or video data may be recorded and stored at a cloud server (block B310b) even if the user accepts the notification and communicates with the visitor through the user's client device 114.

Figure 15:
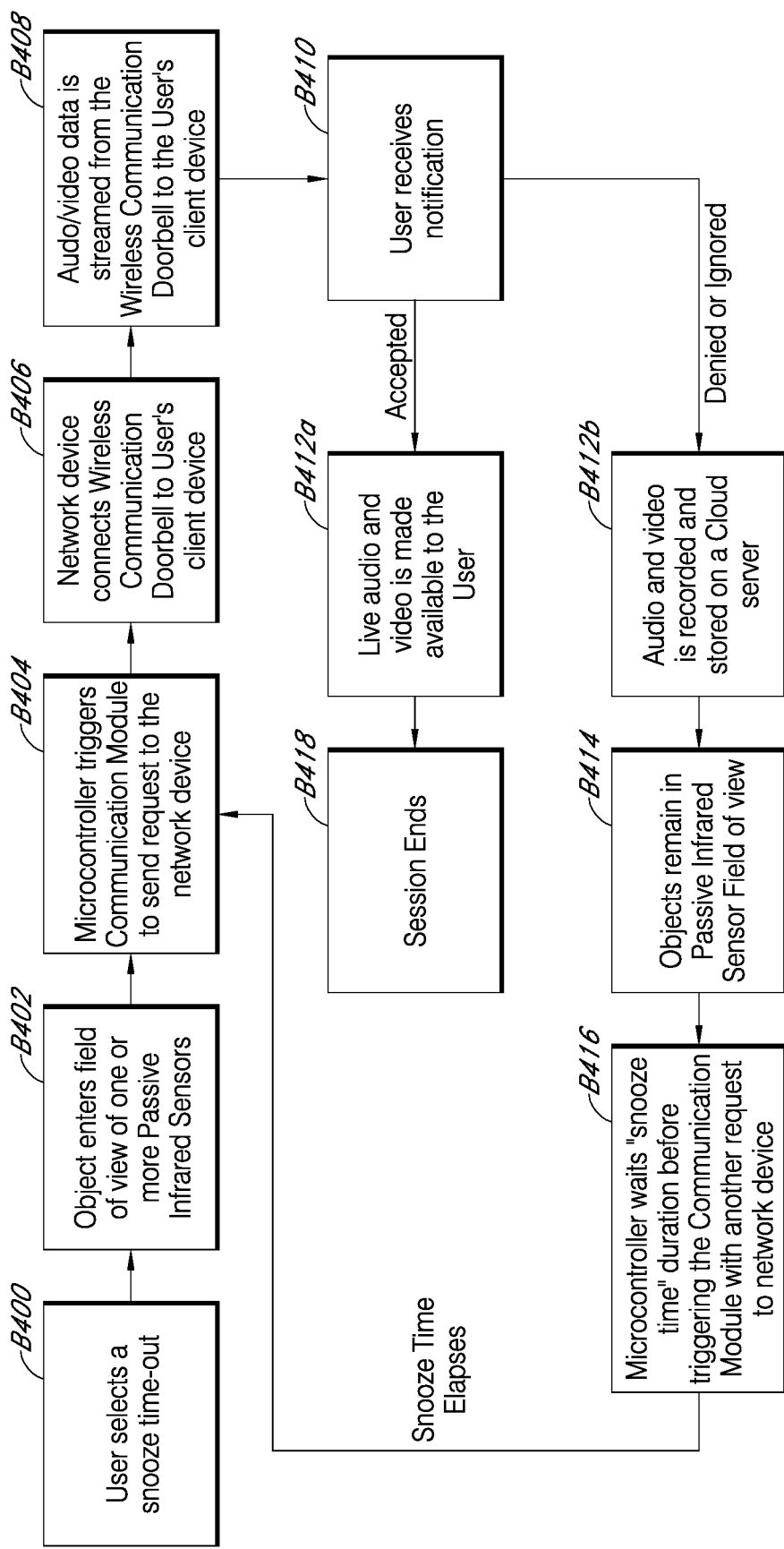
FIG. 15 is a flowchart illustrating another process for an A/V recording and communication doorbell according to an aspect of the present disclosure.

FIG. 15 is a flowchart illustrating another embodiment of a process according to an aspect of the present disclosure. At block B400, the user may select a "snooze time-out," which is a time period during which the doorbell 130 may deactivate or otherwise not respond to stimuli (such as light, sound, or heat signatures) after an operation is performed, e.g. a notification is either accepted or denied/ignored. For example, the user may set a snooze time-out of 15 minutes. At block B402, an object moves into the field of view of one or more of the PIR sensors 144. At block B404, the microcontroller 163 may trigger the communication module 164 to send a request to a network device. In block B406, the network device may connect the doorbell 130 to the user's client device 114 through the user's network 110 and the network 112. At block B408, audio/video data captured by the doorbell 130 may be streamed to the user's client device 114. At block B410, the user may receive a notification prompting the user to either accept or deny/ignore the request. If the request is denied or ignored, then at block B412b audio/video data may be recorded and stored at a cloud server. After the doorbell 130 finishes recording, the objects may remain in the PIR sensor 144 field of view at block B414. In block B416, the microcontroller 163 waits for the "snooze time" to elapse, e.g. 15 minutes, before triggering the communication module 164 to submit another request to the network device. After the snooze time, e.g. 15 minutes, elapses, the process moves back to block B404 and progresses as described above. The cycle may continue like this until the user accepts the notification request at block B410. The process then moves to block B412a, where live audio and/or video data is displayed on the user's client device 114, thereby allowing the user surveillance from the perspective of the doorbell 130. At the user's request, the connection may be severed and the session ends at block B418. At this point the user may elect for the process to revert back to block B416, whereby there may be no further response until the snooze time, e.g. 15 minutes, has elapsed from the end of the previous session, or the user may elect for the process to return to block B402 and receive a notification the next time an object is perceived by one or more of the PIR sensors 144. In some embodiments, the audio and/or video data may be recorded and stored at a cloud server (block B412b) even if the user accepts the notification and communicates with the visitor through the user's client device 114.

As discussed above, the present disclosure provides numerous examples of methods and systems including A/V recording and communication doorbells, but the present embodiments are equally applicable for A/V recording and communication devices other than doorbells. For example, the present embodiments may include one or more A/V recording and communication security cameras instead of, or in addition to, one or more A/V recording and communication doorbells. An example A/V recording and communication security camera may include substantially all of the structure and functionality of the doorbell 130, but without the front button 133, the button actuator, and/or the light pipe 136. An example A/V recording and communication security camera may further omit other components, such as, for example, the bracket PCB 149 and its components.

Figure 19:
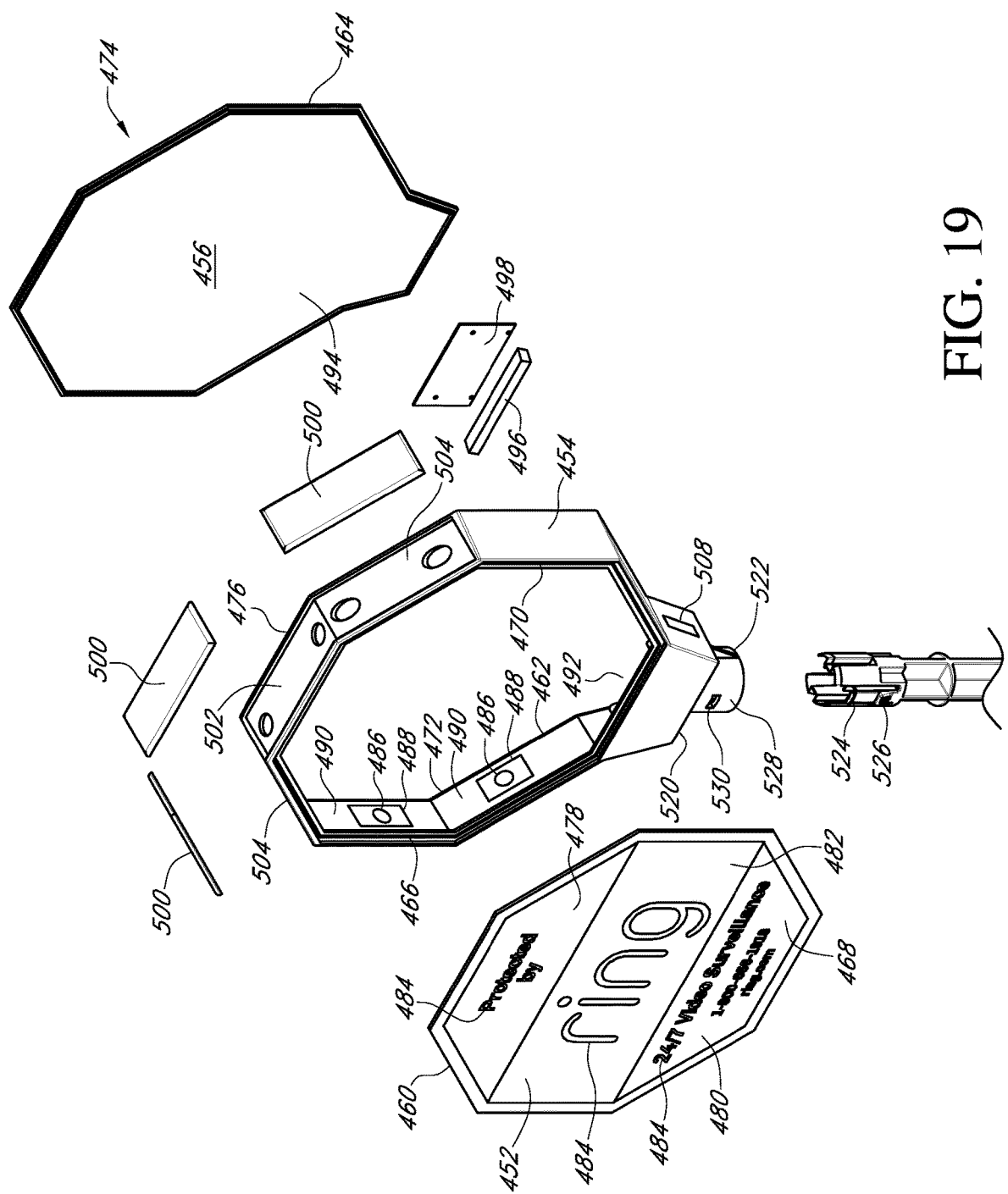
FIG. 19 is an exploded front perspective view of the illuminated sign for A/V recording and communication devices of FIG. 16.

FIGS. 16-19 illustrate one embodiment of an illuminated sign 450 for A/V recording and communication devices according to an aspect of the present disclosure. With reference to FIG. 19, which is an exploded view, the sign 450 includes a front panel 452, a frame 454, and a back cover 456. The frame 454 includes a front opening 458 having a perimeter size and shape configured to receive outer edges 460 of the front panel 452. The frame 454 further includes a back opening 462 having a perimeter size and shape configured to receive outer edges 464 of the back cover 456. In the illustrated embodiment, the front panel 452, the frame 454, and the back cover 456 each have a substantially octagonal perimeter shape. However, the illustrated embodiment is just one example, and in alternative embodiments the front panel 452, the frame 454, and/or the back cover 456 could have any perimeter shape, such as round, hexagonal, rectangular, square, triangular, etc. The front opening 458 may include a recessed ledge 466 that receives the front panel 452 such that a front surface 468 of the front panel 452 is substantially flush with a front edge 470 of the frame 454. Similarly, the back opening 462 may include a recessed ledge 472 that receives the back cover 456 such that a back surface 474 of the back cover 456 is substantially flush with a back edge 476 of the frame 454. The front panel 452 and the back cover 456 are spaced from one another by approximately a thickness of the frame 454. Together, the front panel 452, the back cover 456, and the frame 454 create an interior space that contains and protects further components of the illuminated sign 450, including an illumination source, as further described below.

An interface between the outer edges 460 of the front panel 452 and the frame 454 may include an intervening moisture-sealing member (not shown), such as a gasket or a coating on one or both of the front panel 452 and the frame 454. Similarly, an interface between the outer edges 464 of the back cover 456 and the frame 454 may include an intervening moisture-sealing member (not shown), such as a gasket or a coating on one or both of the back cover 456 and the frame 454. The moisture-sealing member(s) may comprise any material configured to provide a moisture-tight seal at the interface(s), such as rubber or silicone.

Figure 17:
FIG. 17 is a front elevation view of the illuminated sign for A/V recording and communication devices of FIG. 16.
Figure 18:
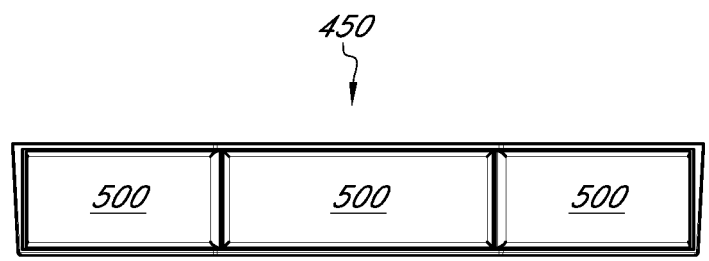
FIG. 18 is a top plan view of the illuminated sign for A/V recording and communication devices of FIG. 16.

With reference to FIGS. 17 and 19, the front panel 452 may include at least one translucent portion 478, 480, 482 having contrasting text 484. In the illustrated embodiment, three translucent portions 478, 480, 482 are shown. However, in alternative embodiments a different number of translucent portions may be provided, such as zero, one, two, four, etc. Further, one or more of the translucent portions 478, 480, 482 may be transparent and/or colorless.

The translucent portions 478, 480, 482 are configured to allow at least some light to pass from within the illuminated sign 450 through the front panel 452, while the contrasting text 484 is configured to prevent at least some light from passing through the front panel 452. Thus, as further described below, when the illumination source located within the sign 450 is illuminated, the contrast between the text 484 and the translucent portions 478, 480, 482 makes the text 484 on the front panel 452 visible to a viewer located in front of the sign 450. The sign 450 is thus backlit, or illuminated by an illumination source located behind the front panel 452. The text 484 informs the viewer that the area adjacent the illuminated sign 450 is within a field of view of the A/V recording and communication device 130. For example, in the illustrated embodiment the text 484 reads "Protected by ring 24/7 Video Surveillance." The illustrated text 484 is, however, just one example, and in alternative embodiments the text 484 may read differently.

With reference to FIG. 17, the translucent portions 478, 480, 482 may have different arrangements and/or different visual aspects, such as different colors or levels of opacity. For example, the illustrated embodiment includes an upper band corresponding to the first translucent portion 478, a lower band corresponding to the second translucent portion 480, and a central band corresponding to the third translucent portion 482. The upper and lower bands 478, 480 may be the same color, such as blue, while the central band 482 may be a different color, such as white. The text 484 may be yet another different color, such as black. When the illumination source located within the sign 450 is turned on, the black text 484 on the front panel 452 stands out from the lighter colored upper band 478, lower band 480, and central band 482, because the black text 484 is more opaque than the lighter colored translucent portions 478, 480, 482. In some embodiments, the text 484 may be completely opaque such that the text 484 blocks transmission through the front panel 452 of substantially all of the light emanating from the illumination source within the sign 450. In such embodiments, the text 484 may be black or any other color.

In alternative embodiments, the different translucent portions 478, 480, 482 of the front panel 452 may be distinguished from one another by differing levels of opacity, rather than, or in addition to, different colors. For example, the upper band 478, the lower band 480, and/or the central band 482 may be textured or frosted to prevent at least some light from passing through those portions of the front panel 452. In still further alternative embodiments, substantially all of the front panel 452 may be opaque, except for the text 484, which may be translucent or transparent. In still further alternative embodiments, the relative locations and/or arrangement of the transparent/translucent portions 478, 480, 482 may be rearranged or reversed, and/or the boundaries between opaque and transparent/translucent portions

478, 480, 482 may be modified. The arrangements of the translucent portions 478, 480, 482 and the text 484 in the illustrated embodiment is just one example and is not limiting.

With reference to FIG. 19, the illuminated sign 450 further comprises an illumination source. In the illustrated embodiment, the illumination source comprises a plurality of light-emitting diodes (LEDs) 486. Each of the LEDs 486 may be surface mounted to an LED printed circuit board (PCB) 488. In certain embodiments, the LEDs 486 may be distributed evenly about a perimeter of the frame 454. For example, there may be one LED 486 located at the inside surface of each side 490 (or substantially each side) of the frame 454. Thus, for the illustrated embodiment having a generally octagonal frame 454, there may be a total of eight LEDs 486 distributed evenly about a perimeter of the frame 454. Alternatively, there may be a total of seven LEDs 486 distributed generally evenly about a perimeter of the frame 454, with only a lower side 492 of the generally octagonal frame 454 being without an LED 486.

With reference to FIG. 19, the back cover 456 may be substantially or completely opaque such that light emanating from the illumination source does not pass through the back cover 456. In certain embodiments, an inside surface 494 of the back cover 456 may be reflective so that light striking the inside surface 494 is reflected back into the interior of the sign 450 and, ultimately, through the front panel 452. For example, the inside surface 494 may include a reflective coating and/or the back cover 456 may comprise a reflective material, such as a metal.

Figure 16:
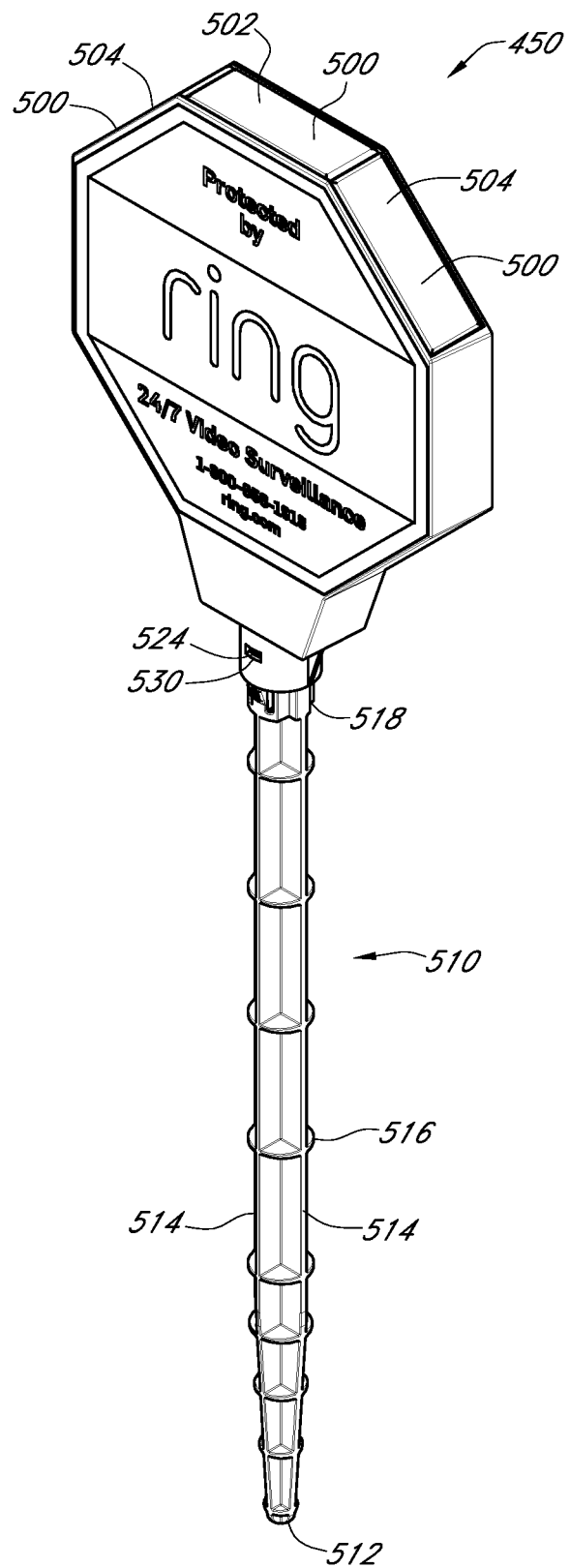
FIG. 16 is a front perspective view of one embodiment of an illuminated sign (with a stake) for A/V recording and communication devices according to an aspect of the present disclosure.

With reference to FIG. 19, the illuminated sign 450 further comprises a power source 496 providing power to the illumination source 486, and one or more other PCBs 498. The power source 496 may comprise, for example, one or more rechargeable batteries, such as lithium-ion batteries. With reference to FIGS. 16-19, the illuminated sign 450 further comprises at least one solar panel 500 for recharging the rechargeable battery 496. With reference to FIGS. 16 and 19, in the illustrated embodiment, the illuminated sign 450 comprises three solar panels 500, with a first one of the solar panels 500 extending across the outer surface of an uppermost edge 502 of the frame 454, and second and third ones of the solar panels 500 extending across the outer surfaces of edges 504 adjacent the uppermost edge 502 of the frame 454. Locating the solar panels 500 along and/or adjacent the upper edge(s) 502, 504 of the frame 454 provides good exposure of the solar panels 500 to sunlight, which enables efficient absorption of solar energy for recharging the rechargeable battery 496, as described in further detail below. The illustrated locations of the three solar panels 500 are, however, merely examples. The solar panels 500 may be located in different locations from those shown in FIGS. 16-19. Further, fewer or more than three solar panels 500 may be provided in alternative embodiments. For example, the three solar panels 500 may be replaced by a single, flexible solar panel that extends over the upper edge(s) 502, 504 of the frame 454.

In some embodiments, each of the solar panels 500 may comprise one or more photovoltaic modules including a packaged, connected assembly of solar cells. The solar modules use light energy (photons) from the sun to generate electricity through the photovoltaic effect. The solar modules may include, for example, wafer-based crystalline silicon cells and/or thin-film cells based on, for example, cadmium telluride or silicon. The solar cells may be secured to a structural (load carrying) member, and may be rigid or semi-flexible. In one non-limiting example, the total output power of the solar panels 500 may range from about 0.1 watts to about 5 watts, such as from about 0.5 watts to about 1 watt.

With further reference to FIG. 19, the other PCBs may comprise at least a power PCB 498. The power PCB 498 may comprise a power management module 506. The power management module 506, which may alternatively be referred to as a processor, may comprise an integrated circuit including a processor core, memory, and/or programmable input/output peripherals. In one non-limiting example, the power management module 506 may be an off-the-shelf component, such as the MH8182 chip.

Figure 20:
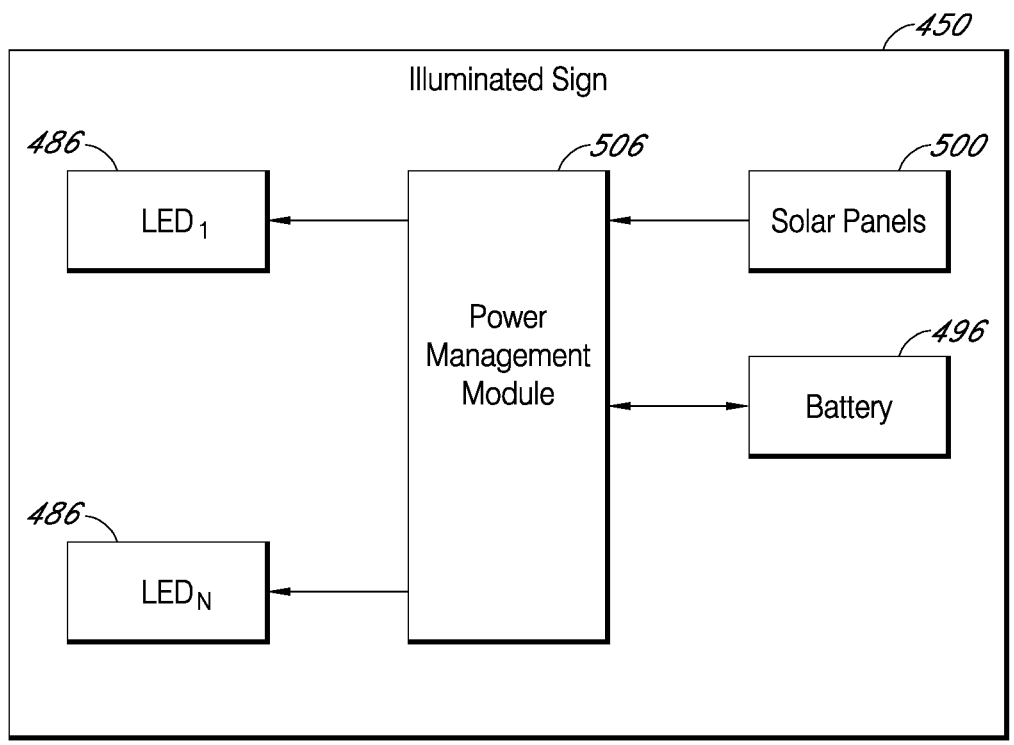
FIG. 20 is a functional block diagram of certain components of the illuminated sign for A/V recording and communication devices of FIG. 16.

With reference to FIG. 20, which is a functional block diagram of certain components of the illuminated sign 450 of FIG. 16, the power management module 506 is operatively connected to the solar panels 500, the rechargeable battery 496, and the LEDs 486 (illustrated as $LED_1$ through $LED_N$). The power management module 506 controls charging of the rechargeable battery 496, receiving power from the solar panels 500 when sunlight impinges upon the solar panels 500 and directing that power to the rechargeable battery 496 for recharging. The power management module 506 also controls power delivery to the LEDs 486, receiving power from the battery 496 when the level of ambient light is low and directing that power to the LEDs 486 to provide illumination for the illuminated sign 450.

In some embodiments, the solar panels 500 also act as photosensors, working in conjunction with the power management module 506 to turn the LEDs 486 on and off. For example, the photovoltaic cells comprising each of the solar panels 500 produce a voltage and supply an electric current to the power management module 506 when sunlight impinges upon the solar panels 500. When the power management module 506 is receiving current from the solar panels 500, such as when the level of ambient light is high, the power management module 506 maintains the LEDs 486 in an off state (no illumination). When the power management module 506 is not receiving current from the solar panels 500, such as when the level of ambient light is low, the power management module 506 maintains the LEDs 486 in an on (illuminated) state. In alternative embodiments, the illuminated sign 450 may include a photosensor separate from the solar panels 500 for turning the LEDs 486 on and off.

The present embodiments may include one or more light thresholds for controlling when the LEDs 486 turn on and off. For example, the power management module 506 may turn on the LEDs 486 when the level of ambient light drops below a first light threshold, and turn off the LEDs 486 when the level of ambient light rises above a second light threshold, where the second light threshold is higher (brighter) than the first light threshold. Using first and second light thresholds avoids rapid on/off cycling of the LEDs 486 during periods when the ambient light is close to either of the thresholds. In some embodiments, the level of current from the solar panels 500 and received by the power management module 506 may be used as a proxy for the level of ambient light. Thus, the power management module 506 may turn on the LEDs 486 when the level of received current drops below a first current threshold, and turn off the LEDs 486 when the level of received current rises above a second current threshold, where the second current threshold is higher than the first current threshold.

With further reference to FIG. 19, the illuminated sign 450 may further comprise an ON/OFF switch 508. The ON/OFF switch 508 may control whether the power management module 506 turns on the LEDs 486 when the level of ambient light is low. For example, if the ON/OFF switch 508 is in the ON position, then the power management module 506 may turn on the LEDs 486 when the level of ambient light drops below the first light threshold. But, if the ON/OFF switch 508 is in the OFF position, then the power management module 506 may not turn on the LEDs 486 even when the level of ambient light drops below the first light threshold. Similarly, when the level of ambient light is below the first light threshold and the LEDs 486 are on, if a user moves the ON/OFF switch 508 from the ON position to the OFF position, the power management module 506 may turn off the LEDs 486.

With reference to FIG. 16, the illuminated sign 450 further comprises a stake 510. The stake 510 is elongate and tapers down toward a lower end 512 such that the stake 510 is configured to be driven into the ground. The stake 510 includes a plurality of longitudinal ribs 514 that extend along the length of the stake 510 to impart rigidity. In the illustrated embodiment, the stake 510 includes four such ribs 514, and the ribs 514 are evenly spaced from one another in the radial direction. This configuration for the ribs 514 is, however, just one non-limiting example. The stake 510 further includes a plurality of longitudinally spaced transverse members 516. In the illustrated embodiment, each of the transverse members 516 is shaped substantially as a circular disk, and approximately nine such transverse members 516 are provided with a longitudinal spacing between adjacent members decreasing toward the lower end 512 of the stake 510. This configuration for the transverse members 516 is, however, just one non-limiting example.

With further reference to FIG. 16, the frame 454 of the illuminated sign 450 is supported at an upper end 518 of the stake 510. With reference to FIG. 19, the lower end 520 of the frame 454 includes a tubular member 522 that receives the upper end 518 of the stake 510. The upper end 518 of the stake 510 includes a locking tab 524 at the end of a cantilevered member 526, and a front portion 528 of the tubular member 522 includes a mating slot 530. When the upper end 518 of the stake 510 is fully inserted into the tubular member 522 at the lower end 520 of the frame 454, the locking tab 524 snaps into the slot 530, as shown in FIG. 17, to secure the stake 510 and the frame 454 to one another.

The illuminated sign 450 may be constructed of any materials that are preferably durable and suitable for outdoor use. For example, the front panel 452, the frame 454, the back cover 456, and/or the stake 510 may comprise one or more plastics and/or one or more metals.

Figure 21:
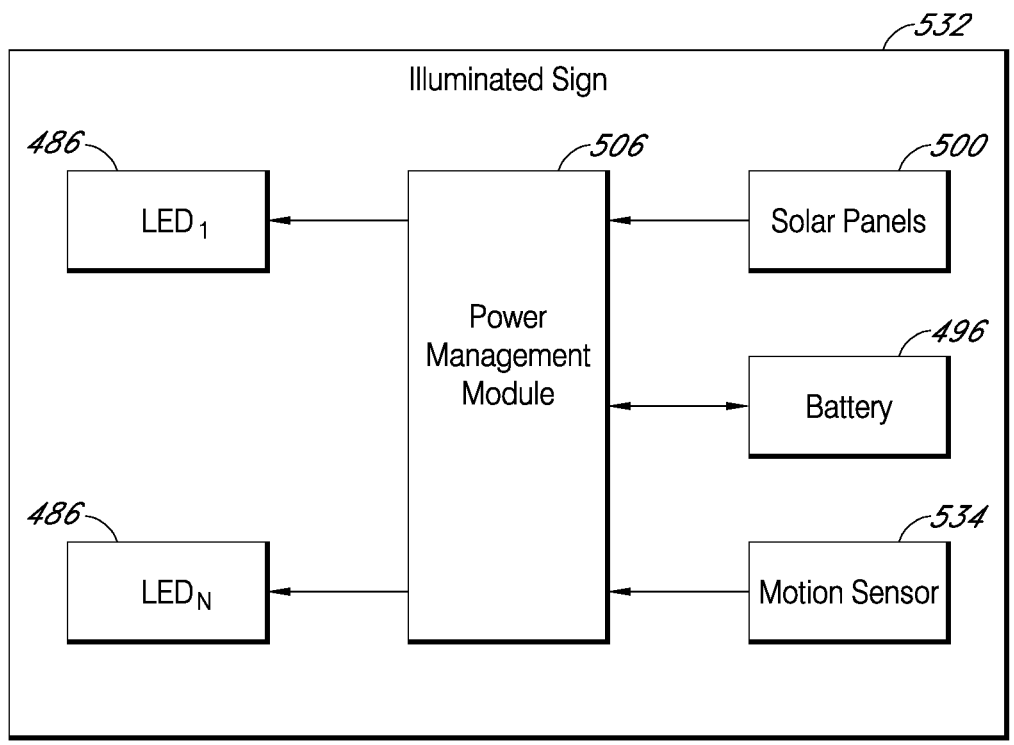
FIG. 21 is a functional block diagram of certain components of another embodiment of an illuminated sign for A/V recording and communication devices according to an aspect of the present disclosure.

FIG. 21 is a functional block diagram of certain components of another embodiment of an illuminated sign 532 for A/V recording and communication devices. Similar to the illuminated sign 450 described above, the illuminated sign 532 includes the power management module 506, the solar panels 500, the rechargeable battery 496, and the LEDs 486 (illustrated as LED$_1$ through LED$_N$). The illuminated sign 532 further includes a motion sensor 534. The motion sensor 534 may comprise, for example, one or more passive infrared (PIR) sensors (not shown), or any other type of motion sensor(s).

The motion sensor 534 is operatively connected to the power management module 506, and may work in conjunction with the power management module 506 to turn the LEDs 486 on or off. For example, in some embodiments, the power management module 506 may maintain the LEDs 486 in an off state (no illumination) even when the level of ambient light is low, such as below the first light threshold described above. When the motion sensor 534 detects motion near the illuminated sign 532, the motion sensor 534 may send a signal to the power management module 506. In response to the signal from the motion sensor 534, the power management module 506 may turn the LEDs 486 on. When the motion is no longer detected, and/or when a timer expires, the power management module 506 may turn the LEDs 486 off. In this manner, the LEDs 486 are only illuminated in response to the motion sensor 534 detecting motion. This aspect may further enhance the crime deterrent effect of the illuminated sign 532, because would-be perpetrators may be scared off by the sudden illumination of the illuminated sign 532, which the would-be perpetrators may not have yet seen before the LEDs 486 were turned on.

In still further embodiments, the power management module 506 of the illuminated sign 532 may maintain the LEDs 486 in a low-power state (dim illumination) even when the level of ambient light is low, such as below the first light threshold described above. When the motion sensor 534 detects motion near the illuminated sign 532, the motion sensor 534 may send a signal to the power management module 506 to increase the power to the LEDs 486, thereby causing the LEDs 486 to give off more light. When the motion is no longer detected, and/or when a timer expires, the power management module 506 may return the LEDs 486 to the low-power state. In this manner, the LEDs 486 remain illuminated whenever the level of ambient light is low, such as below the first light threshold, but the low-power state of the LEDs 486 conserves battery power in comparison to an embodiment in which the LEDs 486 are always on at a high-power state when the level of ambient light is low, such as below the first light threshold.

In still further embodiments, the power management module 506 of the illuminated sign 450 or the illuminated sign 532 may control a flashing ON/OFF state of the LEDs 486. For example, when the level of ambient light is low, such as below the first light threshold described above, the power management module 506 may cycle the LEDs 486 through alternating on and off states. Each of the on and off states may persist for a preset duration, such as from less than one second to several seconds or more or several minutes. In some embodiments, the durations of the on and off states may not be equal to one another. For example, the LED on state may be longer than, or shorter than, the LED off state.

In some embodiments, aspects of the illuminated sign 450, 532 may be configurable by the user. For example, the user may be able to configure or control aspects of the light output of the illuminated sign 450, 532, such as light intensity, color, on/off state, etc. In certain embodiments, the user may configure or control these aspects through a software application executing on the user's client device 114. The illuminated sign 450, 532 may include a wireless antenna (not shown), and the user's client device 114 may send wireless signals to the illuminated sign 450, 532 using any suitable wireless protocol, such as Wi-Fi (IEEE 802.11), Bluetooth, or Bluetooth low energy (Bluetooth LE, BLE, Bluetooth Smart).

In embodiments in which the user may adjust the color output of the illuminated sign 450, 532, the LEDs 486 may comprise LEDs of different colors. For example, at least some of the LED PCBs may have surface mounted on them LEDs of more than one color, such as red, green, and/or blue. By selectively illuminating LEDs of various colors within the illuminated sign 450, 532, the sign 450, 532 may be able to light up in a variety of different colors.

As described above, the present embodiments advantageously provide an illuminated sign that informs those who view it that the area around the sign is within the field of view of one or more A/V recording and communication devices. The present illuminated sign thus enhances the deterrent value of A/V recording and communication devices by making would-be perpetrators aware that they are within the view of such A/V recording and communication devices. Further, because the present sign is illuminated, it is more visible at night, when would-be perpetrators might be more likely to commit crimes because they believe that the lower level of ambient light will conceal their actions and/or identities. But, A/V recording and communication devices such as that described herein with reference to FIGS. 1-15 include "night vision." Thus, making would-be perpetrators aware that they are within the view of such A/V recording and communication devices undermines their belief that the lower level of ambient light will conceal their actions and/or identities, thereby further enhancing the deterrent value of A/V recording and communication devices.

In alternative embodiments, the text of the present illuminated sign may read differently from the example shown in FIGS. 16, 17, and 19, and/or the overall message conveyed by the present illuminated sign may differ from that described above. For example, the present illuminated sign may include text and/or a company logo that warns would-be perpetrators that the premises is protected by a security/alarm system, but the text may not state specifically that the area around the sign is within the field of view of one or more A/V recording and communication devices. And, in fact, embodiments of the present illuminated sign may be used in connection with security/alarm systems that may or may not include one or more A/V recording and communication devices. In one example embodiment, the present illuminated sign may be used in connection with a security/alarm system that includes at least one camera, and in such an embodiment the present illuminated sign may include text or another type of indicator, such as a graphical representation of a camera, that warns would-be perpetrators that they may be on camera. In another example embodiment, the present illuminated sign may be used in connection with a security system that includes an audible alarm, and in such an embodiment the present illuminated sign may include text or another type of indicator, such as a graphical representation of a speaker, that warns would-be perpetrators that the audio alarm may be triggered if they enter the premises or remain on the premises.

Figure 22:
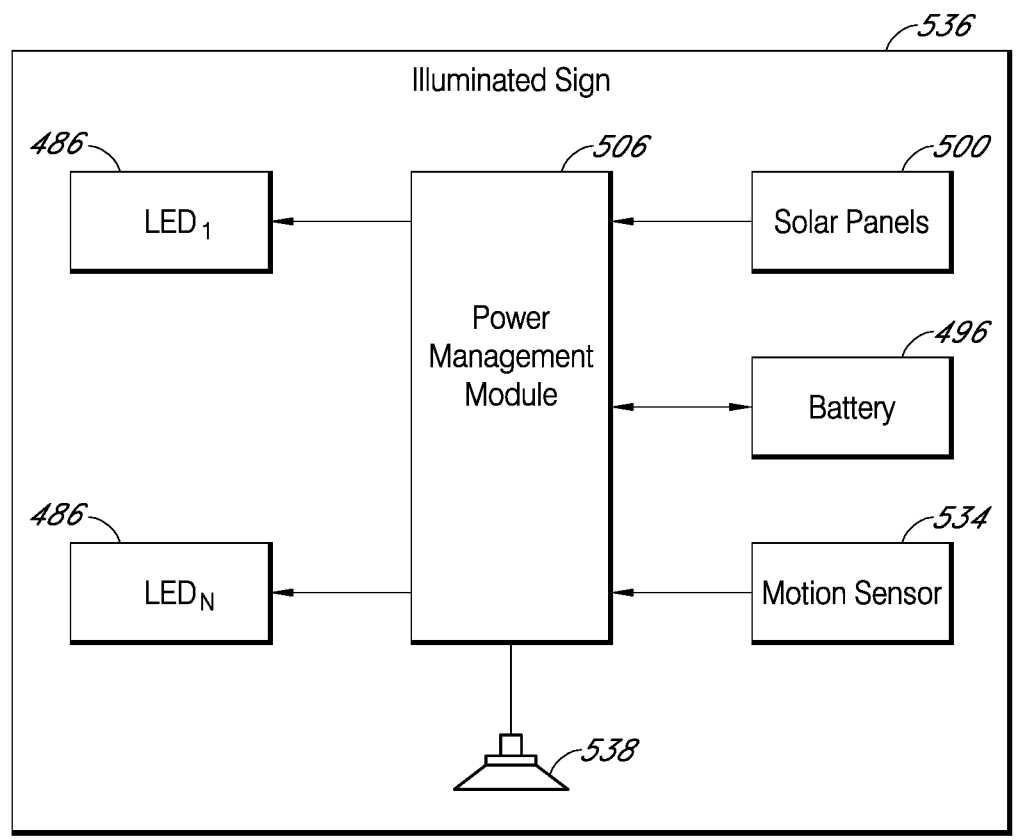
FIG. 22 is a functional block diagram of certain components of another embodiment of an illuminated sign for A/V recording and communication devices according to an aspect of the present disclosure.

Alternative embodiments of the present illuminated sign may include additional features and/or components. For example, the illuminated sign may play audio in response to motion detection, With reference to FIG. 22, an embodiment of the illuminated sign 536 that may play audio may include a speaker 538. In the illustrated embodiment, the speaker 538 is operatively connected to the processor/power management module 506, While not shown in FIG. 22, the illuminated sign 536 may also include an audio CODEC (COder-DECoder) that converts digital signals from the processor 506 into analog audio signals for playback by the speaker 538.

In embodiments of the present illuminated sign 536 that play audio in response to motion detection, when the motion sensor 534 detects motion near the illuminated sign 536, the motion sensor 534 may send a signal to the power management module 506. In response to the signal from the motion sensor 534, the power management module 506 may activate the speaker 538 to play audio. The audio may comprise, for example, a buzzing, beeping, or siren-type of sound and/or speech. The speech may be synthesized or may be a recorded human voice, and may warn would-be perpetrators that their activities are being monitored and recorded. This aspect may further enhance the crime deterrent effect of the present illuminated sign 536, because would-be perpetrators may be scared off by the sound generated by the speaker 538 and/or by the verbal warnings that their activities are being monitored and recorded. When the motion is no longer detected, and/or when a timer expires, the power management module 505 may deactivate the speaker 538.

Figure 23:
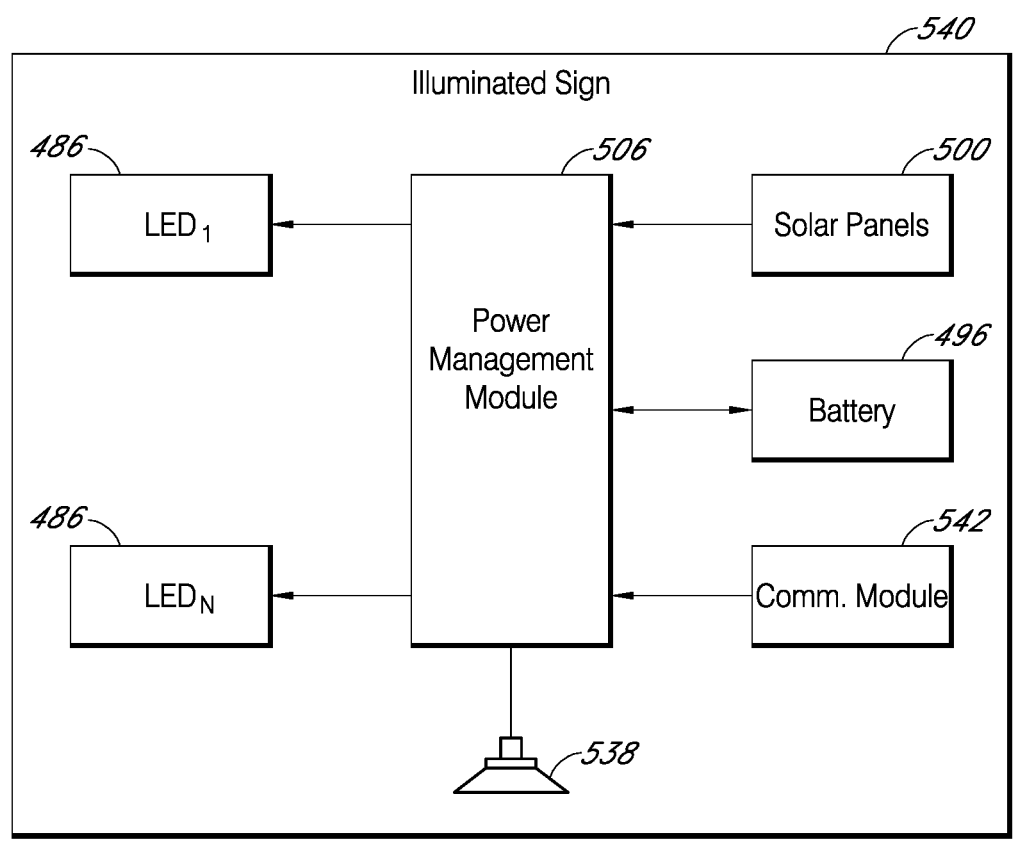
FIG. 23 is a functional block diagram of certain components of another embodiment of an illuminated sign for A/V recording and communication devices according to an aspect of the present disclosure.

In another example, embodiments of the present illuminated sign may play audio in response to user intervention. With reference to FIG. 23, an embodiment of the illuminated sign 540 that may play audio may include the speaker 538 described above and a communication module 542. The communication module 542 may comprise an integrated circuit including a processor core, memory, programmable input/output peripherals, and/or a wireless antenna. The communication module 542 may be configured to send and/or receive wireless communication signals. The user may control the activation of the speaker 538 and/or the illumination of the LEDs 486 by sending wireless signals from any wireless device to the illuminated sign via the communication module 542. The wireless device may comprise, for example, the client device 114. The wireless signals may be sent using any suitable wireless protocol, such as Wi-Fi (IEEE 802.11), Bluetooth, or Bluetooth low energy (Bluetooth LE, BLE, Bluetooth Smart), and the wireless signals may be sent directly from the wireless device to the illuminated sign 540, or the wireless signals may be sent from the wireless device to the illuminated sign 540 via one or more other components, such as a wireless router in the user's network 110 and/or one or more network devices in the network 112.

In another example, embodiments of the present illuminated sign may be integrated into a home security/alarm system. For example, the embodiment of FIG. 23, which includes the communication module 542, may receive wireless signals from a home security/alarm system, and may flash (via the LEDs 486) and/or play audio (via the speaker 538) in response to the received signals.

Any of the embodiments described herein may be combined with any of the other embodiments described herein. For example, the embodiment of FIG. 22 may be combined with the embodiment of FIG. 23. Such an embodiment includes both the motion sensor 534 and the communication module 542, and is therefore well adapted for all of the functionality described above with respect to FIGS. 22 and 23.

One aspect of the present embodiments includes the realization that cars speeding through a neighborhood present a danger to every person in that neighborhood. Therefore, one way to make neighborhoods safer is by reducing speeding. The present embodiments empower neighborhood residents to apply social pressure to problem speeders, thereby encouraging those speeders to alter their speeding behavior. For example, some of the present embodiments include a speed detector. The speed detector may be a standalone device, or may be integrated into another device, such as an illuminated signal device in an A/V recording and communication system. Speed data from the speed detector, along with image data (e.g., a photograph and/or a video) of the speeding car, may be posted to a social network. The social network post may be seen by others who live in the neighborhood where the photograph and/or video of the speeding car was taken. Those persons may then apply pressure to the speeder, encouraging him or her not to speed through the neighborhood anymore. Further, the social network post may provide a warning to others who live in the neighborhood where the photograph and/or video of the speeding car was taken, encouraging those people who see the social network post to be watchful for the speeding car so that they are not endangered by the speeder in the future.

Figure 24:
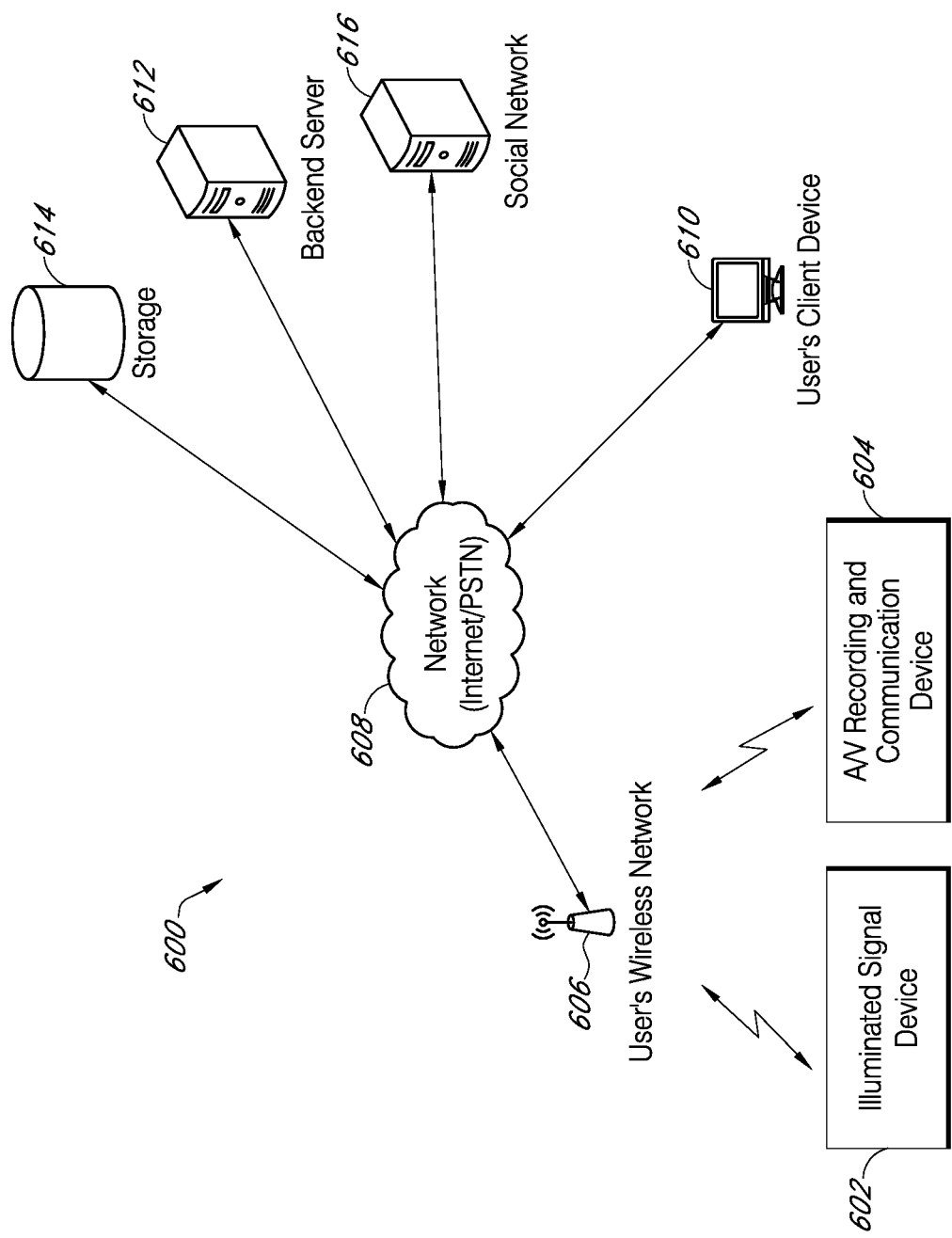
FIG. 24 is a diagram of one embodiment of a system for providing a warning message of a passing vehicle using an illuminated signal device and speed detector according to various aspects of the present disclosure.

FIG. 24 is a diagram of one embodiment of a system for providing a warning message of a passing vehicle using an illuminated signal device and speed detector according to an aspect of the present disclosure. The system 600 may include an illuminated signal device 602 configured to access a user's network 606 to connect to a network (Internet/PSTN) 608. In some embodiments, the system 600 may also include an A/V recording and communication device 604 also configured to access the user's network 606 to connect to the network 608. In various embodiments, the user's network 606 may be for example a wired and/or wireless network, as described above. In some embodiments, the A/V recording and communication device 604, the user's network 606, and the network 608 may be similar in structure and/or function to the A/V recording and communication device 130 (FIGS. 2-12), the user's network 110, and the network 112 (FIG. 1), respectively.

Typically, the illuminated signal device 602 and/or the A/V recording and communication device 604 may be placed in an area having a view of a roadway, such that the illuminated signal device 602 and/or the A/V recording and communication device 604 are configured to detect passing vehicles and provide a warning message of a passing vehicle to a social network, as described in further detail below. Further, the illuminated signal device 602 and the A/V recording and communication device 604 may be configured to communicate directly with one another using any suitable wireless protocol, such as (but not limited to) Wi-Fi (IEEE 802.11), Bluetooth, or various Bluetooth low energy modes (e.g., Bluetooth LE, BLE, Bluetooth Smart). Alternatively, the illuminated signal device 602 and the A/V recording and communication device 604 may communicate via one or more peripheral components, such as (but not limited to) a wireless router (not shown) in the user's wireless network 606. In addition, the A/V recording and communication device 604 may include a camera that is external to the illuminated signal device 602 but configured to work in conjunction with the illuminated signal device 602, as further described below.

In further reference to FIG. 24, the system 600 may include a user's client device 610 configured to be in network communication with the illuminated signal device 602 and/or the A/V recording and communication device 604. The system 600 may further include a storage device 614 and a backend server 612 in network communication with the illuminated signal device 602 and/or the A/V recording and communication device 604 for providing a warning message of a passing vehicle to a social network 616. In some embodiments, the storage device 614 may be a separate device from the backend server 612 (as illustrated) or be an integral component of the backend server 612. In some embodiments, the user's client device 610 and the storage device 614 may be similar in structure and/or function to the user's client device 114 and the storage device 116 (FIG. 1), respectively. Also in some embodiments, the backend server 612 may be similar in structure and/or function to the server 118 and/or the backend API 120 (FIG. 1).

With further reference to FIG. 24, as further described below, the components of the system 600 may be configured for providing a warning message of a passing vehicle to a social network 616. The social network 616 may include any social media service or platform that uses computer-mediated tools that allow participants to create, share, and/or exchange information in virtual communities and/or networks, such as (but not limited to) social networking websites and/or applications running on participant devices. Non-limiting examples of social networks include Facebook, Twitter, Snapchat, and Nextdoor.

In alternative embodiments, a system for providing a warning message of a passing vehicle may include a speed detector configured to perform at least some of the same (or similar) functions as the illuminated signal device 602. In some embodiments, the speed detector may replace the illuminated signal device 602 within the system 600. Alternatively, the speed detector may be an additional component to the system 600 for providing a warning message of a passing vehicle. In addition, the speed detector may be a standalone device and/or be integrated into any other device. For example, as a standalone device, the speed detector may be mounted on a post and placed in a front yard in view of, or concealed from view of, the passing vehicle. In other examples, the speed detector may be mounted to a structure such as (but not limited to) the user's home or garage or adhered to a mailbox. Alternatively, the speed detector may be integrated into a security camera, an A/V recording and communication doorbell, and/or an A/V recording and communication security camera.

Figure 25:
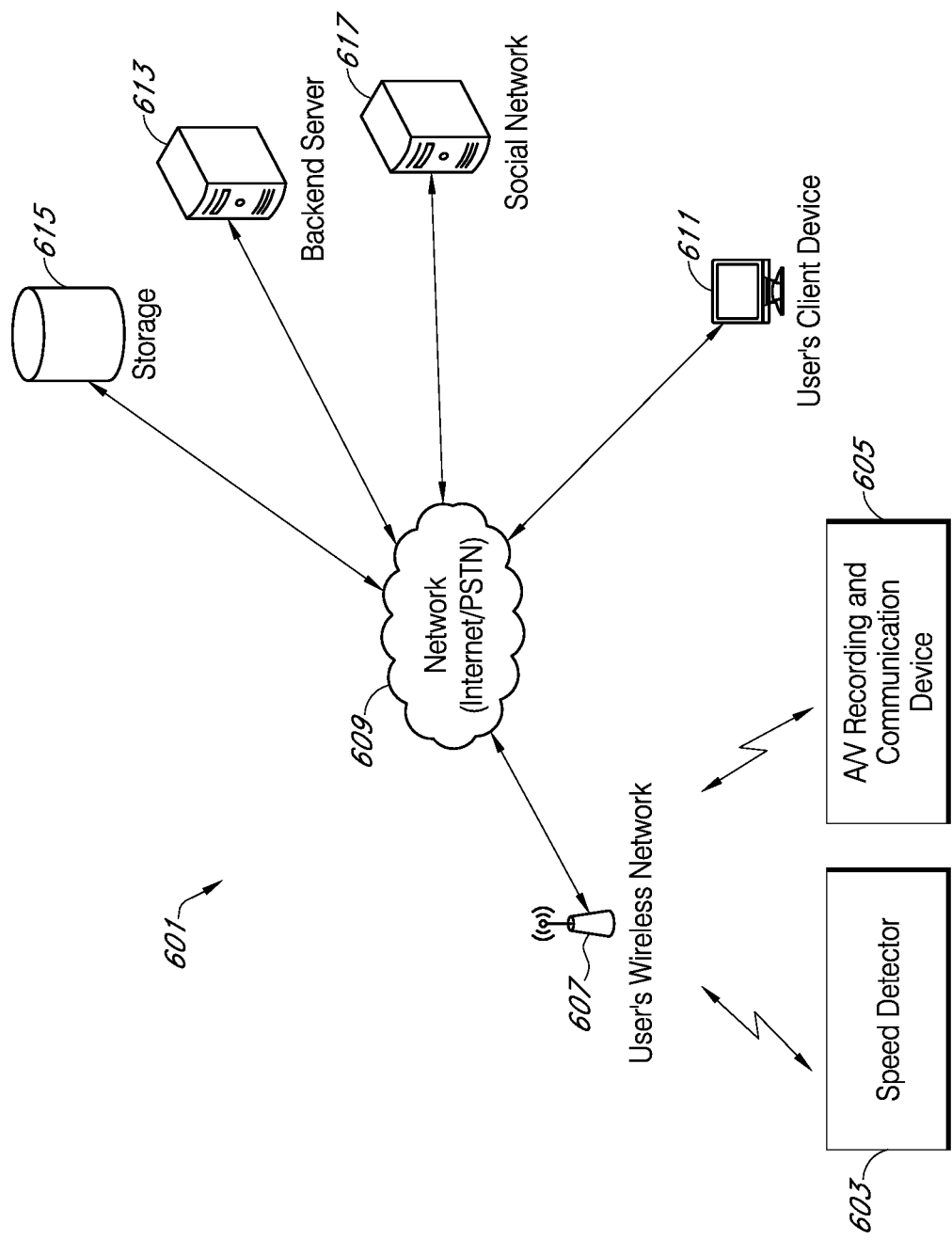
FIG. 25 is a diagram of another embodiment of a system for providing a warning message of a passing vehicle using a speed detector according to various aspects of the present disclosure.

FIG. 25 is a diagram of one embodiment of a system for providing a warning message of a passing vehicle using a speed detector according to another aspect of the present disclosure. The system 601 may include a speed detector 603 configured to access a user's network 607 to connect to a network (Internet/PSTN) 609. In various embodiments, the user's network 607 may be for example a wired and/or wireless network, as described above. In some embodiments, the system 601 may also include an A/V recording and communication device 605 also configured to access the user's network 607 to connect to the network 609. In some embodiments, the A/V recording and communication device 605, the user's network 607, and the network 609 may be similar in structure and/or function to the A/V recording and communication device 130 (FIGS. 2-12), the user's network 110, and the network 112 (FIG. 1), respectively.

Typically, the speed detector 603 and/or the A/V recording and communication device 605 may be placed in an area having a view of a roadway, such that the speed detector 603 and/or the A/V recording and communication device 605 are configured to detect passing vehicles and provide a warning message of a passing vehicle to a social network, as described in further detail below. Further, the speed detector 603 and the A/V recording and communication device 605 may be configured to communicate directly with one another using any suitable wireless protocol, such as (but not limited to) (IEEE 802.11), Bluetooth, or various Bluetooth low energy modes (e.g., Bluetooth LE, BLE, Bluetooth Smart). Alternatively, the speed detector 603 and the A/V recording and communication device 605 may communicate via one or more peripheral components, such as (but not limited to) a wireless router (not shown) in the user's network 607. In addition, the A/V recording and communication device 605 may include a camera that is external to the speed detector 603 but configured to work in conjunction with the speed detector 603, as further described below.

In further reference to FIG. 25, the system 601 may include a user's client device 611 configured to be in network communication with the speed detector 603 and/or the A/V recording and communication device 605. The system 601 may further include a storage device 615 and a backend server 613 in network communication with the speed detector 603 and/or the A/V recording and communication device 605 for providing a warning message of a passing vehicle to a social network 617. As discussed above, the storage device 615 may be a separate device from the backend server 613 (as illustrated) or be an integral component of the backend server 613. In some embodiments, the user's client device 611 and the storage device 615 may be similar in structure and/or function to the user's client device 114 and the storage device 116 (FIG. 1), respectively. Also in some embodiments, the backend server 613 may be similar in structure and/or function to the server 118 and/or the backend API 120 (FIG. 1).

With further reference to FIG. 25, as further described below, the components of the system 601 may be configured for providing a warning message of a passing vehicle to a social network 617. The social network 617 may include any social media service or platform that uses computer-mediated tools that allow participants to create, share, and/or exchange information in virtual communities and/or networks, such as (but not limited to) social networking websites and/or applications running on participant devices.

Figure 26:
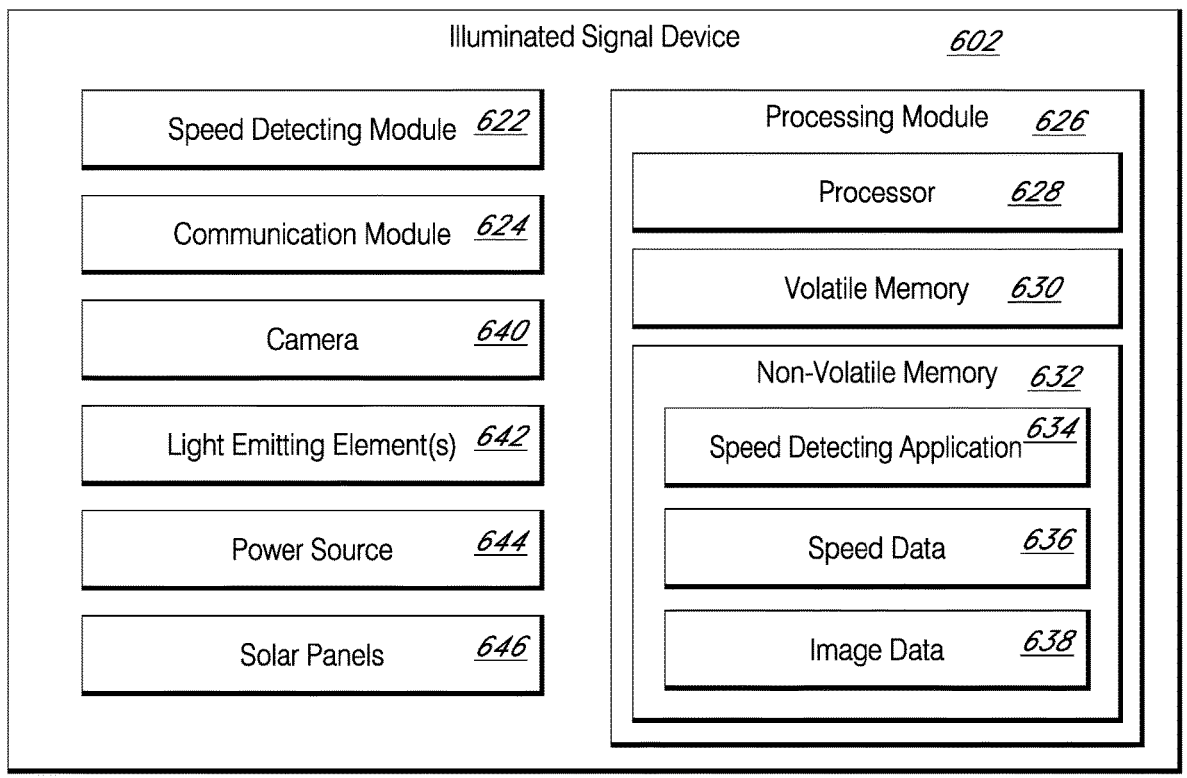
FIG. 26 is a functional block diagram of one embodiment of an illuminated signal device and speed detector according to an aspect of the present disclosure.

FIG. 26 is a functional block diagram of an embodiment of the illuminated signal device 602 according to an aspect of the present disclosure. The illuminated signal device 602 may include a processing module 626 that is operatively connected to a speed detecting module 622 and a communication module 624. The processing module may comprise a processor 628, a volatile memory 630, and a non-volatile memory 632 that includes a speed detecting application 634. The speed detecting application 634 may be used to configure the processor 628 to perform various functions, including (but not limited to) detecting motion of a passing vehicle using the speed detecting module 622, obtaining speed data 636 of the passing vehicle using the speed detecting module 622, and transmitting the obtained speed data 636 to the backend server 612 using the communication module 624, as further discussed below. In some embodiments, the speed detecting module 622 may comprise (but is not limited to) at least one passive infrared (PIR) sensor, a radar device, or a lidar (light detection and ranging) device. Further, in some embodiments, the communication module 624 may comprise (but is not limited to) one or more transceivers and/or wireless antennas configured to transmit and receive wireless signals.

In the illustrated embodiment of FIG. 26, the processing module 626, the speed detecting module 622, and the communication module 624 are represented by separate boxes. The graphical representation depicted in FIG. 26 is, however, merely one example, and is not intended to indicate that any of the processing module 626, the speed detecting module 622, and/or the communication module 624 are necessarily physically separate from one another, although in some embodiments they might be. In other embodiments, however, the structure and/or functionality of any or all of these components may be combined. For example, either or both of the speed detecting module 622 and the communication module 624 may include its own processor, volatile memory, and/or non-volatile memory.

In some embodiments, the illuminated signal device 602 may also comprise a camera 640 that is operatively connected to the processing module 626 and configured to obtain image data 638 of the passing vehicle. The obtained image data 638 may be transmitted to the backend server 612, as further discussed below. In addition, the illuminated signal device 602 may also include a power source 644 and at least one light emitting element 642. In some embodiments, the power source 644 may comprise a rechargeable battery connected to at least one solar panel 646 for providing power to the illuminated signal device 602.

Figure 27:
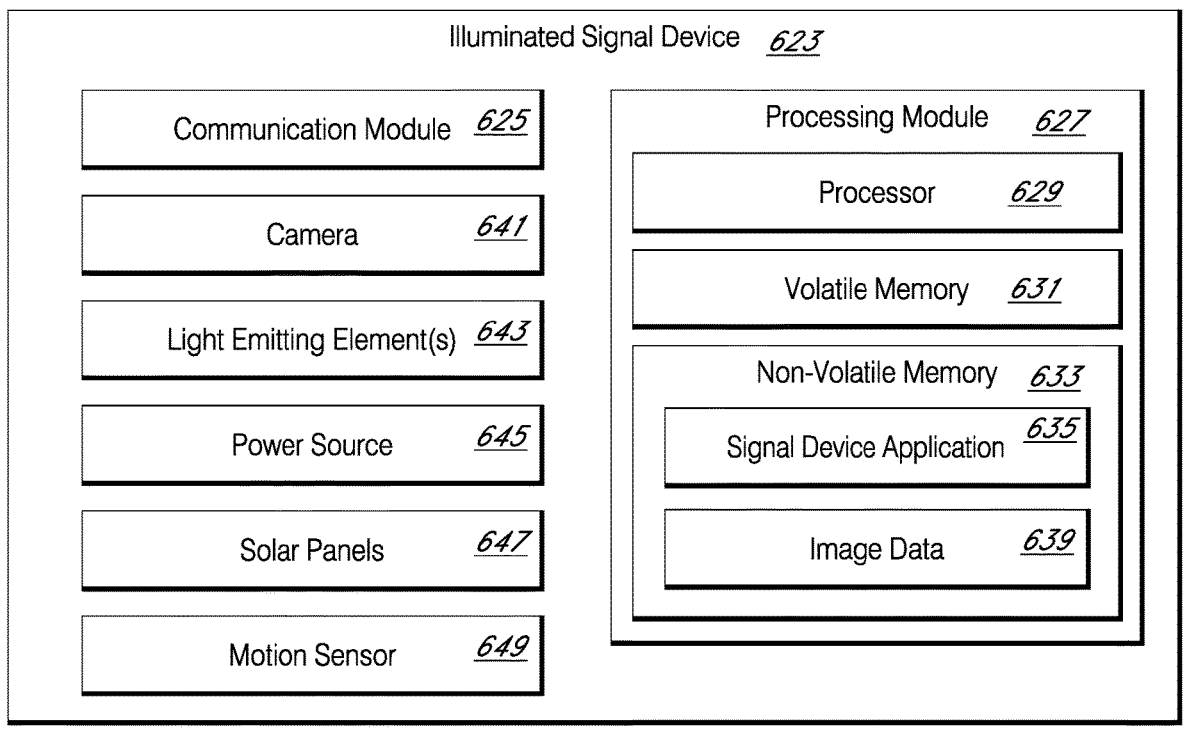
FIG. 27 is a functional block diagram of another embodiment of the illuminated signal device according to an aspect of the present disclosure.

FIG. 27 is a functional block diagram of another embodiment of the illuminated signal device 623 according to an aspect of the present disclosure. The illuminated signal device 623 may include a processing module 627 that is operatively connected to a camera 641, at least one motion sensor 649, and a communication module 625. The processing module may comprise a processor 629, a volatile memory 631, and a non-volatile memory 633 that includes a signal device application 635. The signal device application 635 may be used to configure the processor 629 to perform various functions, including (but not limited to) detecting motion using the camera 641 and/or the motion sensor 649, capturing image data 639 within a field of view of the camera 641 including (but not limited to) image data 639 of a person or a passing vehicle, and transmitting the image data 639 to the backend server 612 using the communication module 625, as further discussed below. In some embodiments, the motion sensor 649 may comprise, for example, at least one passive infrared (PIR) sensor, or any other type of motion sensing device. In some embodiments, the camera 641 may comprise, for example, a high definition (HD) video camera, such as one capable of capturing image data 639 at an image display resolution of 720p or better. In some embodiments, the illuminated signal device 623 may comprise various additional components such as (but not limited to) a radar device or a lidar (light detection and ranging) device. In various embodiments, the illuminated signal device 623 may begin capturing image data 639 using the camera 641 when a person, car, or any other object is within the field of view of the camera 641. For example, in some embodiments, the illuminated signal device 623 may begin capturing image data 639 using the camera 641 upon detecting a person, car, or any other object using the at least one motion sensor 649, radar device, or lidar device. In some embodiments, the illuminated signal device 623 may begin capturing image data 639 using the camera 641 upon detecting a person, car, or any other object using the camera 641.

In further reference to FIG. 27, the signal device application 635 may be used to configure the processor 629 to perform various functions, including (but not limited to) connecting the illuminated signal device 623 to a client device 610 using processes similar to processes used to connect an A/V recording and communication doorbell 130 and a user's client device 114 (FIG. 16). For example, an object may move into the field of view of the camera 641 that is detected by the illuminated signal device 623 using the camera 641 and/or the motion sensor(s) 649, as described above. In various embodiments, the camera 641 and/or the motion sensor(s) 649 may trigger the communication module 625 to send a request to a network device, such as (but not limited to) the backend server 612. The backend server 612 may connect the illuminated signal device 623 to the user's client device 610 through the user's network 606 and the network 608. In various embodiments, the illuminated signal device 623 may capture image data 639 using the camera 641 and stream the image data 639 to the user's client device 610 using the communication module 625. In some embodiments, the illuminated signal device 623 may also include a microphone to capture audio data and transmit the audio data to the user's client device 610 using the communication module 625, as described above. In various embodiments, the user may receive a notification prompting the user to either accept or deny the notification. In many embodiments, the illuminated signal device 623 may receive a confirmation from the backend server 613 that the user has accepted or denied the notification to connect. If the notification is accepted, then live image data 639, may be displayed on the user's client device 610, thereby allowing the user surveillance from the perspective of the illuminated signal device 623. In some embodiments where the illuminated signal device includes the microphone and audio data is also captured, the audio data may be played back on the user's client device 610, thereby allowing the user additional surveillance from the perspective of the illuminated signal device 623. When the user is satisfied, the user may sever the connection, thereby ending the communication session. If, however, the user denies the notification, or ignores the notification and a specified time interval elapses, then the connection between the illuminated signal device 623 and the user's client device 610 may be terminated and the image data 639 and/or audio data may be recorded and stored at the backend server 612 and/or storage 614, such that the user may view and access the image data 639 and/or audio data later at his or her convenience. In some embodiments, the illuminated signal device 623 may be configured to record image data 639 and/or audio data for a specified period of time in the event the notification is denied or ignored by the user. If such a time period is set, the illuminated signal device 623 may record data for that period of time before ceasing operation, thereby ending the communication session. In some embodiments, the audio data and/or image data 639 may be recorded and stored at the backend server 612 and/or storage 614 even when the user accepts the notification and the image data 639 is viewed on the user's client device 610.

In the illustrated embodiment of FIG. 27, the processing module 627, the camera 641, and the communication module 625 are represented by separate boxes. The graphical representation depicted in FIG. 27 is, however, merely one example, and is not intended to indicate that any of the processing module 627, the camera 641, and/or the communication module 625 are necessarily physically separate from one another, although in some embodiments they might be. In other embodiments, however, the structure and/or functionality of any or all of these components may be combined. For example, either or both of the camera 641 and the communication module 625 may include its own processor, volatile memory, and/or non-volatile memory. Further, in some embodiments, the communication module 625 may comprise (but is not limited to) one or more transceivers and/or wireless antennas configured to transmit and receive wireless signals.

In further reference to FIG. 27, the illuminated signal device 623 may also include a power source 645 and at least one light emitting element 643. In some embodiments, the power source 645 may comprise a rechargeable battery connected to at least one solar panel 647 for providing power to the illuminated signal device 623. Further, the illuminated signal device 623 may include a front panel and an illumination source, wherein the illumination source is configured to illuminate the front panel to provide a warning that the area adjacent to the illuminated signal device 623 is within a field of view of one or more A/V recording and communication devices, as further described above. For example, in some embodiments, the illumination source may comprise a plurality of light-emitting diodes (LEDs) distributed evenly about an interior perimeter of the illuminated signal device 623, as further described above. In some embodiments, the illuminated signal device 623 may also include a frame configured to at least partially surround an outer perimeter of the front panel, as described above. Further, the illuminated signal device 623 may comprise a stake configured to be driven into the ground and configured to provide support to the frame, as described above. In addition, in some embodiments, the front panel and the frame may comprise an interior space that contains and protects components of the illuminated signal device 623, as described above.

Figure 28:
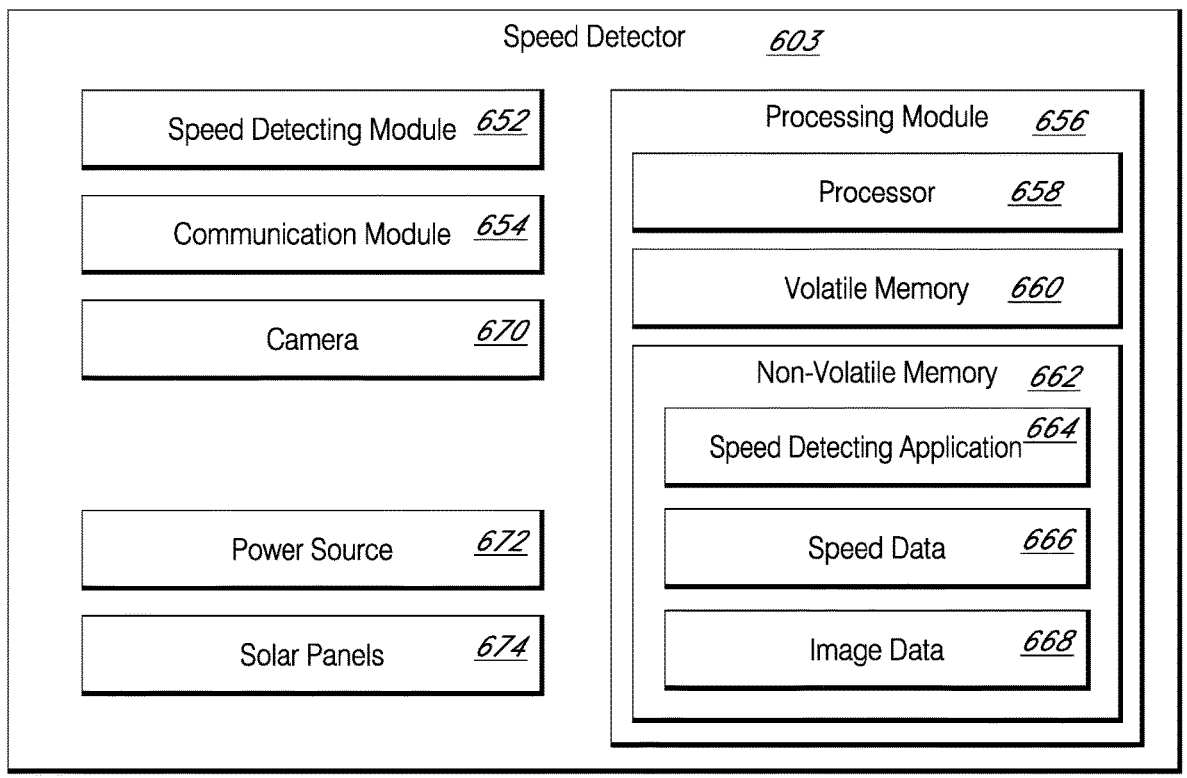
FIG. 28 is a functional block diagram of one embodiment of a speed detector according to an aspect of the present disclosure.

FIG. 28 is a functional block diagram of an embodiment of the speed detector 603 according to an aspect of the present disclosure. The speed detector 603 may include a processing module 656 that is operatively connected to a speed detecting module 652 and a communication module 654. The processing module may comprise a processor 658, a volatile memory 660, and a non-volatile memory 662 that includes a speed detecting application 664. The speed detecting application 664 may be used to configure the processor 658 to perform various functions, including (but not limited to) detecting motion of a passing vehicle using the speed detecting module 652, obtaining speed data 666 of the passing vehicle using the speed detecting module 652, and transmitting the obtained speed data 666 to the backend server 613 using the communication module 654, as further discussed below. In some embodiments, the speed detecting module 652 may comprise (but is not limited to) at least one passive infrared (PIR) sensor, a radar device, or a lidar (light detection and ranging) device. Further, in some embodiments, the communication module 654 may comprise (but is not limited to) one or more transceivers and/or wireless antennas configured to transmit and receive wireless signals.

In the illustrated embodiment of FIG. 28, the processing module 656, the speed detecting module 652, and the communication module 654 are represented by separate boxes. The graphical representation depicted in FIG. 28 is, however, merely one example, and is not intended to indicate that any of the processing module 656, the speed detecting module 652, and/or the communication module 654 are necessarily physically separate from one another, although in some embodiments they might be. In other embodiments, however, the structure and/or functionality of any or all of these components may be combined. For example, either or both of the speed detecting module 652 and the communication module 654 may include its own processor, volatile memory, and/or non-volatile memory.

In some embodiments, the speed detector 603 may also comprise a camera 670 that is operatively connected to the processing module 656 and configured to obtain image data 668 of a passing vehicle. The obtained image data 668 may be transmitted to the backend server 613, as further discussed below. In addition, the speed detector 603 may also include a power source 672. In some embodiments, the power source 672 may comprise a rechargeable battery connected to at least one solar panel 674 for providing power to the speed detector 603.

Figure 29:
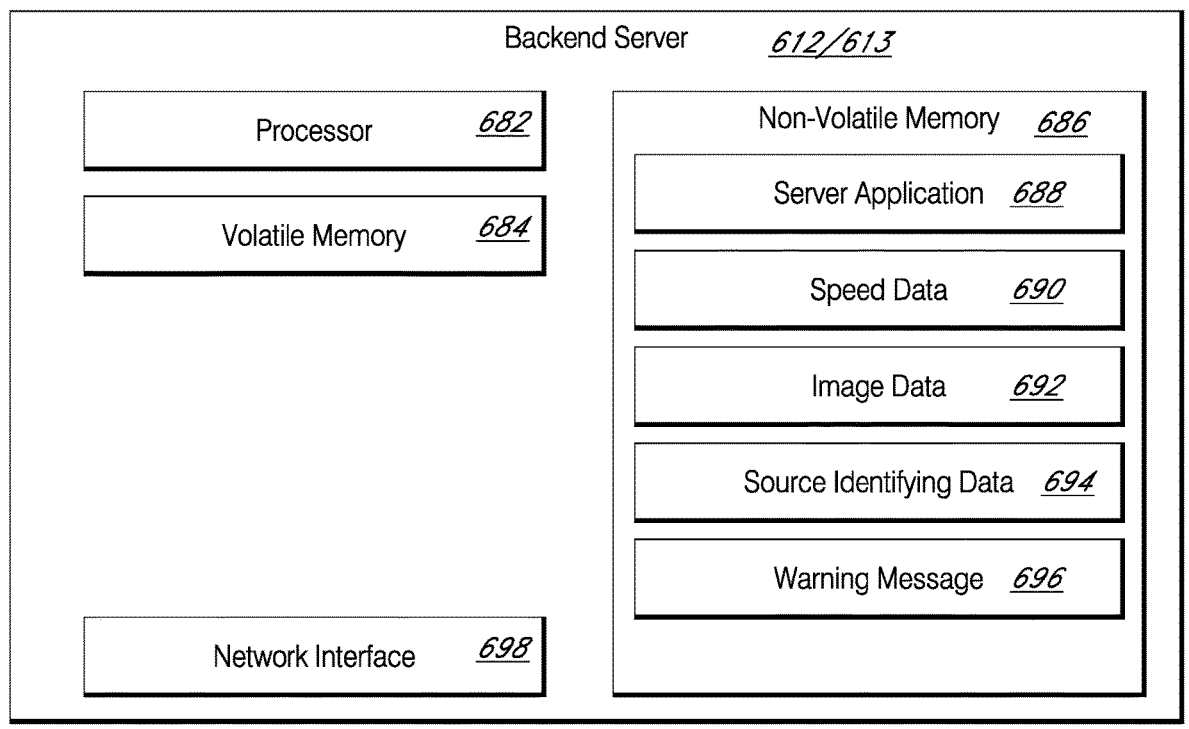
FIG. 29 is a functional block diagram of one embodiment of a backend server according to an aspect of the present disclosure.

FIG. 29 is a functional block diagram of an embodiment of the backend server 612/613 according to an aspect of the present disclosure. The backend server 612/613 may include a processor 682, a volatile memory 684, and a non-volatile memory 686 that includes a server application 688. The server application 688 may be used to configure the processor 682 to perform various functions, including (but not limited to) receiving speed data 690 and source identifying data 694 from the illuminated signal device 602, the speed detector 603, and/or the A/V recording and communication device 604/605, determining at least one social network 616/617 to which to transmit a warning message 696, generating the warning message 696, and transmitting the generated warning message 696 to the at least one social network 616/617, as further discussed below. In some embodiments, the server application 688 may also be used to configure the processor 682 to receive image data 692, where the image data 692 may also be used in generating the warning message 696, as further discussed below. In addition, the backend server 612/613 may also include a network interface 698 for communicating over the network 608/609 (Internet/PSTN).

Figure 30:
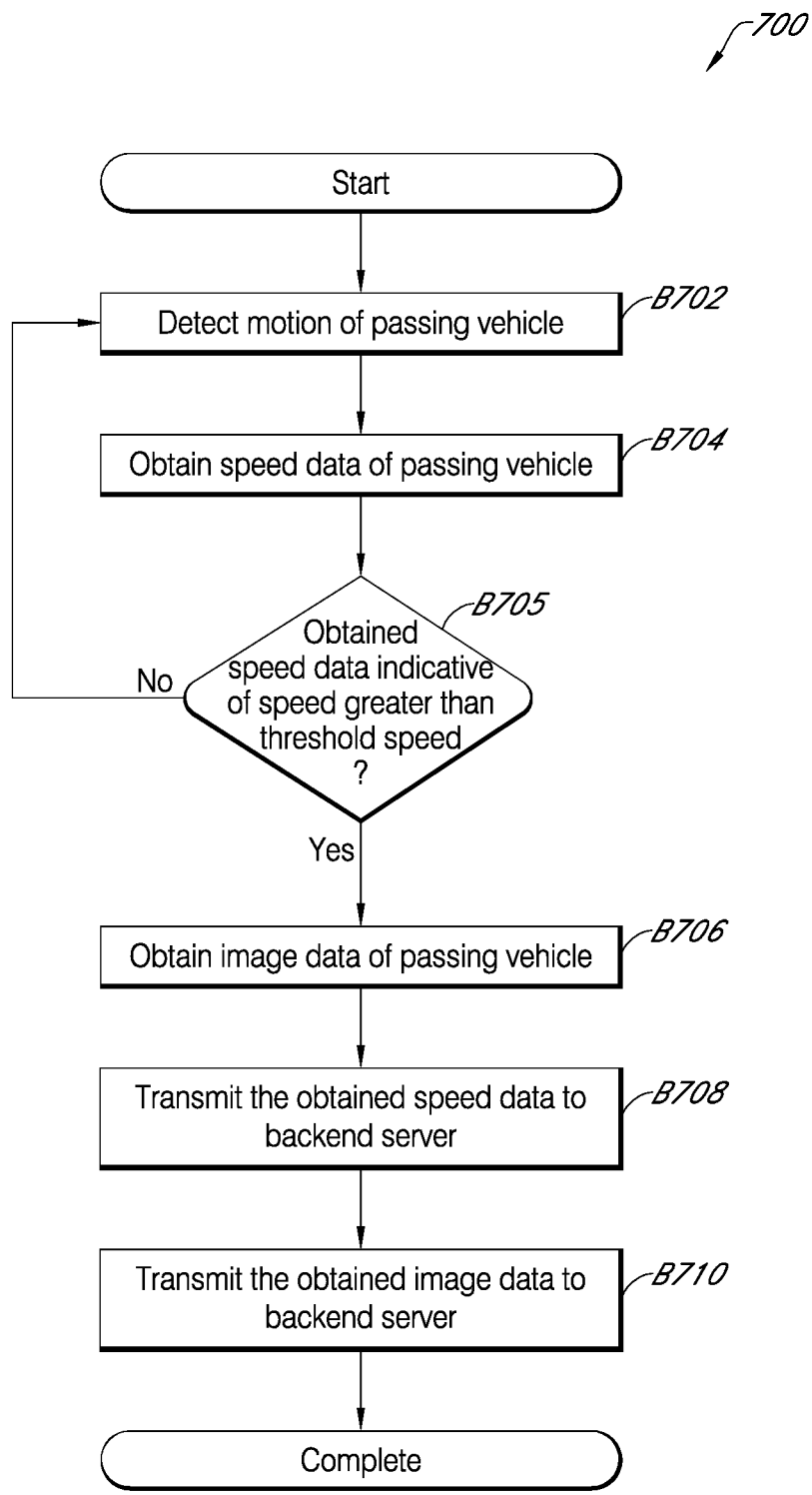
FIG. 30 is a flowchart illustrating one embodiment of a process at an illuminated signal device and speed detector for providing a warning message of a passing vehicle according to an aspect of the present disclosure.

FIG. 30 is a flowchart illustrating a process 700 at an illuminated signal device for providing a warning message of a passing vehicle according to an aspect of the present disclosure. Although the following flowcharts and description discuss the use of an illuminated signal device, a speed detector may be used instead of or in conjunction with an illuminated signal device in the following processes. As discussed above with respect to FIGS. 25-26, an illuminated signal device may include a processing module operatively connected to a speed detecting module and a communication module. Further, the present embodiments, including the processes described below, may be performed using the system 600 described above, including the illuminated signal device 602, and/or using the system 601 described above, including the speed detector 603. However, the present embodiments, including the processes described below, are not limited to using the system 600, or the illuminated signal device 602, or the system 601, or the speed detector 603.

In reference to FIG. 30, the process 700 may include detecting (block B702) motion of a passing vehicle and obtaining (block B704) speed data of the passing vehicle using a speed detecting module. In some embodiments, the speed detecting module may comprise (but is not limited to) at least one passive infrared (PIR) sensor, a radar device, or a lidar (light detection and ranging) device. In some embodiments, the type and/or format of the speed data may be determined by the configuration of the speed detecting module used. For example, speed data obtained using a PIR sensor may include (but is not limited to) data related to electromagnetic radiation between microwave and red visible light in the electromagnetic spectrum, and having frequencies between 300 gigahertz and 400 terahertz. Such radiation may include thermal radiation emitted by a passing vehicle. In another example, speed data obtained using a radar device may include (but is not limited to) data related to distance measurements and changes in frequency of returned radar signals caused by the Doppler effect, where the frequency of the returned signal is proportional to the passing vehicle's speed of approach and/or departure. In a further example, speed data obtained using a lidar device may include (but is not limited to) data related to pulsed laser light, stored time that a pulse reflection reached a detector, elapsed time of flight of a pulsed laser light, distance between pulsed laser lights, and/or the difference between pulse distances.

In further reference to FIG. 30, in some embodiments, the illuminated signal device may be configured to provide a warning message of the passing vehicle only when the speed of the passing vehicle is above a threshold speed. In such embodiments, the process 700 may include determining (block B705) whether the obtained speed data indicates that the speed of the passing vehicle is greater than the threshold speed, such as by comparing the obtained speed data to the threshold speed. If the indicated speed of the passing vehicle is equal to or less than the threshold speed, then the process 700 returns to detecting (block B702) motion of another passing vehicle. However, if the obtained speed data indicates a speed greater than the threshold speed, then the process may include transmitting (block B708) the obtained speed data of the passing vehicle to a backend server over a network using the communication module as further described below. In some embodiments, the threshold speed may be set by requesting a speed limit input from a user. In such embodiments, the user may consider the posted speed limit on the roadway that the passing vehicle is travelling and/or an amount of speed that the user may consider as inappropriate for the roadway in consideration of the surrounding area and/or neighborhood. In alternative embodiments, the threshold speed may be set by transmitting a request for a speed limit input using the communication module over the network 112 and receiving in response a speed limit based upon the geographic location of the illuminated signal device. In such embodiments, the received speed limit may be the posted speed limit on the roadway corresponding to the geographic location of the illuminated signal device. In further embodiments, the threshold speed may be set to a level above the received speed limit that a user may consider as inappropriate for the roadway in consideration of the surrounding area and/or neighborhood.

In further reference to FIG. 30, the process 700 may include transmitting (block B708) the obtained speed data of the passing vehicle over a network to a backend server using the communication module. The communication module may be configured to access the network (Internet/PSTN) using a user's network as described above. In some embodiments, the process 700 may also include obtaining (block B706) image data of a passing vehicle using a camera that may be operatively connected to the processing module. In such embodiments, the camera may be an integral part of the illuminated signal device. If image data is obtained, the process 700 may further include transmitting (block B710) the obtained image data to a backend server using the communication module. In various embodiments, image data may comprise image sensor data such as (but not limited to) exposure values and data regarding pixel values for a particular size grid. Further, image data may comprise converted image sensor data for standard image file formats such as (but not limited to) JPEG, JPEG 2000, TIFF, BMP, or PNG. In addition, image data may also comprise data related to video, where such data may include (but is not limited to) image sequences, frame rates, and the like. Moreover, image data may include data that is analog, digital, uncompressed, compressed, and/or in vector formats. Image data (and speed data) may take on various forms and formats as appropriate to the requirements of a specific application in accordance with the present embodiments.

While not shown in FIG. 30, the process 700 may include transmitting source identifying data to the backend server. The source identifying data may enable the backend server to determine which of one or more illuminated signal devices (and/or speed detectors) transmitted the speed data and/or the image data to the backend server. The backend server may use the source identifying data to determine one or more social networks to which to transmit a warning message about the vehicle associated with the speed data and/or the image data, as described in further detail below.

Figure 31:
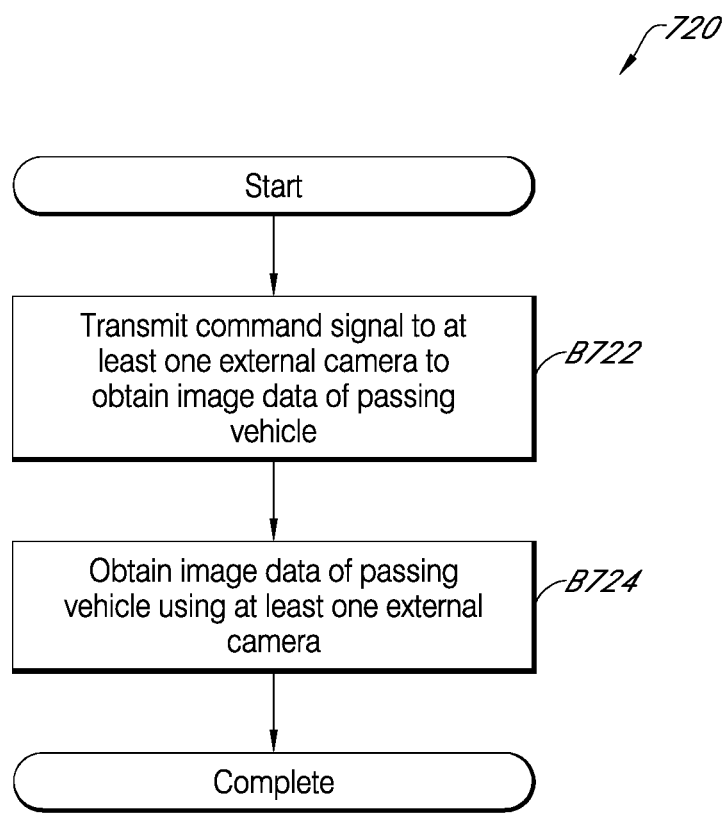
FIG. 31 is a flowchart illustrating one embodiment of a process for obtaining image data of a passing vehicle using at least one external camera according to an aspect of the present disclosure.

In further embodiments, the illuminated signal device (and/or the speed detector) may be in network communication with at least one external camera. For example, FIG. 31 is a flowchart illustrating a process 720 for obtaining image data of a passing vehicle using at least one external camera according to an aspect of the present disclosure. In some embodiments, the process 720 may be combined with the process 700 of FIG. 30. For example, the process 720 may be substituted into the process 700 at block B706 and/or block B710.

The process 720 may include an illuminated signal device configured to transmit (block B722) a first command signal to at least one external camera to obtain image data of a passing vehicle. In some embodiments, the at least one external camera may be part of another device such as (but not limited to) an A/V recording and communication device or a standalone device. In such embodiments, the illuminated signal device and the external camera may be configured to communicate directly using any suitable wireless protocol, such as (but not limited to) Wi-Fi (WEE 802.11), Bluetooth, or various Bluetooth low energy modes (e.g., Bluetooth LE, BLE, Bluetooth Smart). In addition, the illuminated signal device and the external camera may communicate via one or more peripheral components, such as (but not limited to) a wireless router (not shown) in the user's wireless network. In further reference to FIG. 31, the process 720 may include obtaining (block B724) image data of the passing vehicle using the at least one external camera. In some embodiments, the at least one external camera may be configured to directly transmit the obtained image data to either the backend server or to the illuminated signal device upon obtaining the image data. In additional embodiments, the at least one external camera may be configured to transmit the obtained image data to the backend server upon receiving a second command signal from the illuminated signal device, where the illuminated signal device may transmit the obtained image data to the backend server using the communication module as described above.

Figure 32:
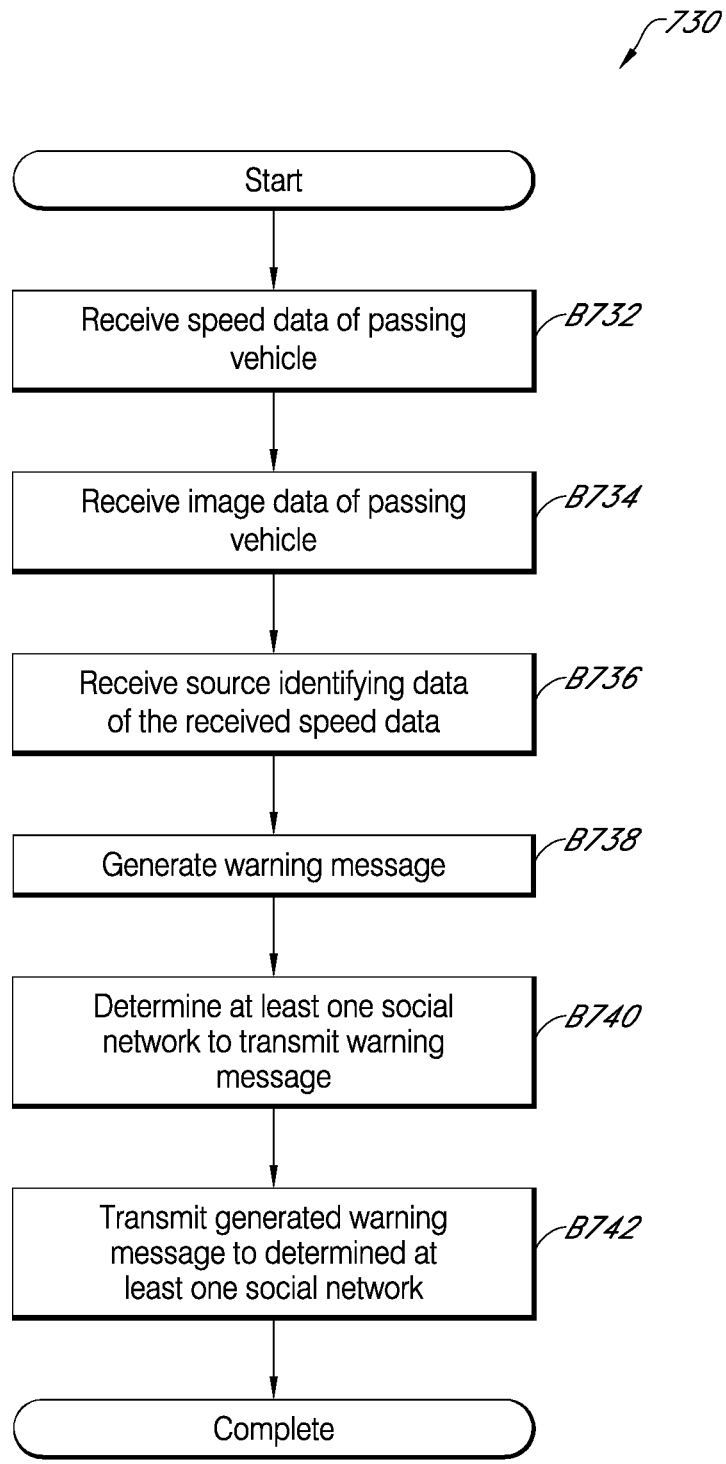
FIG. 32 is a flowchart illustrating one embodiment of a process at a backend server for providing a warning message of a passing vehicle according to an aspect of the present disclosure.

FIG. 32 is a flowchart illustrating a process at a backend server for providing a warning message of a passing vehicle according to an aspect of the present disclosure. The backend server may operate in connection with an illuminated signal device, a speed detector, and/or an A/V recording and communication device, as described above. The process 730 may include the backend server receiving (block B732) speed data of a passing vehicle from an illuminated signal device and/or a speed detector over a network (Internet/PSTN). In some embodiments, the process 730 may also include receiving (block B734) image data of the passing vehicle from an illuminated signal device and/or a speed detector obtained using a camera integral with and/or external to the illuminated signal device or the speed detector, respectively. In other embodiments, the backend server may receive (block B734) image data directly from an external camera, such as, but not limited to, an external camera of an A/V recording and communication device. The process 740 may also include receiving (block B736) source identifying data of the received speed data and/or the image data. In such embodiments, the backend server receives speed and image data that has been processed and formatted for transmission using a network protocol such as (but not limited to) Internet Protocol (IP), Transmission Control Protocol (TCP), User Datagram Protocol (UDP), IPv4, IPv5, and/or IPv6. The source identifying data may comprise data from a packet header and/or data used in the processing and formatting of the speed and/or image data in a manner well-known in the art.

In further reference to FIG. 32, the process 730 may include generating (block B738) a warning message of a passing vehicle using the received speed data. In some embodiments, the process may also include generating (block B738) the warning message of the passing vehicle using the received speed data and image data. The process may further include determining (block B740) at least one social network and transmitting (block B742) the generated warning message to the determined at least one social network.

As described above, a social network may include any social media service or platform that uses computer-mediated tools that allow participants to create, share, and/or exchange information in virtual communities and/or networks such as (but not limited to) social networking websites and/or various applications running on participant devices. Non-limiting examples of social networks include Facebook, Twitter, Snapchat, and Nextdoor. While the present embodiments are not limited to use with any particular social network, or type of social network, the present embodiments may nevertheless be well adapted for use with a neighborhood-oriented social network, such as Nextdoor. Nextdoor is a social networking service for neighborhoods. Nextdoor allows users to connect with people who live in their neighborhood and/or in nearby neighborhoods. Nextdoor differentiates itself from other social networking services by limiting access to posts to the people in the same neighborhood as the poster, or those nearby. As described above, in some aspects the present embodiments provide a warning message of a passing vehicle. When the warning message is posted to a social networking service for neighborhoods, the post is more likely to be seen by people who live in the neighborhood where the image of the passing vehicle was captured. The warning message is thus more likely to be relevant to these people, both as a warning to those people to be watchful for the speeding car in the future, and because those people are more likely to recognize the speeding car, which may help to identify the driver so that social pressure may be applied to that person to stop speeding through the neighborhood.

Figure 33:
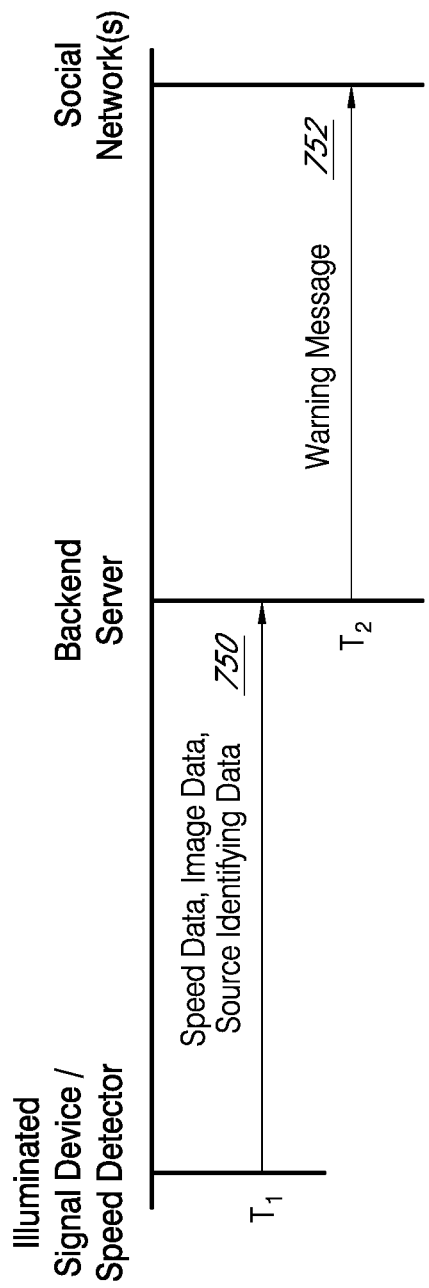
FIGS. 33-35 are sequence diagrams illustrating embodiments of processes for providing a warning message of a passing vehicle according to various aspects of the present disclosure.
Figure 34:
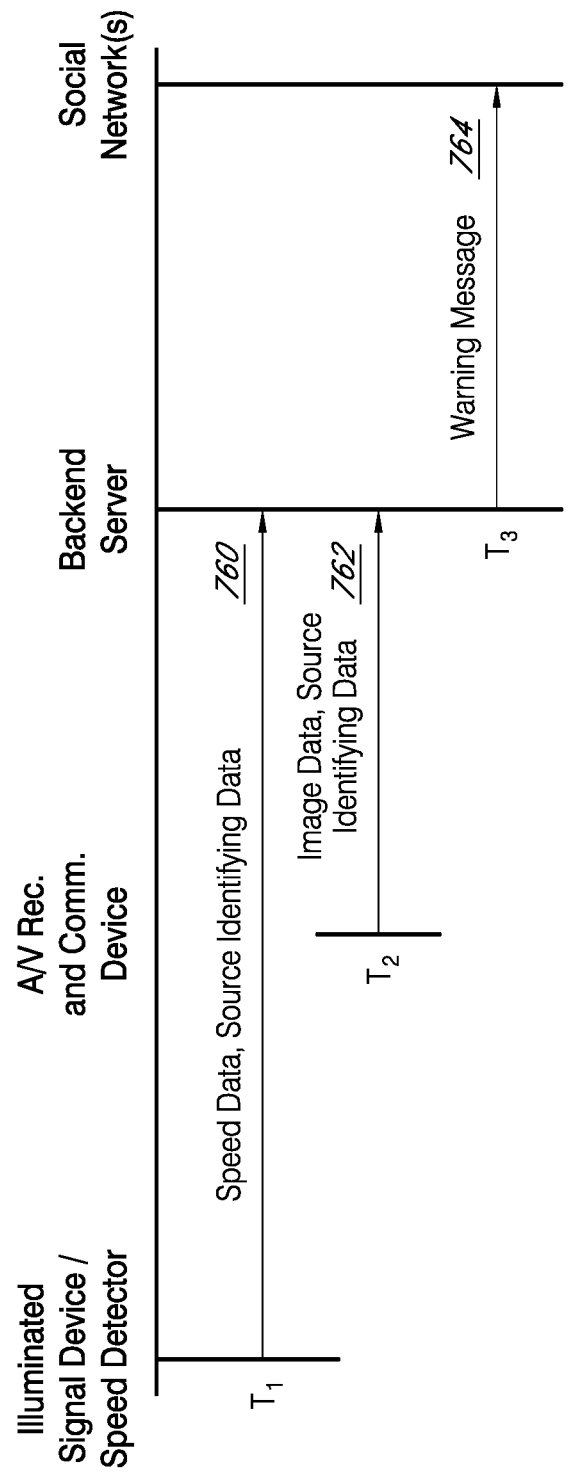
Figure 35:
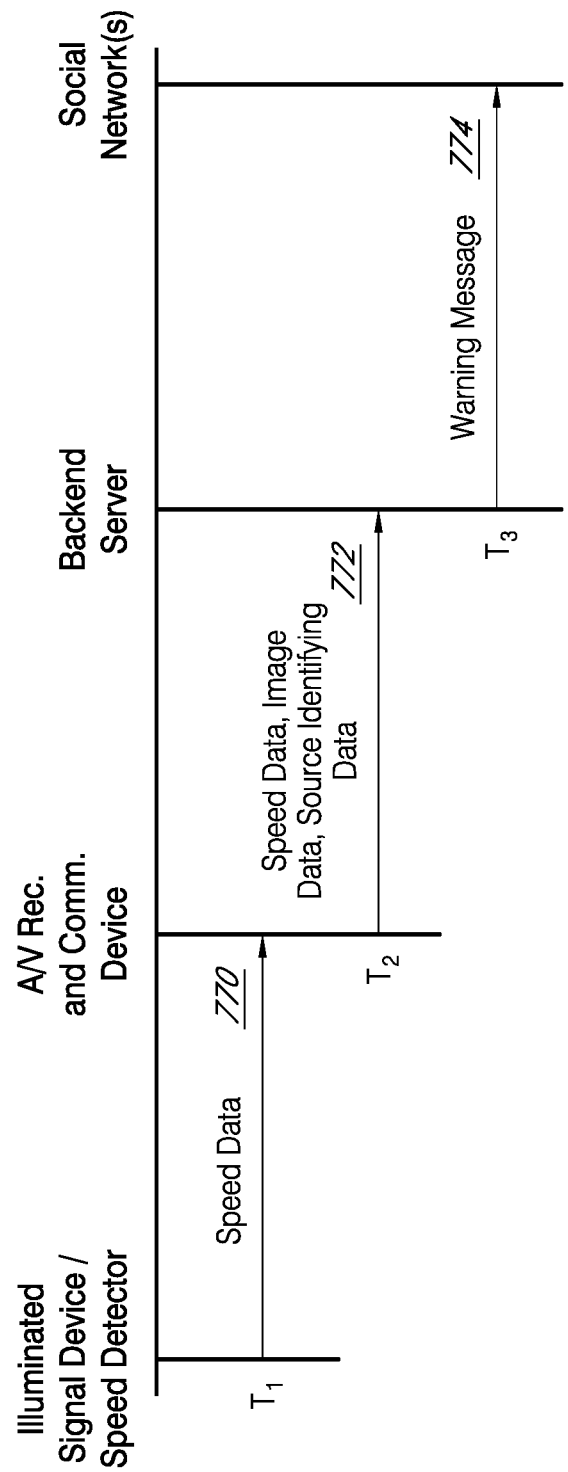

FIGS. 33-35 are sequence diagrams illustrating embodiments of processes for providing a warning message of a passing vehicle according to various aspects of the present disclosure. With reference to FIG. 33, the process may include an illuminated signal device and/or speed detector, a backend server, and at least one social network. In such embodiments, at a time $T_1$, the illuminated signal device and/or speed detector may transmit speed data, image data, and source identifying data 750 to the backend server. Prior to transmitting the speed data, image data, and source identifying data 750 to the backend server, the illuminated signal device and/or speed detector may acquire the speed data using a speed detecting module, and the illuminated signal device and/or speed detector may acquire the image data using a camera. Upon receiving the transmitted data 750 from the illuminated signal device and/or speed detector, the backend server may transmit a warning message 752 to at least one social network at a time $T_2$, and the at least one social network may receive the transmitted warning message 752 from the backend server.

In reference to FIG. 34, the process may include an illuminated signal device and/or speed detector, an A/V recording and communication device, a backend server, and at least one social network. In such embodiments, at a time $T_1$, the illuminated signal device and/or speed detector may transmit a first signal 760 comprising speed data and source identifying data to the backend server. Prior to transmitting the first signal 760 to the backend server, the illuminated signal device and/or speed detector may acquire the speed data using a speed detecting module. At a time $T_2$, the A/V recording and communication device may transmit a second signal 762 comprising image data and/or source identifying data to the backend server. Prior to transmitting the second signal 762 to the backend server, the A/V recording and communication device may acquire the image data using a camera. In some embodiments, time $T_2$ may be after time $T_1$, while in other embodiments time $T_2$ may substantially coincide with time $T_1$ (e.g., the first signal 760 and the second signal 762 may be transmitted at substantially the same time). Upon receiving the first 760 and second 762 signals, the backend sever may transmit a warning message 764 to at least one social network at a time $T_3$, and the at least one social network may receive the transmitted warning message 764 from the backend server.

In reference to FIG. 35, the process may include an illuminated signal device and/or speed detector, an A/V recording and communication device, a backend server, and at least one social network. In such embodiments, at a time $T_1$, the illuminated signal device and/or speed detector may transmit speed data 770 to the A/V recording and communication device. Prior to transmitting the speed data to the A/V recording and communication device, the illuminated signal device and/or speed detector may acquire the speed data using a speed detecting module. At a later time $T_2$, the A/V recording and communication device may transmit a combined signal 772 comprising the received speed data 770, from the illuminated signal device and/or speed detector, image data, and/or source identifying data to the backend server. Prior to transmitting the combined signal 772 to the backend server, the A/V recording and communication device may acquire the image data using a camera. In some embodiments, the illuminated signal device and/or speed detector may not be connected to a user's network, and may instead transmit the speed data to the A/V recording and communication device via any suitable wireless protocol, such as (but not limited to) Bluetooth, or various Bluetooth low energy modes (e.g., Bluetooth LE, BLE, Bluetooth Smart). Upon receiving the transmitted combined signal 772 from the A/V recording and communication device, the backend server may transmit a warning message 774 to the at least one social network at a time $T_3$, and the at least one social network may receive the transmitted warning message 774 from the backend server.

Figure 36:
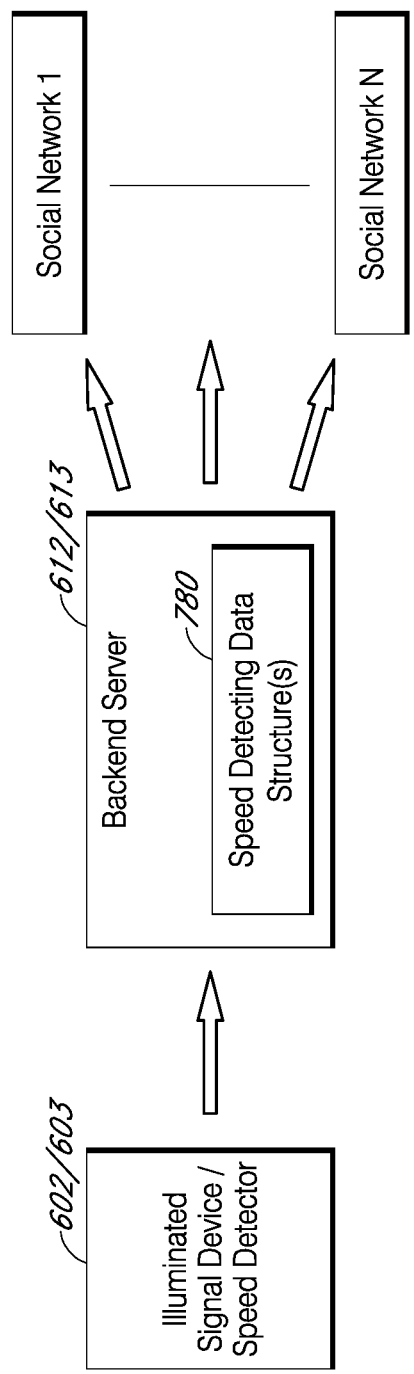
FIG. 36 is a functional block diagram illustrating one embodiment of a system for providing a warning message of a passing vehicle according to an aspect of the present disclosure.

FIG. 36 is a functional block diagram illustrating one embodiment of a system for providing a warning message of a passing vehicle according to an aspect of the present disclosure. The illuminated signal device 602 and/or speed detector 603 (and/or the A/V recording and communication device (not shown)) may transmit speed data, image data, and/or source identifying data to the backend server 612/613 as described above. After receiving the speed data, the image data, and/or the source identifying data, the backend server 612/613 may access at least one speed detecting data structure 780. The speed detecting data structure(s) 780 may store information related to the illuminated signal device 602 and/or the speed detector 603 and/or the A/V recording and communication device. The speed detecting data structure(s) 780 may further store information about a user associated with the illuminated signal device 602 and/or the speed detector 603 and/or the A/V recording and communication device. As described in further detail below, the information about the user may include information about one or more social networks and/or one or more social network participant accounts that are to receive the warning message about the passing vehicle. The speed detecting data structure 780 may thus be used by the backend server 612/613 to determine at least one social network to which to transmit the warning message and/or at least one social network participant account to which to post the warning message of the passing vehicle. The backend server 612/613 may then transmit the warning message to the at least one determined social network and/or post the warning message of the passing vehicle to the determined at least one social network participant account.

In some embodiments, the information stored in the speed detecting data structure(s) 780 comprises information associated with a plurality of users and/or a plurality of devices. For example, during a product activation process, a device (e.g., an illuminated signal device, or a speed detector, or an A/V recording and communication device) may communicate with the backend server 612/613 over the network 608/609 for the first time. The newly activated device may transmit one or more identifiers (e.g., an SSID (service set identifier), a MAC (Media Access Control) address, etc.) to the backend server 612/613, and the backend server 612/613 may store the identifier(s) in the speed detecting data structure(s) 780. Information about the user(s) associated with the device being activated, such as the user(s) name, may also be stored in the speed detecting data structure(s) 780. Other information that may be stored in the speed detecting data structure(s) 780 includes location information, such as where the device being activated is located (e.g., a street address, GPS coordinates, etc.).

Also during the product activation process, or at any time thereafter, the user may provide information to the backend server 612/613 about one or more social networks and/or one or more social network participant accounts. For example, the user may provide information about the user's social network participant account(s), such as login credentials (e.g., username, password, etc.), and the provided information may be stored in the speed detecting data structure(s) 780. When the backend server 612/613 receives the speed data, the image data, and the source identifying data, as described above with reference to FIGS. 30-32, the backend server 612/613 may reference the speed detecting data structure(s) 780, using the provided source identifying data, to determine where to post the warning message of the passing vehicle. For example, the speed detecting data structure(s) 780 may store information about one or more social network participant accounts that are to receive the warning message of the passing vehicle when speed data and/or image data is received from a device associated with the one or more social network participant accounts (or from a device associated with a user of the one or more social network participant accounts).

Figure 37:
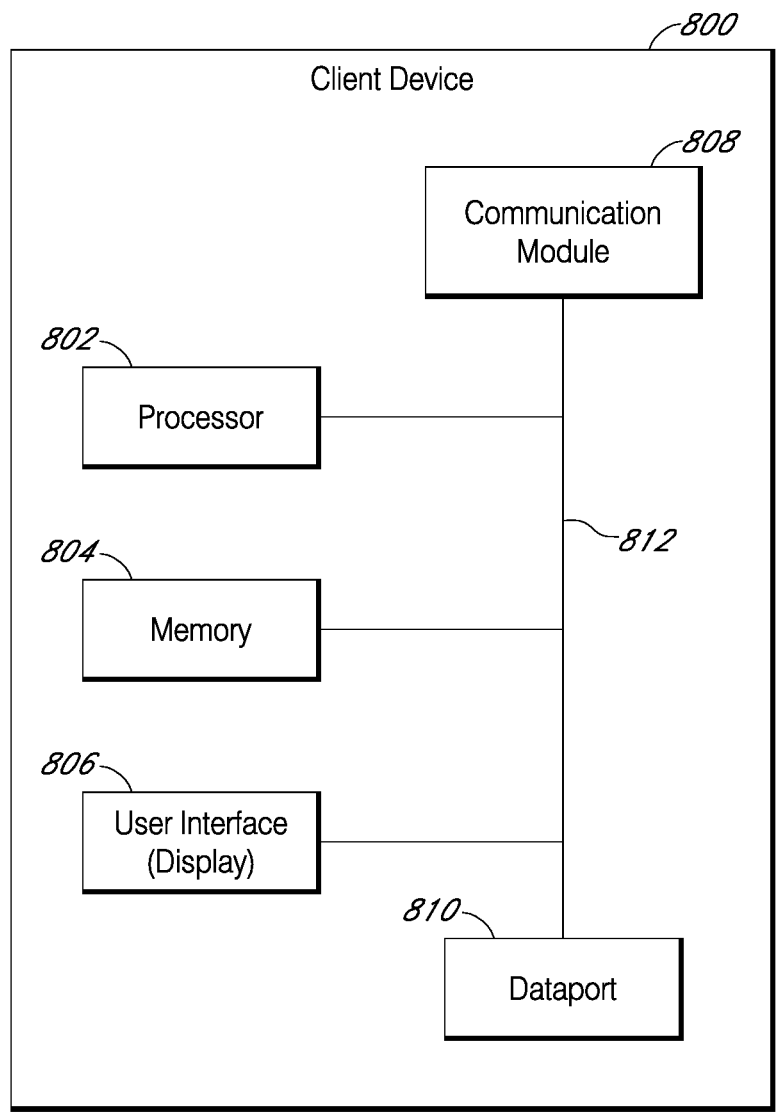
FIG. 37 is a functional block diagram of a client device on which the present embodiments may be implemented according to various aspects of the present disclosure.

FIG. 37 is a functional block diagram of a client device 800 on which the present embodiments may be implemented according to various aspects of the present disclosure. The user's client device 114 described with reference to FIG. 1 may include some or all of the components and/or functionality of the client device 800. The client device 800 may comprise, for example, a smartphone.

With reference to FIG. 37, the client device 800 includes a processor 802, a memory 804, a user interface 806, a communication module 808, and a dataport 810. These components are communicatively coupled together by an interconnect bus 812. The processor 802 may include any processor used in smartphones and/or portable computing devices, such as an ARM processor (a processor based on the RISC (reduced instruction set computer) architecture developed by Advanced RISC Machines (ARM).). In some embodiments, the processor 802 may include one or more other processors, such as one or more conventional microprocessors, and/or one or more supplementary co-processors, such as math co-processors.

The memory 804 may include both operating memory, such as random access memory (RAM), as well as data storage, such as read-only memory (ROM), hard drives, flash memory, or any other suitable memory/storage element. The memory 804 may include removable memory elements, such as a CompactFlash card, a MultiMediaCard (MMC), and/or a Secure Digital (SD) card. In some embodiments, the memory 804 may comprise a combination of magnetic, optical, and/or semiconductor memory, and may include, for example, RAM, ROM, flash drive, and/or a hard disk or drive. The processor 802 and the memory 804 each may be, for example, located entirely within a single device, or may be connected to each other by a communication medium, such as a USB port, a serial port cable, a coaxial cable, an Ethernet-type cable, a telephone line, a radio frequency transceiver, or other similar wireless or wired medium or combination of the foregoing. For example, the processor 802 may be connected to the memory 804 via the dataport 810.

The user interface 806 may include any user interface or presentation elements suitable for a smartphone and/or a portable computing device, such as a keypad, a display screen, a touchscreen, a microphone, and a speaker. The communication module 808 is configured to handle communication links between the client device 800 and other, external devices or receivers, and to route incoming/outgoing data appropriately. For example, inbound data from the dataport 810 may be routed through the communication module 808 before being directed to the processor 802, and outbound data from the processor 802 may be routed through the communication module 808 before being directed to the dataport 810. The communication module 808 may include one or more transceiver modules capable of transmitting and receiving data, and using, for example, one or more protocols and/or technologies, such as GSM, UMTS (3GSM), IS-95 (CDMA one), IS-2000 (CDMA 2000), LTE, FDMA, TDMA, W-CDMA, CDMA, OFDMA, Wi-Fi, WiMAX, or any other protocol and/or technology.

The dataport 810 may be any type of connector used for physically interfacing with a smartphone and/or a portable computing device, such as a mini-USB port or an IPHONE®/IPOD® 30-pin connector or LIGHTNING® connector. In other embodiments, the dataport 810 may include multiple communication channels for simultaneous communication with, for example, other processors, servers, and/or client terminals.

The memory 804 may store instructions for communicating with other systems, such as a computer. The memory 804 may store, for example, a program (e.g., computer program code) adapted to direct the processor 802 in accordance with the present embodiments. The instructions also may include program elements, such as an operating system. While execution of sequences of instructions in the program causes the processor 802 to perform the process steps described herein, hard-wired circuitry may be used in place of, or in combination with, software/firmware instructions for implementation of the processes of the present embodiments. Thus, the present embodiments are not limited to any specific combination of hardware and software.

Figure 38:
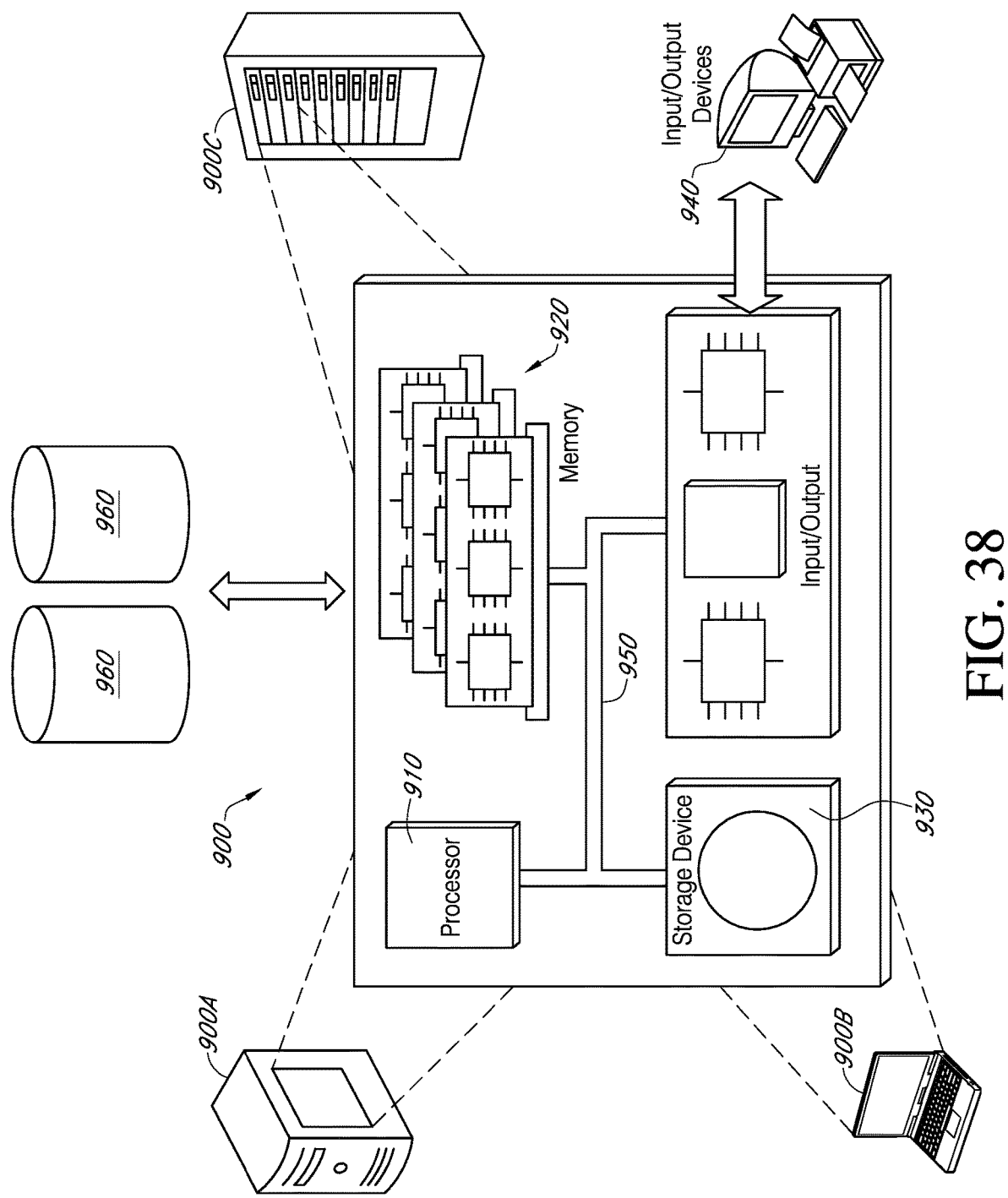
FIG. 38 is a functional block diagram of a general-purpose computing system on which the present embodiments may be implemented according to various aspects of present disclosure.

FIG. 38 is a functional block diagram of a general-purpose computing system on which the present embodiments may be implemented according to various aspects of the present disclosure. The computer system 900 may be embodied in at least one of a personal computer (also referred to as a desktop computer) 900A, a portable computer (also referred to as a laptop or notebook computer) 900B, and/or a server 900C. A server is a computer program and/or a machine that waits for requests from other machines or software (clients) and responds to them. A server typically processes data. The purpose of a server is to share data and/or hardware and/or software resources among clients. This architecture is called the client-server model. The clients may run on the same computer or may connect to the server over a network. Examples of computing servers include database servers, file servers, mail servers, print servers, web servers, game servers, and application servers. The term server may be construed broadly to include any computerized process that shares a resource to one or more client processes.

The computer system 900 may execute at least some of the operations described above. The computer system 900 may include at least one processor 910, memory 920, at least one storage device 930, and input/output (I/O) devices 940. Some or all of the components 910, 920, 930, 940 may be interconnected via a system bus 950. The processor 910 may be single- or multi-threaded and may have one or more cores. The processor 910 may execute instructions, such as those stored in the memory 920 and/or in the storage device 930. Information may be received and output using one or more I/O devices 940.

The memory 920 may store information, and may be a computer-readable medium, such as volatile or non-volatile memory. The storage device(s) 930 may provide storage for the system 900, and may be a computer-readable medium. In various aspects, the storage device(s) 930 may be a flash memory device, a hard disk device, an optical disk device, a tape device, or any other type of storage device.

The I/O devices 940 may provide input/output operations for the system 900. The I/O devices 940 may include a keyboard, a pointing device, and/or a microphone. The I/O devices 940 may further include a display unit for displaying graphical user interfaces, a speaker, and/or a printer. External data may be stored in one or more accessible external databases 960.

The features of the present embodiments described herein may be implemented in digital electronic circuitry, and/or in computer hardware, firmware, software, and/or in combinations thereof. Features of the present embodiments may be implemented in a computer program product tangibly embodied in an information carrier, such as a machine-readable storage device, and/or in a propagated signal, for execution by a programmable processor. Embodiments of the present method steps may be performed by a programmable processor executing a program of instructions to perform functions of the described implementations by operating on input data and generating output.

The features of the present embodiments described herein may be implemented in one or more computer programs that are executable on a programmable system including at least one programmable processor coupled to receive data and/or instructions from, and to transmit data and/or instructions to, a data storage system, at least one input device, and at least one output device. A computer program may include a set of instructions that may be used, directly or indirectly, in a computer to perform a certain activity or bring about a certain result. A computer program may be written in any form of programming language, including compiled or interpreted languages, and it may be deployed in any form, including as a stand-alone program or as a module, component, subroutine, or other unit suitable for use in a computing environment.

Suitable processors for the execution of a program of instructions may include, for example, both general and special purpose processors, and/or the sole processor or one of multiple processors of any kind of computer. Generally, a processor may receive instructions and/or data from a read only memory (ROM), or a random access memory (RAM), or both. Such a computer may include a processor for executing instructions and one or more memories for storing instructions and/or data.

Generally, a computer may also include, or be operatively coupled to communicate with, one or more mass storage devices for storing data files. Such devices include magnetic disks, such as internal hard disks and/or removable disks, magneto-optical disks, and/or optical disks. Storage devices suitable for tangibly embodying computer program instructions and/or data may include all forms of non-volatile memory, including for example semiconductor memory devices, such as EPROM, EEPROM, and flash memory devices, magnetic disks such as internal hard disks and removable disks, magneto-optical disks, and CD-ROM and DVD-ROM disks. The processor and the memory may be supplemented by, or incorporated in, one or more ASICs (application-specific integrated circuits).

To provide for interaction with a user, the features of the present embodiments may be implemented on a computer having a display device, such as an LCD (liquid crystal display) monitor, for displaying information to the user. The computer may further include a keyboard, a pointing device, such as a mouse or a trackball, and/or a touchscreen by which the user may provide input to the computer.

The features of the present embodiments may be implemented in a computer system that includes a back-end component, such as a data server, and/or that includes a middleware component, such as an application server or an Internet server, and/or that includes a front-end component, such as a client computer having a graphical user interface (GUI) and/or an Internet browser, or any combination of these. The components of the system may be connected by any form or medium of digital data communication, such as a communication network. Examples of communication networks may include, for example, a LAN (local area network), a WAN (wide area network), and/or the computers and networks forming the Internet.

The computer system may include clients and servers. A client and server may be remote from each other and interact through a network, such as those described herein. The relationship of client and server may arise by virtue of computer programs running on the respective computers and having a client-server relationship to each other.

The above description presents the best mode contemplated for carrying out the present embodiments, and of the manner and process of practicing them, in such full, clear, concise, and exact terms as to enable any person skilled in the art to which they pertain to practice these embodiments. The present embodiments are, however, susceptible to modifications and alternate constructions from those discussed above that are fully equivalent. Consequently, the present invention is not limited to the particular embodiments disclosed. On the contrary, the present invention covers all modifications and alternate constructions coming within the spirit and scope of the present disclosure. For example, the steps in the processes described herein need not be performed in the same order as they have been presented, and may be performed in any order(s). Further, steps that have been presented as being performed separately may in alternative embodiments be performed concurrently. Likewise, steps that have been presented as being performed concurrently may in alternative embodiments be performed separately.

What is claimed is:

1. An illuminated signal device, comprising:
    an illumination source that, when activated, emits visible light through a front panel of the illuminated signal device, a first portion of the front panel being translucent, such that the illumination source, when activated, emits visible light through the first portion, and a second portion of the front panel contrasting with the first portion at least when the illumination source emits visible light through the first portion;
    a camera having a field of view;
    a communication module;
    at least one processor; and
    memory storing non-transitory computer readable instructions that, when executed by the at least one processor, cause the illuminated signal device to:
        detect motion within the field of view of the camera;
        record image data in response to the detected motion; and
        transmit the image data to a server using the communication module.

2. The illuminated signal device of claim 1, further comprising a stake for supporting the illuminated signal device in the ground.

3. The illuminated signal device of claim 2, the stake being elongate and tapering down toward a lower end.

4. The illuminated signal device of claim 1, further comprising a power source coupled at least to the illumination source, the camera, the communication module, and the at least one processor.

5. The illuminated signal device of claim 4, the power source comprising at least one solar panel.

6. The illuminated signal device of claim 5, the at least one solar panel being mounted at an upper edge of the illuminated signal device.

7. The illuminated signal device of claim 4, wherein the power source comprises at least one rechargeable battery.

8. An illuminated signal device, comprising:
    an illumination source that, when activated, emits visible light through a front panel of the illuminated signal device, a first portion of the front panel being translucent, such that the illumination source, when activated, emits visible light through the first portion, and a second portion of the front panel contrasting with the first portion at least when the illumination source emits visible light through the first portion;
    a motion sensor;
    at least one processor; and
    memory storing non-transitory computer readable instructions that, when executed by the at least one processor, cause the illuminated signal device to:
        detect motion in a field of view of the motion sensor; and
        activate the illumination source in response to the detected motion.

9. The illuminated signal device of claim 8, the memory storing further computer readable instructions that, when executed by the at least one processor, further cause the illuminated signal device to:
    detect an ambient light level; and
    maintain the illumination source in an off state when the ambient light level is above a threshold.

10. The illuminated signal device of claim 8, the memory storing further computer readable instructions that, when executed by the at least one processor, further cause the illuminated signal device to:
    detect an ambient light level; and
    maintain the illumination source in a first power state when the ambient light level is below a first threshold.

11. The illuminated signal device of claim 10, the first power state being an off state.

12. The illuminated signal device of claim 10, the first power state being a low-power state.

13. The illuminated signal device of claim 10, the memory storing further computer readable instructions that, when executed by the at least one processor, further cause the illuminated signal device to:
   return the illumination source to the first power state when motion is no longer detected by the motion sensor.

14. The illuminated signal device of claim 10, the memory storing further computer readable instructions that, when executed by the at least one processor, further cause the illuminated signal device to:
   return the illumination source to the first power state after a timer expires.

15. The illuminated signal device of claim 10, the memory storing further computer readable instructions that, when executed by the at least one processor, further cause the illuminated signal device to:
   cycle the illumination source between on and off states.

16. The illuminated signal device of claim 8, further comprising
   a communication module; and
   a camera;
   the memory storing further computer readable instructions that, when executed by the at least one processor, further cause the illuminated signal device to:
   record image data in response to the detected motion; and
   transmit the image data to a server using the communication module.

17. The illuminated signal device of claim 8, further comprising:
   a speaker;
   the memory storing further computer readable instructions that, when executed by the at least one processor, further cause the illuminated signal device to activate the speaker to play audio in response to the detected motion.

18. The illuminated signal device of claim 8, further comprising:
   a stake for supporting the illuminated signal device in the ground; and
   at least one solar panel that provides electrical power to the illuminated signal device.

\* \* \* \* \*